United States Patent [19]

Butlin, deceased et al.

[11] Patent Number: 5,318,429
[45] Date of Patent: Jun. 7, 1994

[54] PROCESS FOR INSERT MOLDING WET-SHAVING RAZOR UNIT AND UNIT MADE THEREFROM

[75] Inventors: C. Edward Butlin, deceased, late of Erie, by Dorothy M. Butlin, heir; Edward S. Butlin, Erie, both of Pa.; William T. Conrad, Jr., Shelton, Conn.

[73] Assignee: Warner-Lambert Company, Morris Plains, N.J.

[21] Appl. No.: 843,717

[22] Filed: Feb. 28, 1992

Related U.S. Application Data

[63] Continuation-in-part of Ser. No. 689,178, Apr. 22, 1991, and Ser. No. 541,225, Jun. 20, 1990, Pat. No. 5,141,694, which is a continuation-in-part of Ser. No. 236,969, Aug. 26, 1988, Pat. No. 5,104,605, Ser. No. 165,859, Mar. 9, 1988, abandoned, Ser. No. 88,368, Aug. 21, 1987, abandoned, and Ser. No. 42,493, Apr. 24, 1987, Pat. No. 5,053,178, said Ser. No. 165,859, is a continuation-in-part of Ser. No. 88,368, Apr. 24, 1987, which is a continuation-in-part of Ser. No. 42,493, Apr. 24, 1987.

[51] Int. Cl.[5] ............................................. B29C 45/14
[52] U.S. Cl. ..................... 425/116; 425/123; 425/125; 425/129.1; 425/556
[58] Field of Search ............... 425/116, 117, 123, 125, 425/127, 129.1, 542, 553, 554, 556

[56] References Cited

U.S. PATENT DOCUMENTS

| | | | |
|---|---|---|---|
| 2,789,346 | 4/1957 | Algier | 30/41 |
| 3,070,883 | 1/1963 | Grathwohl | 30/32 |
| 3,703,765 | 11/1972 | Perez | 30/41 |
| 3,738,000 | 6/1973 | Samko | 30/32 |
| 4,453,903 | 6/1984 | Pukaite | 425/123 |
| 4,470,786 | 9/1984 | Sano et al. | 425/123 |
| 4,489,627 | 12/1984 | Lembke | 76/104.1 |
| 4,586,886 | 5/1986 | Prischak et al. | 425/123 |
| 4,624,051 | 11/1986 | Apprile, Jr. et al. | 30/50 |
| 4,634,565 | 1/1987 | Irrgang | 264/510 |
| 4,683,096 | 7/1987 | Ferraro | 264/249 |
| 4,778,640 | 10/1988 | Braun et al. | 264/250 |
| 5,024,798 | 6/1991 | Cloud et al. | 425/123 |

FOREIGN PATENT DOCUMENTS

| | | |
|---|---|---|
| 1473527 | 3/1967 | France . |
| 1251905 | 11/1971 | United Kingdom . |
| 1565296 | 4/1980 | United Kingdom . |
| 2050912 | 1/1981 | United Kingdom . |

Primary Examiner—Jay H. Woo
Assistant Examiner—James P. Mackey
Attorney, Agent, or Firm—Charles W. Almer, III

[57] ABSTRACT

The present invention is a wet-shaving unit and a process for making same by injection molding. Additionally, the present invention provides an apparatus for molding the wet-shaving razor unit. The present invention is adaptable for addition to conventional razor blade manufacturing methods and existing manufacturing apparatus and facilities. Moreover, the present process results in a product which significantly reduces or eliminates entirely undesirable blade distortion and vibration.

10 Claims, 44 Drawing Sheets

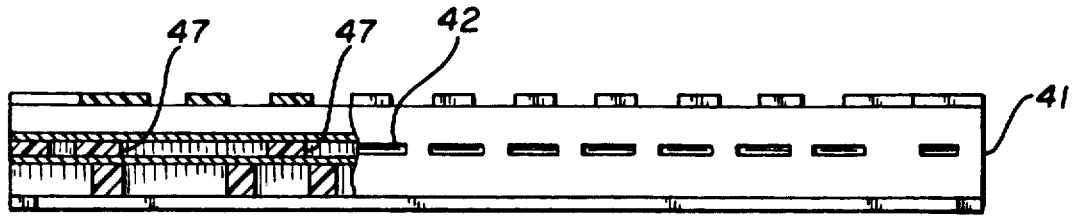
FIG-8
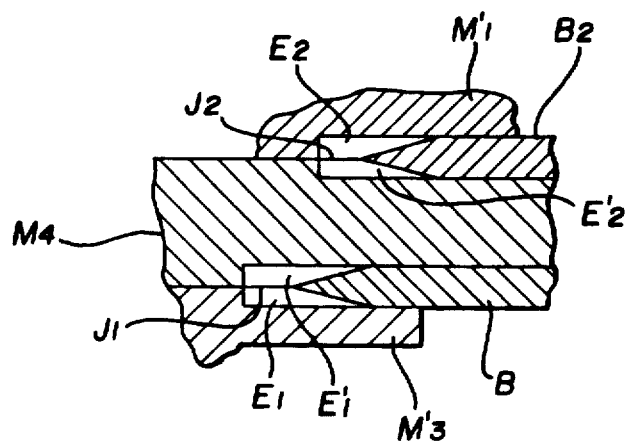
FIG-9a
FIG-9
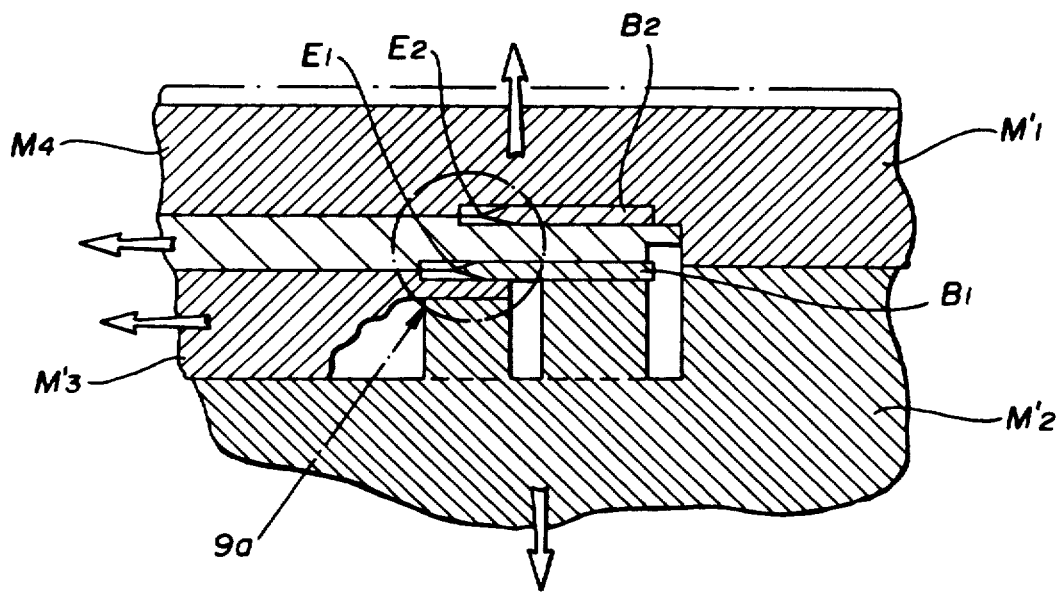

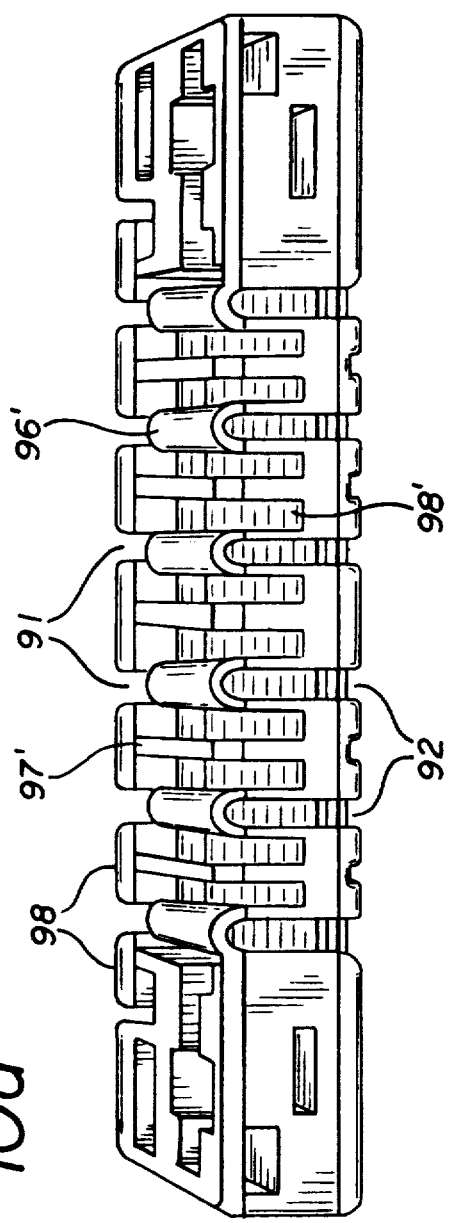
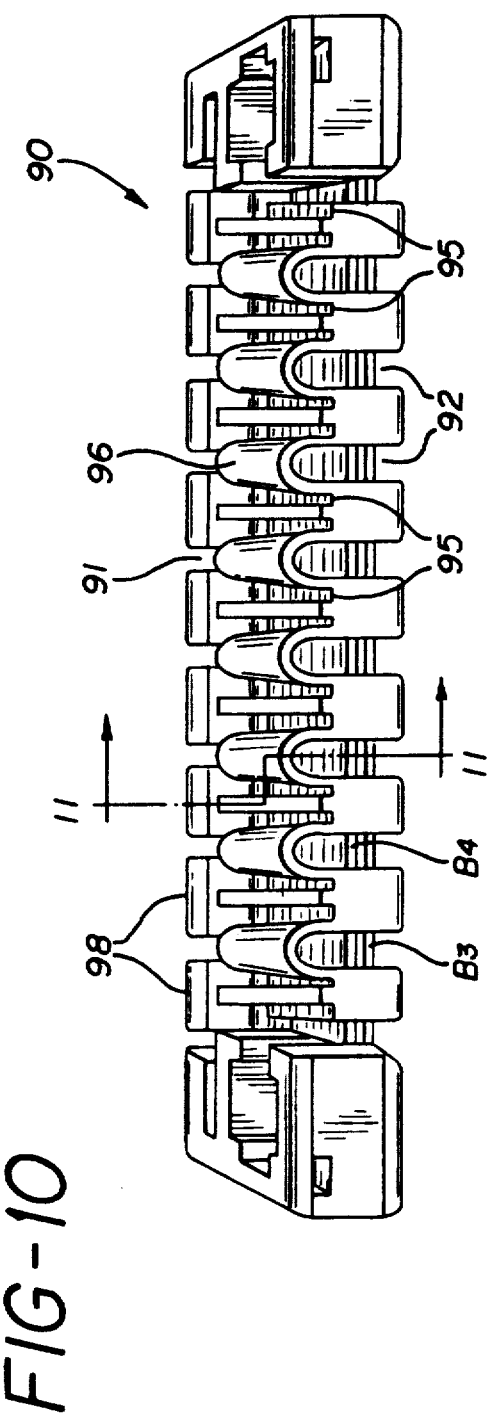

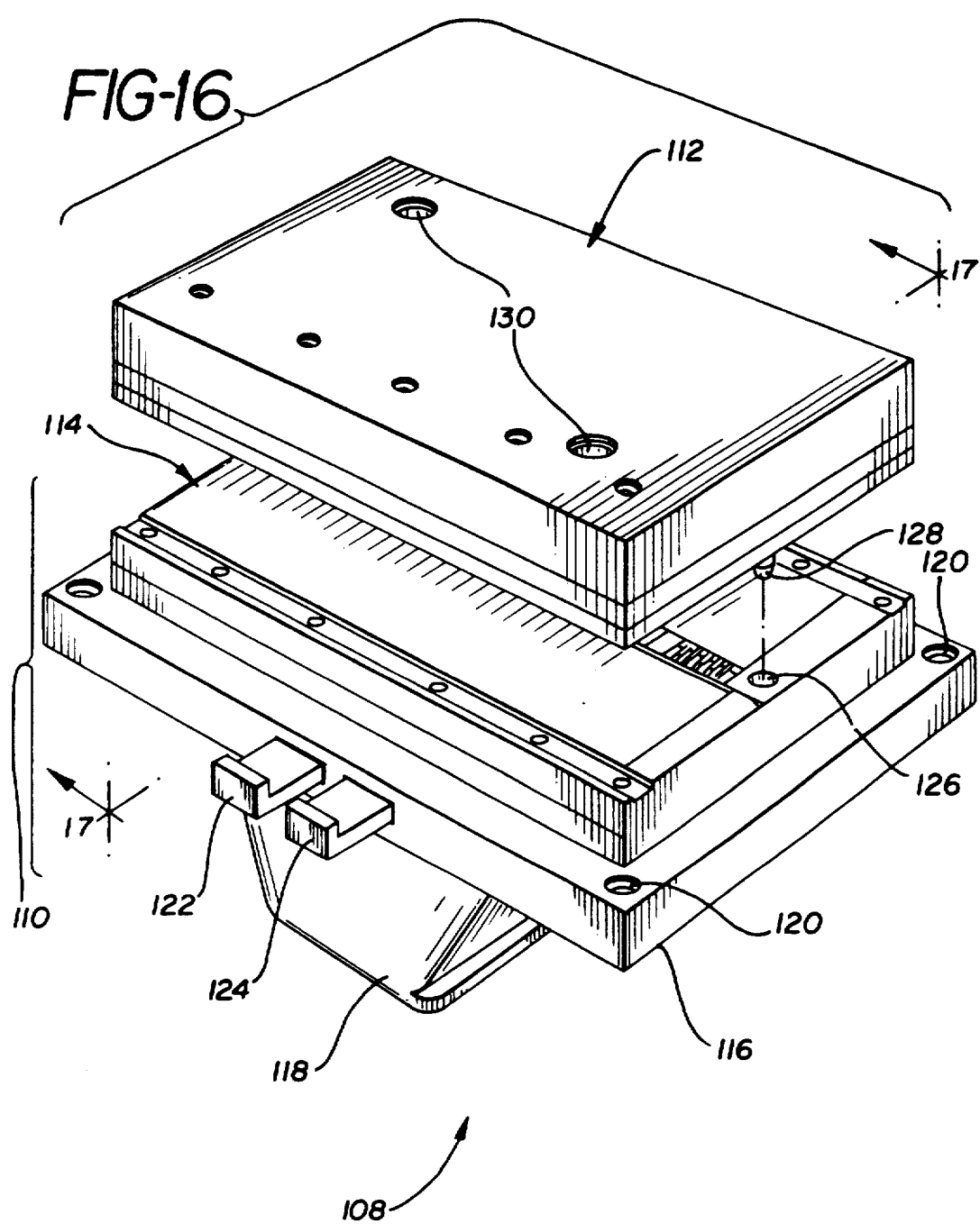

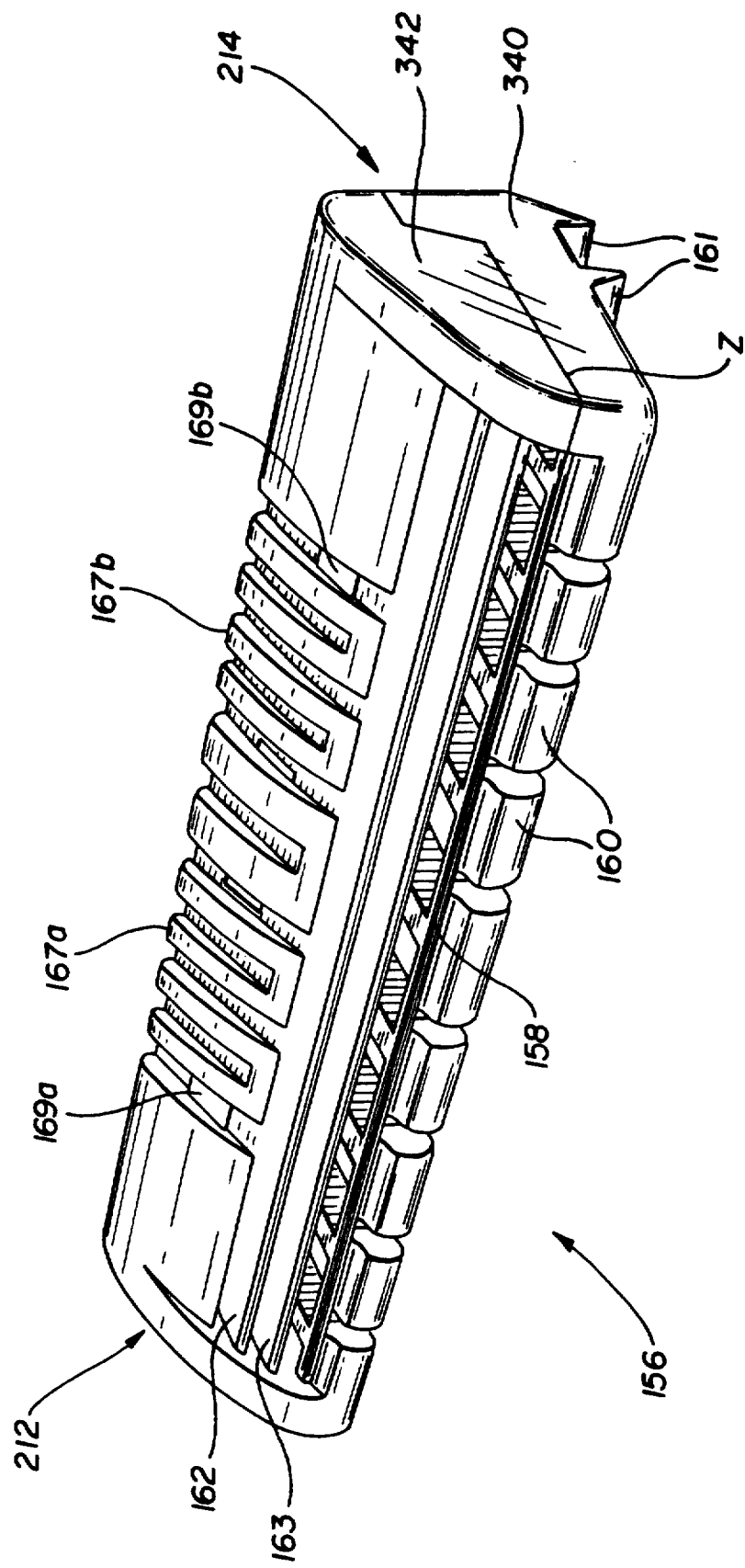

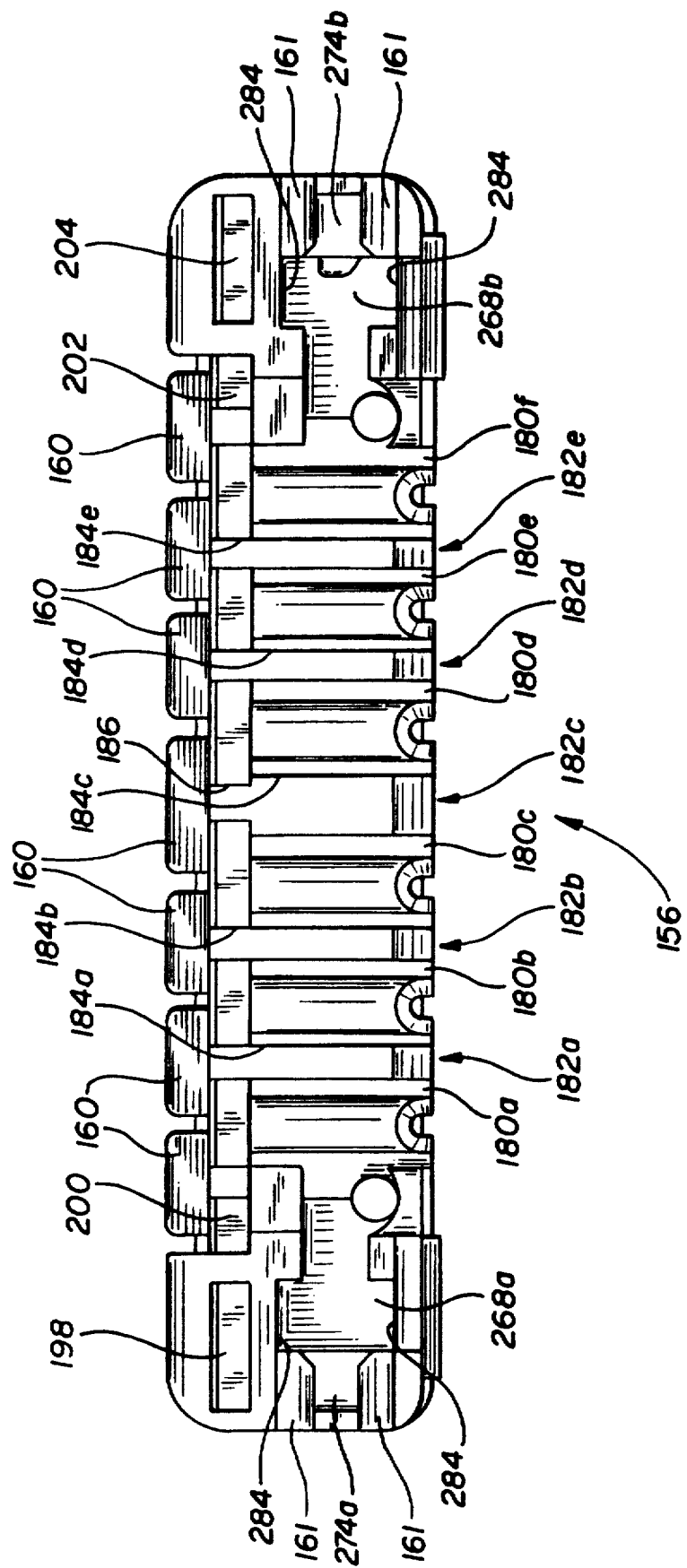

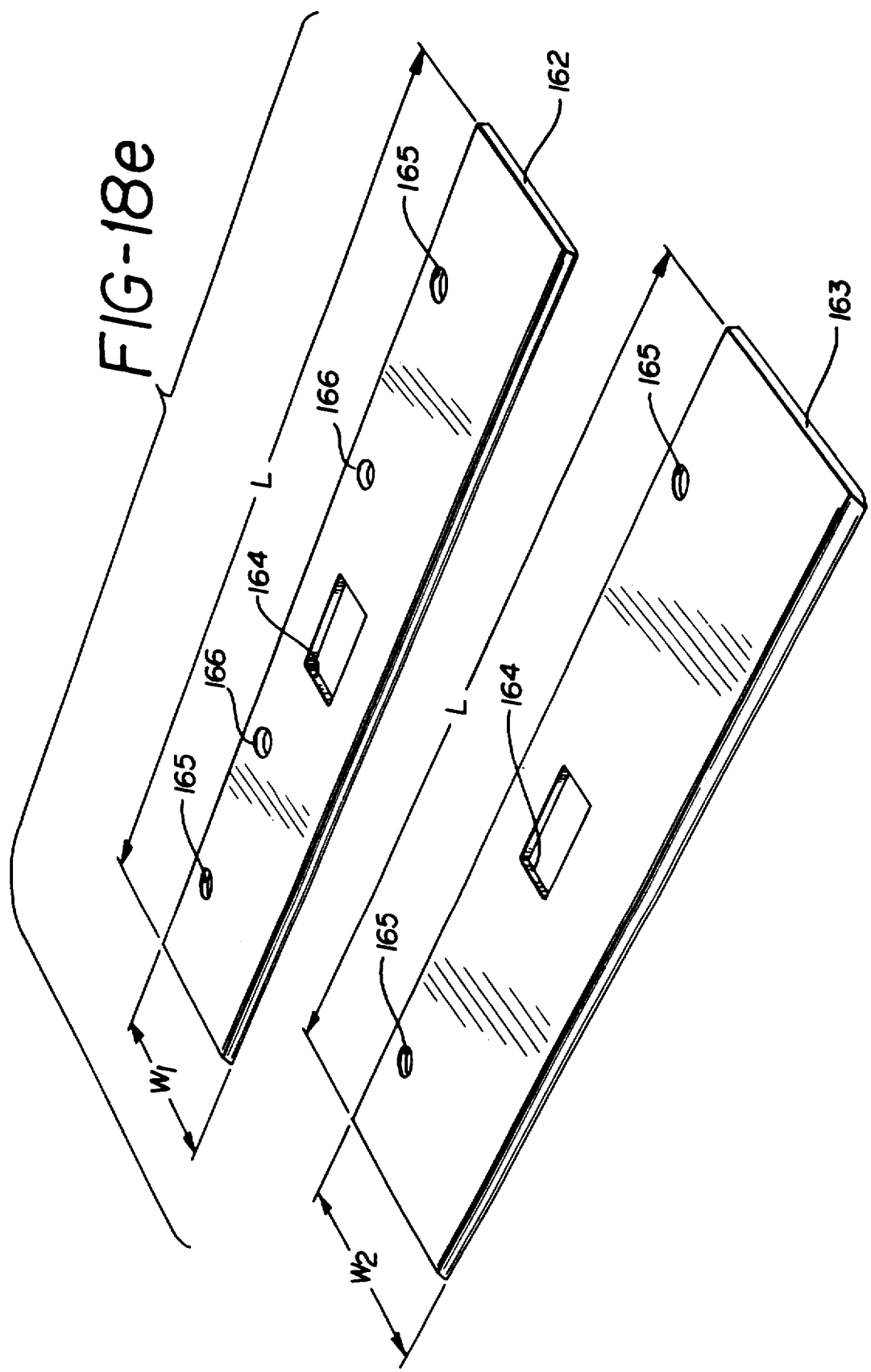

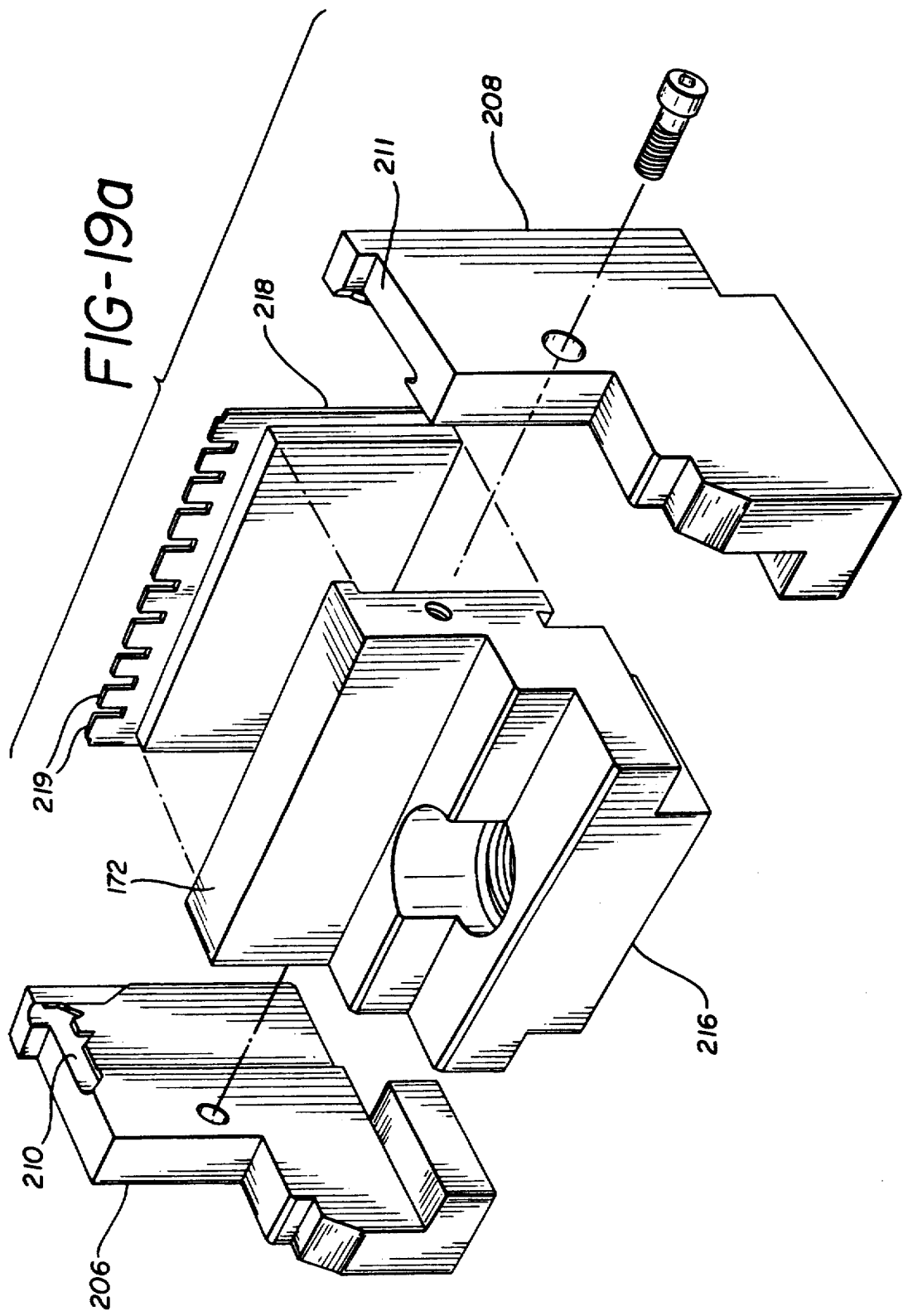

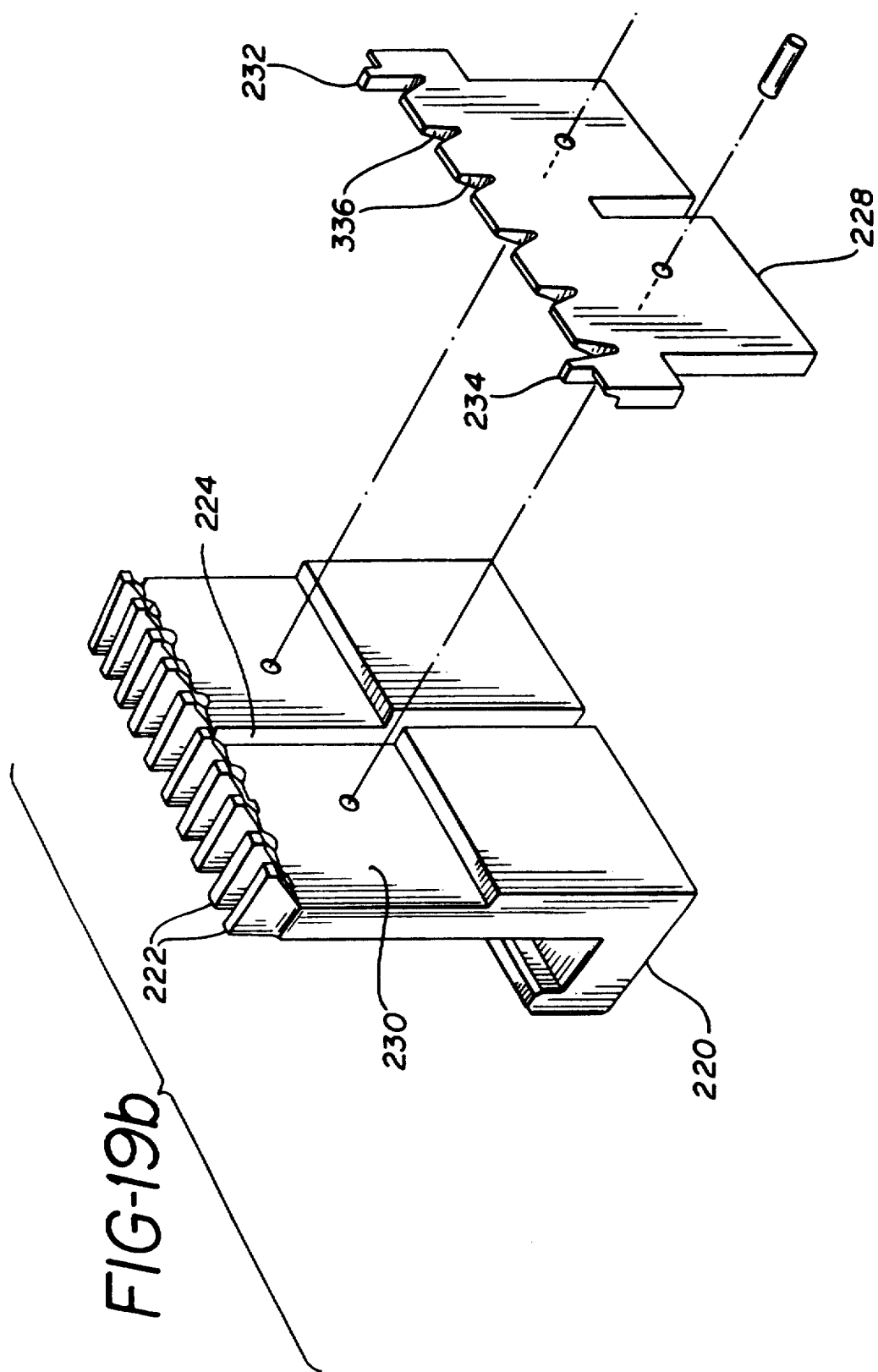

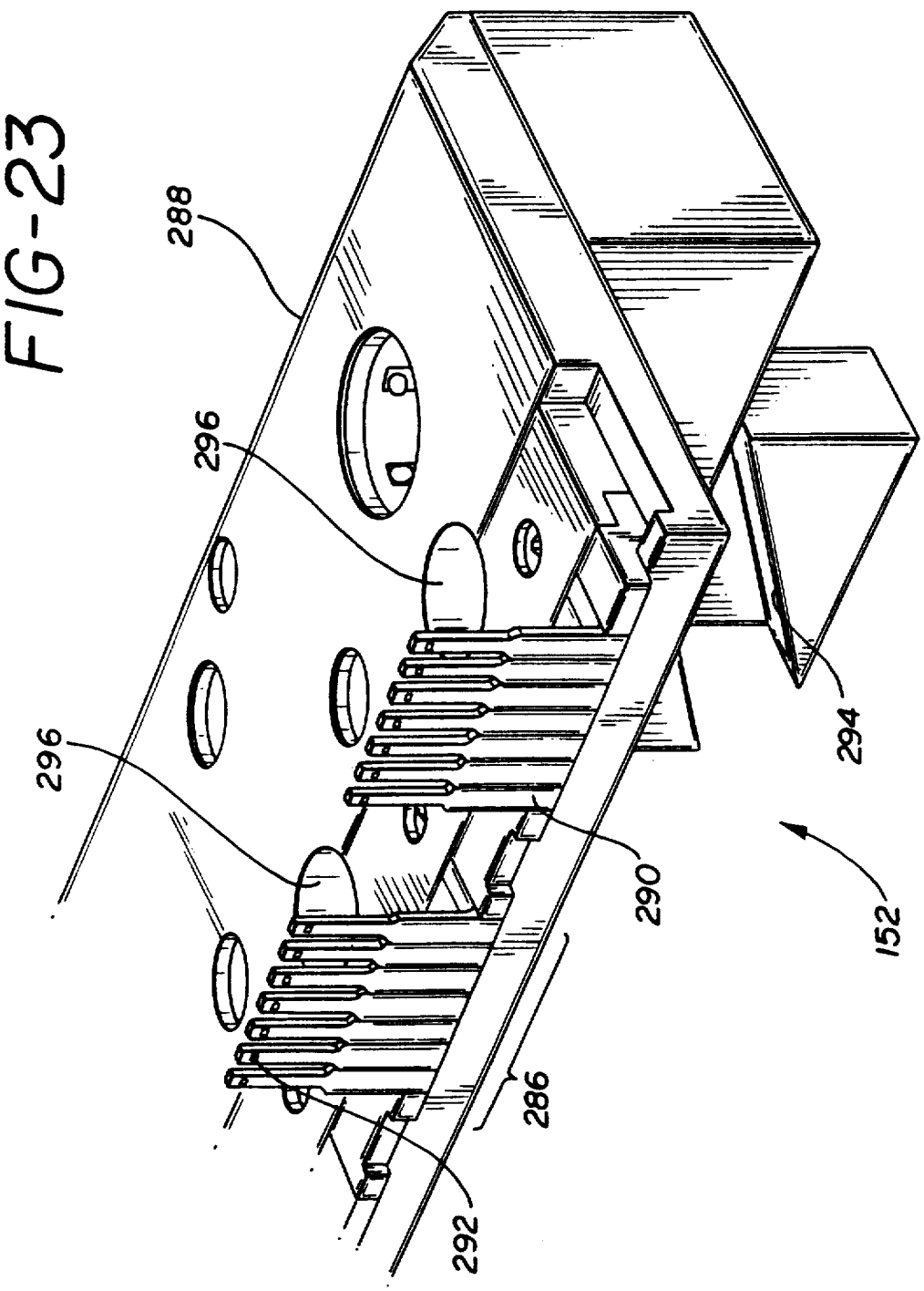

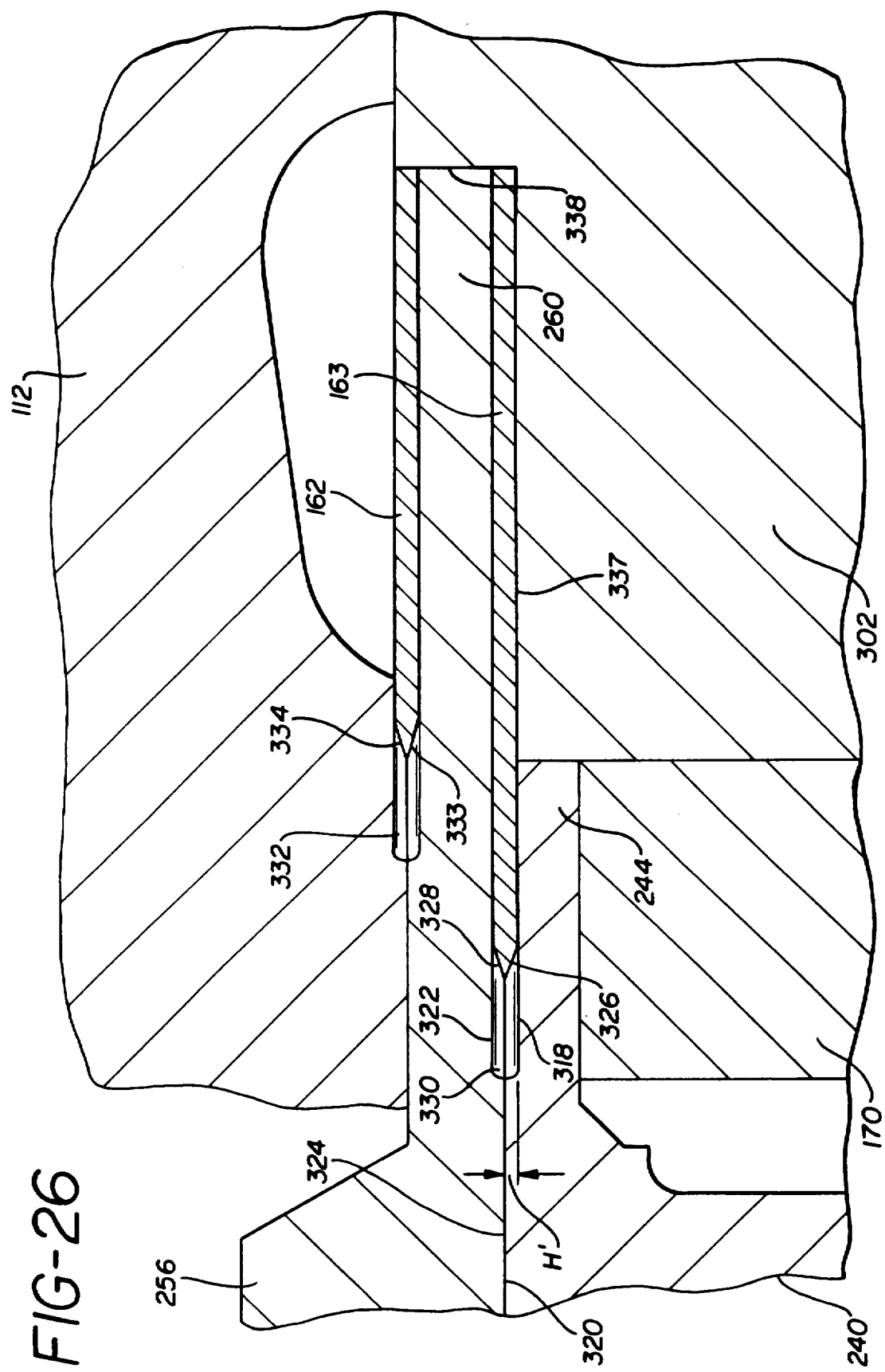

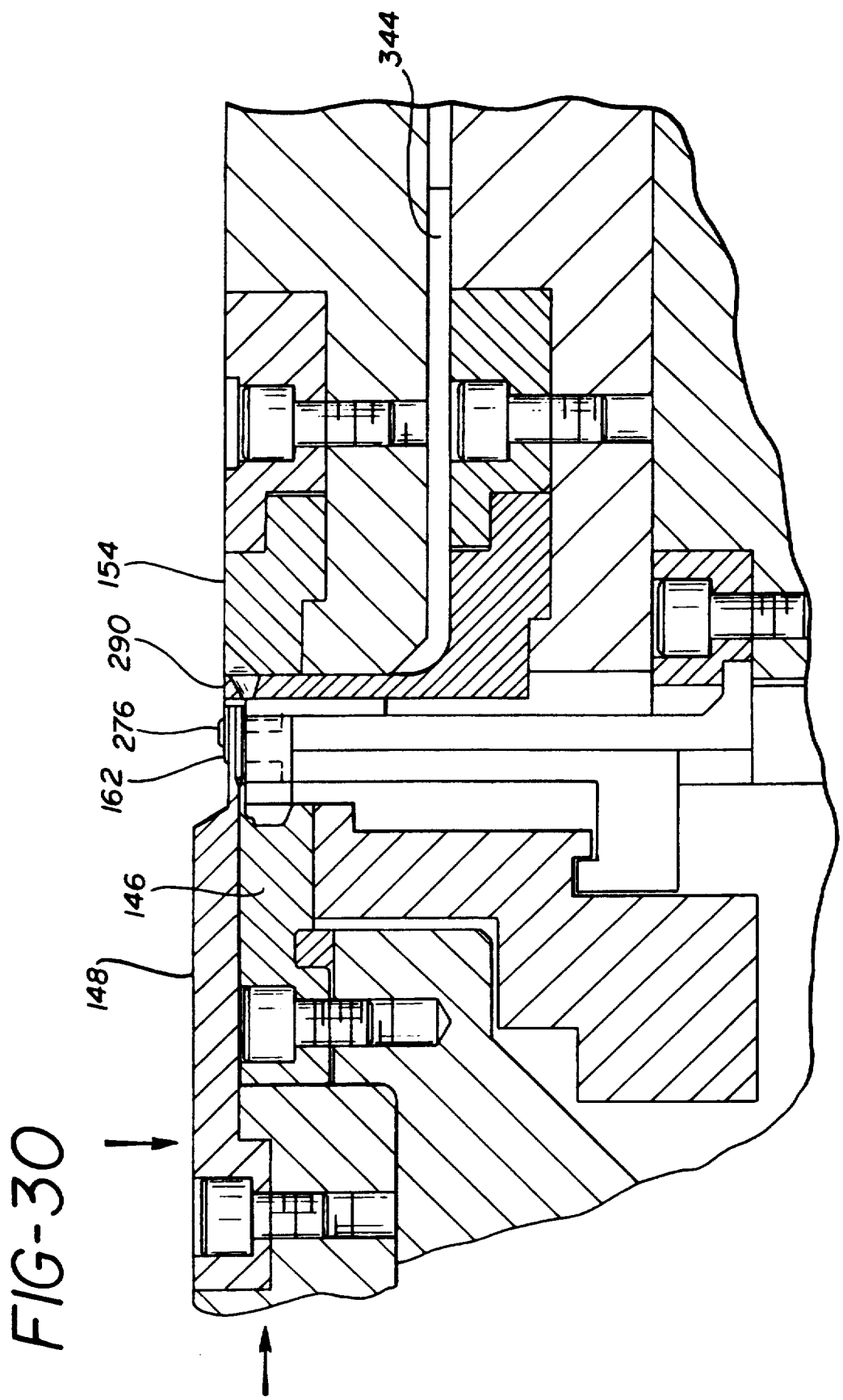

341

PROCESS FOR INSERT MOLDING WET-SHAVING RAZOR UNIT AND UNIT MADE THEREFROM

BACKGROUND OF THE INVENTION

This application is a continuation-in-part of U.S. application Ser. No. 541,225 filed Jun. 20, 1990, now U.S. Pat. No. 5,141,694, which, in turn, is a continuation-in-part of U.S. application Ser. No. 165,859 filed Mar. 9, 1988, now abandoned, and its parent, U.S. application Ser. No. 088,368 filed Aug. 21, 1987, now abandoned, and its parent U.S. application Ser. No. 042,493 filed Apr. 24, 1987, now U.S. Pat. No. 5,053,178, the later-filed cases each being continuation-in-part applications of their respective predecessors. U.S. application Ser. No. 541,225 is also a continuation-in-part of commonly-assigned U.S. application Ser. No. 236,969 filed Aug. 26, 1988, now U.S. Pat. No. 5,104,605. The present application is also a continuation-in-part of U.S. application Ser. No. 689,178 filed Apr. 22, 1991. Each of the predecessor applications cited above is incorporated herein by reference.

The present invention relates to the art of wet-shaving and, in particular, is concerned with manufacturing a shaving unit, such as a disposable razor or a cartridge, by molding a thermoplastic material around the blade (or blades) so that the edge is protected during molding and exposed for shaving in the final product. Injection of a thermoplastic material around prefixed plastic or non-plastic parts to provide a composite article having a desired geometry can be referred as to insert molding.

Currently, wet-shaving units, such as disposable razors and cartridges, form a substantial portion of the demand of wet-shaving market.

With the exception of the blade or blades (and possibly a spacer) these units have been made out of thermoplastic material. The cap and blade support or seat components, depending upon the ultimate design, are molded separately and then assembled. For example the "MicroTrac" disposable razor manufactured by Gillette holds a single unit blade seat, back and cap, with the cap including outwardly extending fingers. The blade subassembly, consisting of two blades and a spacer, is inserted between the molded cap and seat with the finger-like projections extending from the top of the cap serving as leaf springs to retain the blade subassembly. This combination is then mated to a handle by press fitting into the blade subassembly. It is apparent that this process involves not only separate steps, but separate work stations requiring individual subassembly and ultimate assembly.

Other assembly processes for shaving units utilize projections extending either from the cap or the seat, which mate with openings in the opposing part and position the blades and/or spacer. The handle is usually made separately from the seat portion. Again, separate assembly steps at separate locations are required to produce the disposable razor.

A significant problem occasioned in the manufacture of wet-shaving units is the difficulty in establishing a reproducible shave geometry which provides optimum blade edge performance. Shave geometry relates to the spatial relationship, e.g., distance, angles(s), etc., of the surface(s) and blade edge(s) as they come into contact with the skin. Inherently, separate fabrication and assembly required to produce wet-shaving units detract from the ability to precisely reproduce a selected shave geometry. Manufacturing such units also requires continuous vigilance to ensure quality control. Usually such vigilance translates into increased cost of production which results from additional labor.

Furthermore, blade edge performance relates to the response of the blade edge to forces imparted to it during shaving. Undue or uncontrolled vibration of the blade as it is drawn across the skin, sometimes referred to as "chatter," has been blamed by some experts as detracting from the feel of the shave and causing injury to the user. Separate fabrication and assembly required in known methods of manufacturing wet-shaving units are inimical to reducing "chatter" during shaving. Even minor tolerances built into mating parts for assembly will contribute to "chatter."

Consistently reproducible shave geometry has been improved to a certain extent by use of molded plastic parts having consistent dimensions. Quality assurance, however, still requires constant monitoring of production to ensure fabrication and assembly of parts are consistent. Overall blade edge performance has not been significantly improved by mere use of molded plastic parts.

Presently, there are no known hard and fast technical theories with respect to blade edge performance, but certain design characteristics are believed to enhance performance of wet-shaving units. Constant shave geometry whereby the spatial relationship of the skin-engaging portions, the seat, the cap, and the blade, are maintained over the entire length of the blade is certainly very important. In most cases, the blade over which constant shave geometry need be maintained is in a flat configuration with the edge having the profile of a straight line, although some artisans also recommend that the blade have a crown in the central portion for optimum shave feel. More recently, the discovery by the owners of the present technology of a flexible wet-shaving unit which deflects in response to forces imparted during shaving has required that shave geometry be maintained over the length of a blade which experiences a changing profile.

Regardless of the selected blade profile, it is substantially universally agreed that, in addition to maintenance of shave geometry, the blade edge should not be distorted from the edge profile, whether it is rigid or flexible. In the case of a flexible cartridge, although the entire cartridge body bends in response to forces during shaving (i.e., has a changing profile), the blade(s) should not deviate out of the fixed geometry of the shaving unit. Such blade distortion can easily result from several manufacturing difficulties. For example, care must be given to carefully matching mating parts during assembly of shaving units. Again, such care generally requires labor intensive quality assurance measures.

Vibration of the blade results from several structural features. One kind of vibration can be described as a "clamshelling" affect of the subassembly components vibrating with respect to each other. Another vibration is that of the subassembly moving as a single component of the total razor unit. The cantilever configuration of the blade (and/or the blade subassembly) extending from its point of securement toward the unsupported edge contributes to this undesirable vibration. The inherent looseness of components in assembled wet-shaving units is yet another source of vibration. It is desirable, therefore, to minimize or eliminate one or more of the causes of vibration.

Still another source of vibration is caused by the blade engaging hair growing out of the skin surface. Recovery time of the blade should be minimized. This quick recovery may be characterized as stiffness.

In order to cure these problems, a disposable razor which could be assembled at a single work station having all the plastic parts assembled at one time or produced in a single cavity is desirable. The steps of subassembly, final assembly, as well as inspection, and conveying of the various components from location to location in and about the manufacturing area are thereby eliminated. Prior art patents have disclosed various attempts to accomplish this.

U.S. patent application No. 615,603 filed in the name of Ernest F Kiraly, et al. on May 31, 1984 describes a razor with a blade having a slot. According to the application, the blade is permanently secured in the head portion of the razor and the handle and guard portion are molded integrally with the head.

British Patent 1,565,296 discloses making a unitary handle guard member and blade support and then attaching a z-shaped blade by upset rivets or the like to the support.

U.S. Pat. No. 4,489,626 issued Dec. 27, 1984 to Lembke describes a razor manufacturing process in which a double edged strip of blade metal is parted along a center line and cropped to form two strips, each containing a series of spaced apart blades connected by webs to an elongate backing strip. The strip of razors must be modified before subjecting it to molding thermoplastic material around the blades. Each modified strip, which then consists of a plurality of blades and a backing strip, is fed into a molding machine in which either the shaving unit or blade-containing-component of a razor is molded directly around each individual blade. The web is then parted to release the molded razor, etc. from the backing strip. It is unclear, according to Lembke, how the remaining razor components are manufactured. It is apparent, however, that the molding process relies, in part, on the blade being supported by metal connecting elements, e.g., webs 18, 24, et al. Lembke, therefore, requires the handling of an elongated metal strip, its control and insertion in either a multi-cavity mold or a single cavity mold, and in either case a sequential step of separating heads joined together in a single strip. Conveyance of a metal web of the type described is extremely difficult when it is necessary to protect a delicate cutting edge and even more so when two cutting edges must be protected. Moreover, a subsequent operation of separating the molded razor heads from the continuous strip must be performed. Thus, the Lembke process cannot be used to effect insert molding of an independent single or twin blade unit while maintaining a desired blade geometry, especially in a high speed process which will accommodate unit production in conjunction with existing razor blade manufacturing lines. Moreover, the need to control the elongated metal strip in the Lembke technology makes it unattractive for manufacturing, and it is not presently conceivable how the Lembke procedure could be adapted to producing twin blade products.

Other patents disclosing molding a plastic razor head around a blade are U.S. Pat. No. 3,070,883 (Grathwohl); U.S. Pat. 2,789,246 (Algier, et al.); and U.S. Pat. No. 3,703,765 (Perez).

Co-pending patent application Ser. No. 042,493 filed Apr. 24, 1987 describes the concept of forming a center mandrel of thermoplastic material and utilizing the combination of the blade and the center mandrel as a template-male mold member for subsequent molding of a compatible cap and blade support. This was a first attempt to overcome the problems associated with blade unit assembly an resulting inconsistency in blade performance. Although the technology reported and claimed in this first predecessor application indeed improved the wet-shaving assembly product, there still existed a need to eliminate an additional process step and further stabilize blade contour and performance.

In continuation-in-part application, Ser. No. 088,368 filed Aug. 27, 1987, an improved process was set forth which includes 1) supporting the blade with the mold by "butting" it against a forked member and clamping the blade at notches along each side, 2) forming the unitary blade support means and covering means by introducing thermoplastic material into the mold, and 3) mating the unitary means with a handle. Once again, improvement was achieved in product and process, but in order to successfully manufacture high quality units consistently at a commercially attractive production rate, the inventors continued to refine the concept of maximum blade stability in a single (or minimal) step process. Thus, Continuation-In-Part applications, Ser. No. 165,859 filed Mar. 9, 1988, included the feature of protecting the "exposed" cutting edge of the blade in the method claim, and continuation-in-part application, Ser. No. 236,969 filed Aug. 26, 1988, is directed to a method which includes 1) supporting the blade within the mold on a forked member, 2) forming a unitary blade support and covering means, and 3) mating the unitary means with a handle.

While each of the above disclosures sets forth related techniques and products therefrom which are directed toward reducing the steps required to manufacture high quality blade assemblies consistently at a commercially-acceptable production rate, they do not appear to have provided the ultimate guidelines for adapting current blade production technology to an efficient method for high volume manufacture of shave-assembly units.

The present invention overcomes the problems described above which are encountered in known procedures, and results in optimum production of consistently high quality blade assemblies.

SUMMARY OF THE INVENTION

The present invention is a wet-shaving razor unit having at least one blade with an exposed edge for shaving which includes a substantially continuous thermoplastic body and wherein the blade is secured substantially rigidly against movement and vibration during shaving. The body includes skin-engaging portions which provide a constant shaving geometry over the length of the blade for cutting hair from the skin. The razor unit can also include a razor handle so that it is ready for use by the shaver upon removal from the mold. Alternatively, the razor unit can be a cartridge which is attached onto a handle held by the shaver. The present invention also provides a molding apparatus, along with a method for using the same, to produce the wet-shaving razor unit of the present invention.

In a preferred embodiment, the razor unit can also include a wet-shaving aid secured to a skin-engaging portion, such shaving aid having a skin lubricant which is lubricious when wet. Polyethylene oxide is an example of a shaving aid which provides a lubricant between the skin-engaging portion of the shaving unit and the skin. In order to provide the shaving aid described above, the shaving aid can be adhered to a skin-engaging portion or can be mechanically restrained against removal by stakes or tabs which are deformed to overlie the shaving aid and secure it against the skin-engaging portion. The shaving aid can also be incorporated into a skin-engaging portion of the wet-shaving unit. In a preferred embodiment, the shaving aid can be deposited in a cavity provided in the skin-engaging portion such as by sequentially molding polyethylene oxide as a thermoplastic material into the cavity after formation of the shaving unit.

The razor unit of the present invention can be manufactured by supporting the razor blade while simultaneously protecting the cutting edge of the blade within a mold for the unit. The thermoplastic material which forms the continuous body portion of the shaving unit is injected into the mold and is prevented from engagement with the blade edge by male mold parts which are arranged so that they do not contact the edge of the blade. In this way, the delicate edge provided on the razor blade is protected from damage during molding.

It is important to the present invention that the razor blade itself be supported during molding against deformation of the blade edge profile in the presence of extremely high pressure, even up to 20,000 psi without deformation. In concept and practice, the blade must be arranged to eliminate any unbalanced force sufficient to shear the thin metal, e.g., approximately 0.004 inch, or deform it. This has been achieved in the present invention by simultaneously providing mechanical buttressing such that the blade forms part of the male mold member against pressurized thermoplastic material, and equalizing the force of the pressurized material on both sides of the blade. Thus, the entire length and width of each blade is positioned to bear against the blade support mold member in such a way that either the mold itself is in direct contact with the blade surface or the pressurized thermoplastic material impinges on both sides of the blade substantially simultaneously to provide equal opposing force on the blade during molding. In order to achieve the unique process and product resulting therefrom and protect the fragile blade edge, the present invention includes the concept of utilizing the blade itself as a valve in conjunction with the male mold member to protect the edge and direct the flow of thermoplastic material.

In a twin blade system the male mold member includes additional finger mold elements which are interposed between the first and second blades. The second blade must be supported by the finger elements during molding just as the first blade is supported. Thermoplastic material must also be permitted to be injected between the first and second blades in order to secure the twin blade product against profile distortion and unwanted vibrational frequency response during shaving. A preferred embodiment of the invention also provides that mold finger elements extend through the rear of the unit to permit flow-through rinse slots in the final product. Moreover, in order to enhance the exquisite control required for such detailed molding, the present invention has provided for the use of the molded plastic to serve as a guide for accurate removal of male mold members so that efficient manufacturing can be implemented. This feature provides positive control over high speed removal of male mold members while preserving both blade edge and save geometry.

Another preferred embodiment of the invention provides that the mold include a continuous cavity to provide a handle of the wet-shaving unit as well as a connecting member to extend from the handle to the shaving head.

In yet another preferred embodiment, the shaving unit can be a flexible shaving cartridge for fixing on a shaving handle. The same concept will apply except that the thermoplastic material will be formed with a series of discontinuities over the length of the blade so that the cartridge will bend to conform to contours on the face.

In the case of providing a twin blade flexible shaving cartridge, other inventive concepts relating to accommodating parallel flexible blades apply to making the final product. For example, one end of each blade in the flexible twin blade cartridge can be made to be relatively free to move so that constant shave geometry is maintained over the entire length of the blade during flexing. Preferably, the opposite end of each blade is free to move. In one embodiment, this feature has been achieved by providing a slightly elongated opening through which one of two positioning pins is passed during molding. Inasmuch as the distance from the blade edge to the center line of the positioning holes (and pins) is critical to preserve shave geometry during fabrication, the opening must be elongated only in the direction parallel to the blade edge.

Furthermore, since the pressurized thermoplastic material must be quickly directed to both sides of the blade so as to impinge on the blade substantially simultaneously, the method of manufacturing also includes provision of a mold cavity channel which runs along the length of the mold cavity. Ports extend from the channel to selected openings in the cavity whereby thermoplastic material can be forced under pressure to the entire cavity substantially simultaneously. A further inventive refinement includes the provision of a plastic step in the channel against which a male mold surface will bear to remove the finished thermoset product.

The product, once set, can then be expulsed from the main mold cavity by a combination of process features. First of all, the entire molded product along with the excess plastic can be held in place by the plastic step referred to above, while one member of the mold is removed. Then other mold members can be removed to provide clearance for expulsion of the product. Substantially simultaneously, the plastic set in the gates through which the material was introduced is severed. Finally, the product is pushed out of the main mold cavity by mechanical pusher elements without damage to the finished edge. This series of events can be provided synchronously to efficiently remove each product unit.

In a preferred embodiment, an apparatus for insert molding a wet-shaving razor unit is provided. The apparatus includes a composite seat blade support having male mold members. The seat blade support provides a seat cavity portion which forms a flexible seat portion. The apparatus also includes cap-forming male mold portion which provides a cap cavity portion for forming a flexible cap. The cap cavity portion is in fluid communication with the seat cavity portion. The cap-forming male mold portion is sealingly engagable with the seat blade support. The apparatus further includes at least one alignment pin extending between the seat cavity portion and the cap cavity portion for receipt of a blade thereon and securement during molding. Finally, the apparatus includes at least one injection port in fluid communication with either the seat cavity portion or the cap cavity portion for injecting thermoplastic material.

As a result of the unique production method of this invention, a wet-shaving razor unit can be efficiently made by one-shot insert molding in a continuous process which can be fully automated. The resulting shaving unit has a blade or blades secured against vibration during shaving and aberrant frequency response is minimized. Furthermore, the inventive method allows the manufacturing of the shaving units to be integrated with existing razor blade production lines.

For a better understanding of the present invention, together with other and further objects, reference is made to the drawings along with the detailed description which follows.

BRIEF DESCRIPTION OF THE DRAWINGS

A brief description of the drawings are provided herein, but those skilled in the art will understand that other and further embodiments may be employed of which the preferred embodiments are representative.

FIG. 8 is a rear elevational view partially broken away along line VIII—VIII of the twin razor unit of FIG. 2;

FIG. 9 is a sectional view of twin blades supported in the mold for casting the thermoplastic razor unit of FIG. 2;

FIG. 9A is an enlarged partial view of the encircled detail 9A shown in FIG. 9;

FIG. 10 is a bottom perspective view of the twin blade flexible razor unit of FIG. 3;

FIG. 10A is a bottom perspective view of the twin flexible razor unit of FIG. 3A;

FIG. 16 is a perspective view of a molding apparatus in accordance with the present invention;

FIG. 18a is a perspective view of a twin blade flexible razor cartridge formed in accordance with the present invention;

FIG. 18d is a bottom plan view thereof;

FIG. 18e is a perspective view of a seat blade and a cap blade used in accordance with the present invention;

FIG. 19a is an exploded perspective view of several of the elements which form the preferred mold region;

FIG. 19b is a exploded perspective view of the additional elements which form the preferred mold region.

FIG. 23 is a partial perspective view of a gate tray;

FIG. 26 is an enlarged detail of FIG. 31;

FIG. 30 is a cross-section through the lower mold assembly showing the spacer bar tray in its inserted position and also showing a cap blade positioned in the mold region;

DETAILED DESCRIPTION OF THE INVENTION

The present invention involves the concept of providing a wet-shaving unit which can be conveniently and accurately manufactured with a constant shave geometry over the length of the blade(s). Moreover, the resulting product experiences little or no vibration during use. Manufacturing processes to date include the use of singly or multiply supported blades in combination with molding techniques and subsequent assembly techniques for providing the razor unit. The method disclosed herein, however, eliminates the need for molding separate parts, and then assembling them to form a razor unit.

In the "Microtrac" razor, where the cap, back and support structure are molded as a single unit, the seat portion has a center support connected to the back position of the seat by as many as 13 transverse ribs, which serve as leaf springs in conjunction with the fingered cap. Because the blades are held by springs and lugs at either end the blades tend to "chatter," i.e., vibrate during shaving. Furthermore, the support bar in the "Microtrac" configuration as viewed from the front is ramped downward to aid in blade assembly insertion in the premolded razor head. The bar only provides support at the apex of the ramp, which exacerbates this problem.

The wet-shaving razor unit of the present invention, however, anchors the blade to continuous thermoplastic body by, among other things, the plastic flowing through blade holes, and the unique insert molding scheme which integrates the blade into the male mold member itself. Consequently, the thermoplastic material injected into the razor-bearing mold, even up to pressures of 20,000 psi, is forced over and around the blade as if the blade were one with the mold. This results in a wet-shaving unit which has a smooth consistent edge profile and has minimal aberrant frequency response during shaving.

Figure 1:
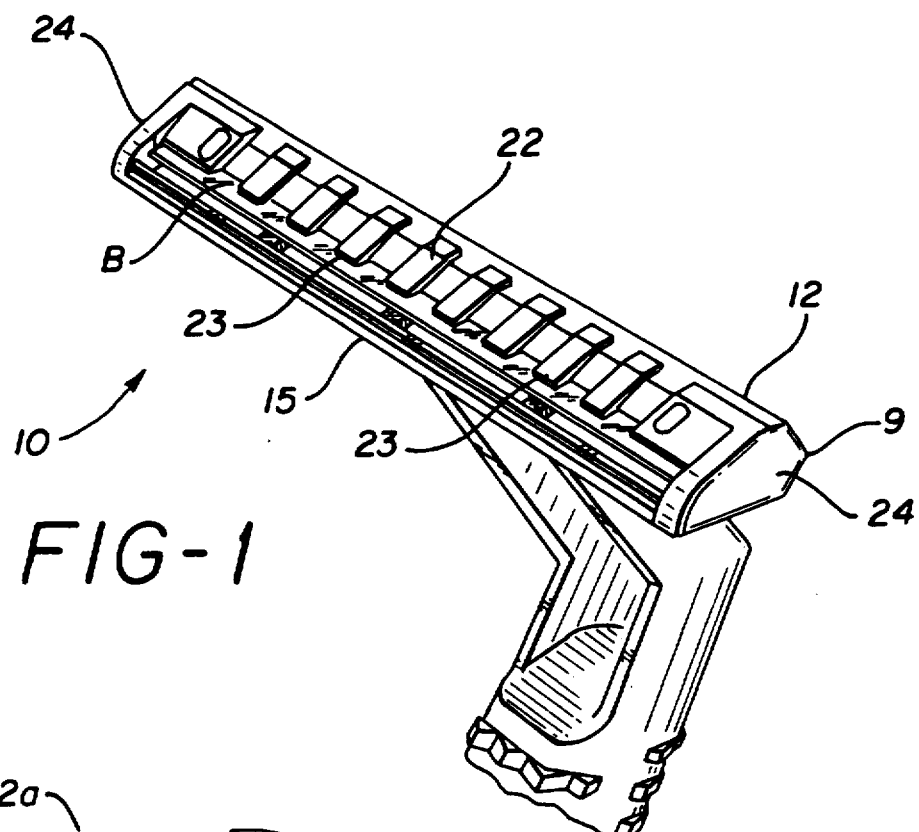
FIG. 1 is a front perspective view of the head of a single blade shaving unit prepared in accordance with the present invention.
Figure 1A:
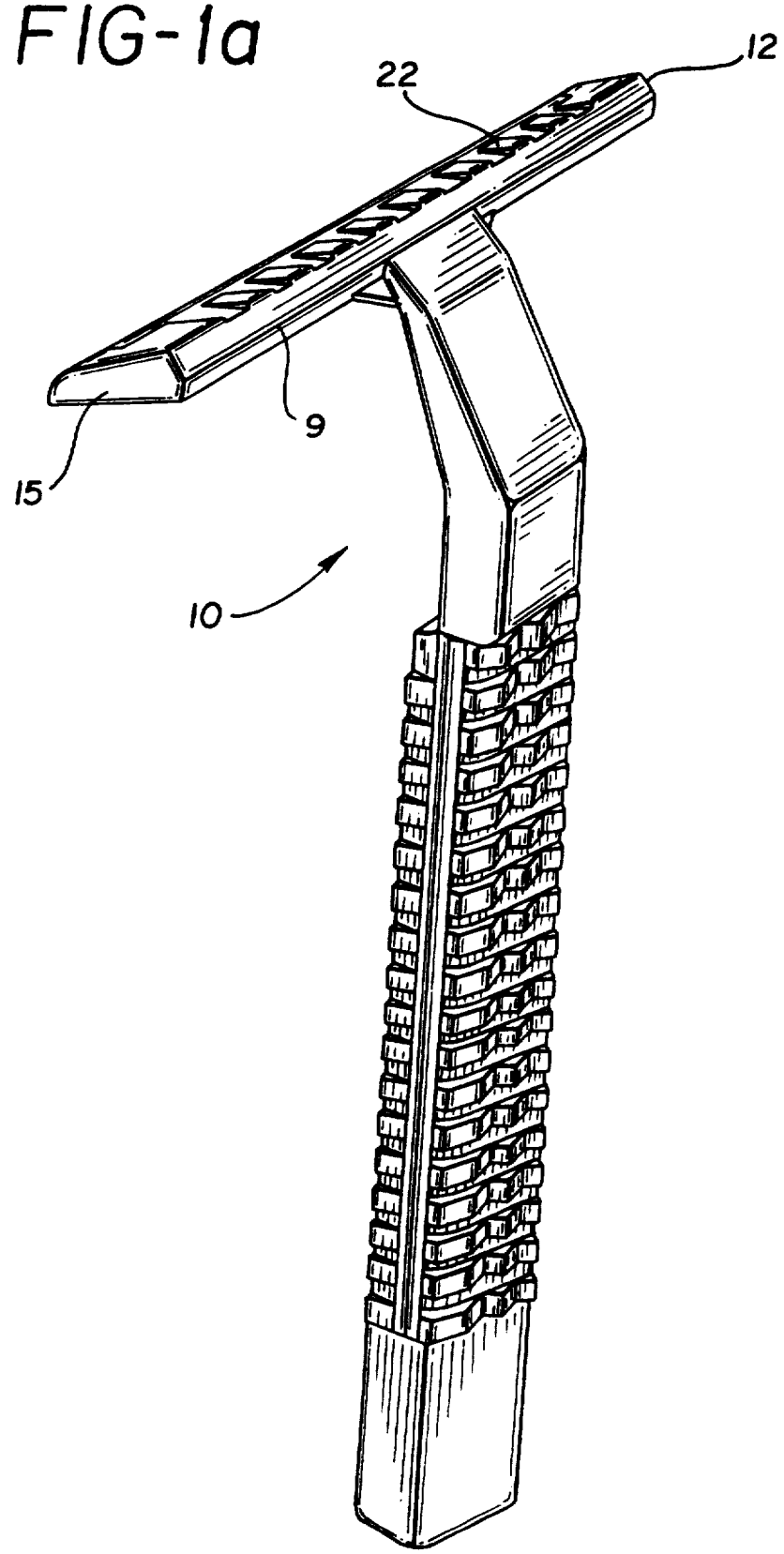
FIG. 1A is a rear perspective view of a whole shaving unit such as that shown in FIG. 1.

Referring to FIGS. 1 and 1A, a single razor unit 10 is shown which was made by a single-shot molding technique in accordance with the present invention. The head 12 has been molded along with the handle as a single unitary piece which includes a cap 22 attached to a blade seat 15 by a continuous thermoplastic body which extends around the rear portion of the blade B to form back 9. The continuous thermoplastic body also includes connecting thermoplastic tabs extending through blade slots to join the cap 22 to the blade seat 15. Furthermore, plastic anchors have been injected into blade openings thereby anchoring the blade securely against both longitudinal and lateral movement.

Figure 4:
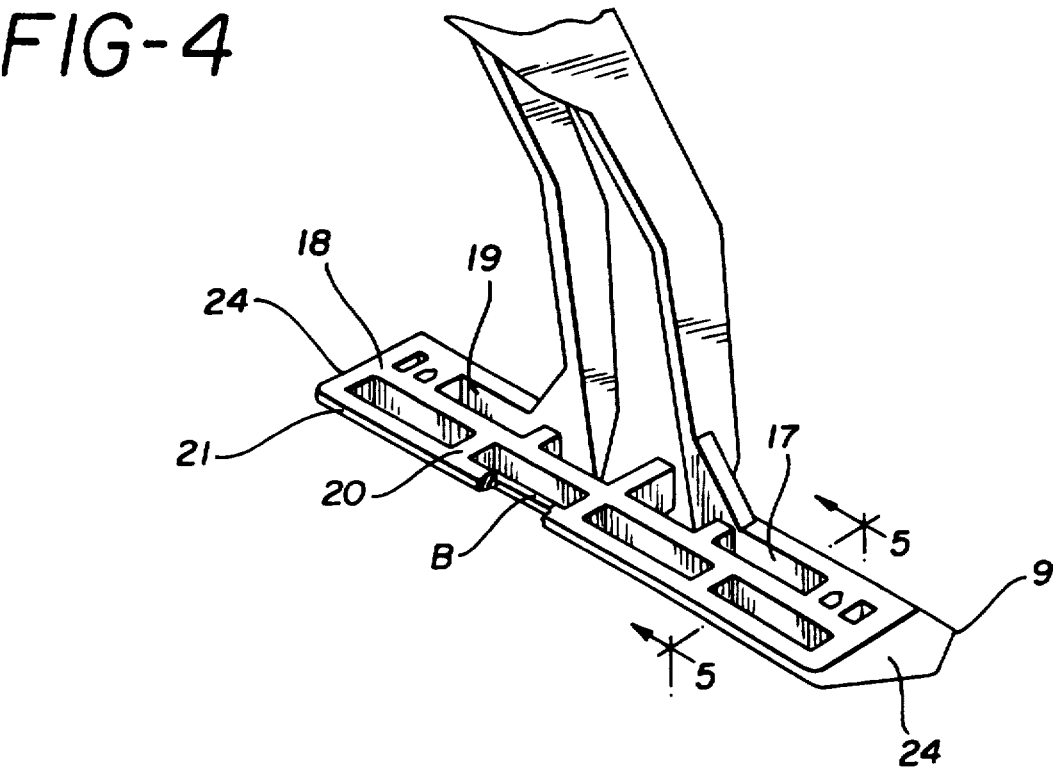
FIG. 4 is a bottom perspective view of the shaving head portion of the razor unit of FIG. 1.
Figure 5:
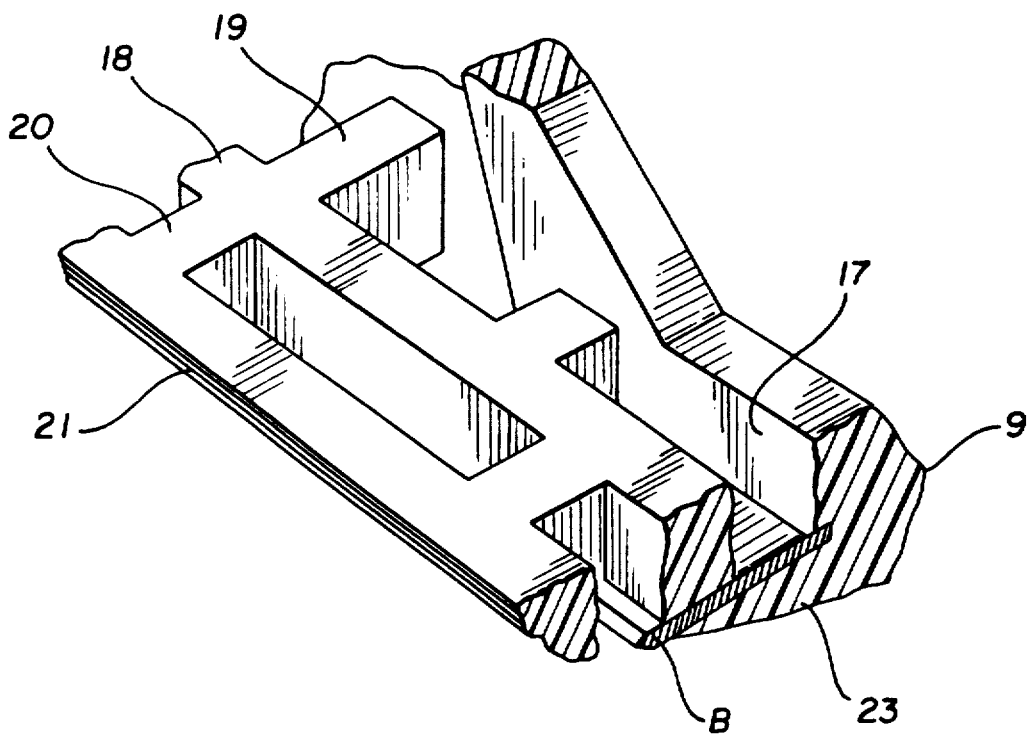
FIG. 5 is an enlarged perspective partially broken away taken along line V—V of FIG. 4.

Referring to FIGS. 4 and 5 in conjunction with FIG. 1, the blade support portion can be clearly seen as including a linearly extending rear bar 17 which forms the bottom of back 9 and is connected with a linearly extending support bar 18 by means of ribs 19. Progressing toward the front of the blade where the guard bar 21 is located, ribs 20 can be seen extending from bar 18 to the bottom of the guard bar 21. The back 9 of the razor head is a continuous body which extends from the blade seat 15 to the cap member 22. The cap 22 is formed with overbite securing fingers 23 and side members 24.

There are several factors which contribute to deficiencies in wet-shaving units which have been overcome by the present invention, one embodiment of which has been described above with reference to FIGS. 1, 1A, and FIGS. 4 and 5. One of the important factors in the present invention is the mechanical intimacy between the contacting surfaces of the blade and the plastic. If the blade and surrounding plastic are molded and act as a single unit with no space between the surfaces, vibration resulting from similar razor construction having even minute spaces between the contacting surfaces is eliminated.

The present invention provides this valuable blade-plastic intimacy. One important aspect of the invention is that the insert technique avails itself of the natural shrink occasioned by setting thermoplastic material. This provides a very tight package in the end product. As a further consequence of the natural shrink, the inventors can, and have been able to, engineer the precise edge profile desired. Once again, these phenomena can only be taken advantage of as a result of the insert molding process disclosed herein.

Another deficiency in blade characteristic which can be eliminated is that of deviation of the blade edge out of its designed profile. This deficiency has been referred to herein as blade distortion.

These deficiencies have been overcome in the present invention by providing a method and shaving unit product wherein the blade or blades are secured against any movement whatsoever during molding and afterwards by stable continuous support. In order to achieve this, the inventors had, in the past, provided minimal amount of blade seat body in the final product, replacing blade seat body (i.e. plastic) during molding with a supporting surface of the male mold member. It was reasoned that since the area and positioning of the support during molding protects the blade from distortion larger open areas in the blade seat as molded are preferred. To that end, it was disclosed in a commonly-owned co-pending application that the area of male mold support surface be about equal to that of the blade seat, about equal meaning that the open area formed from the support surfaces be between 40 and 60 percent and preferably between 45 and 55 percent of the total blade surface area. This phenomenon has been found to be effective, and high quality wet-shaving products having excellent rigidity with virtually no vibration during use have been made as seen in FIGS. 1, 1A (and FIGS. 4 and 5).

However, it has now been discovered that the required support required during the molding process can be provided by means other than contact with the surface of the male mold member. In particular, it has been found that if high pressure thermoplastic material can be provided equally on both sides of the razor blade during the instantaneous molding process, the blade will be adequately supported. That is to say that the blade itself will undergo no distortion whatsoever, and there will be even greater area of blade to plastic body securement to prevent distortion and vibration. Quite simply, the blade will be surrounded by a greater amount of continuous thermoplastic body on both sides. Moreover, the length of the blade extending forward from its point of securement is reduced so that any vibration resulting from forces against its edge are reduced.

Figure 6:
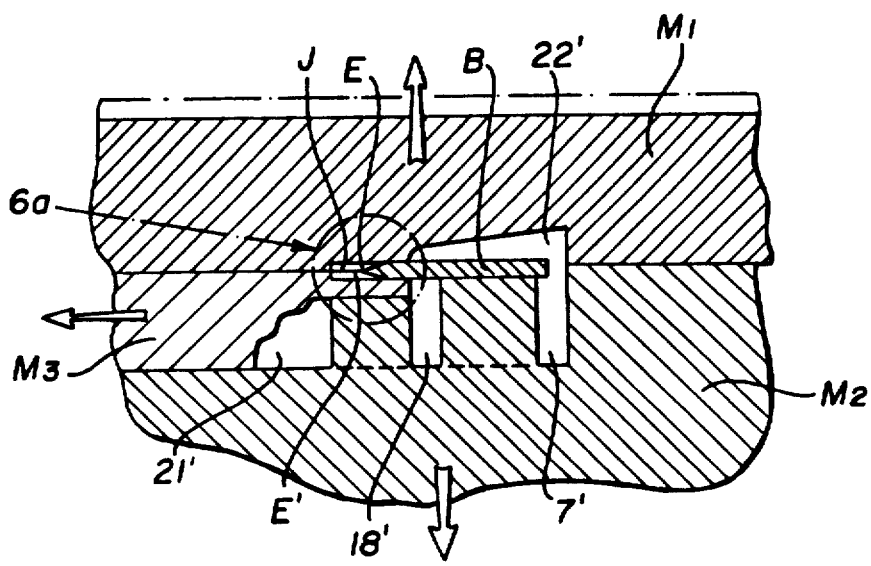
FIG. 6 is an elevated sectional view of the blade supported in the mold for casting the thermoplastic razor unit of FIG. 1.

FIG. 6 is a sectional view of the blade supported in the mold for casting the thermoplastic razor unit of FIG. 1. The area of the rear end of the blade which is secured by thermoplastic material is significant with respect to the entire width of the blade.

Figure 6A:
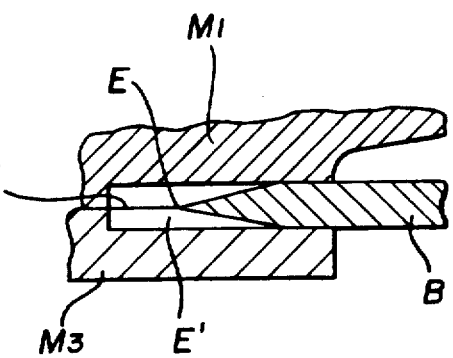
FIG. 6A is an enlarged partial view of the encircled detail 6A shown in FIG. 2.

FIG. 6A is a detail of FIG. 6 which shows how the molding techniques of the invention simultaneously provides protection to the edge E and permits equivalent force to bear against opposite blade surfaces at all times. In particular, the mold includes male mold members $M_1$, $M_2$, and $M_3$ with cavities 9', 18', 21' and 22'. The cavities are in fluid communication with each other, but the edge-protecting cavity E' is not in fluid communication with any other cavity. Specifically with reference to FIG. 6A, it can be seen that cavity E' ends by the joining J of male mold members $M_1$ and $M_3$. Consequently, when the blade B is fixed in the mold, the blade itself acts as a valve to cut off flow of thermoplastic material to the edge area of the blade thereby protecting its exquisite finish during molding. This is one of several key factors in achieving the very dependable high speed process and excellent product of the present invention.

Figure 7:
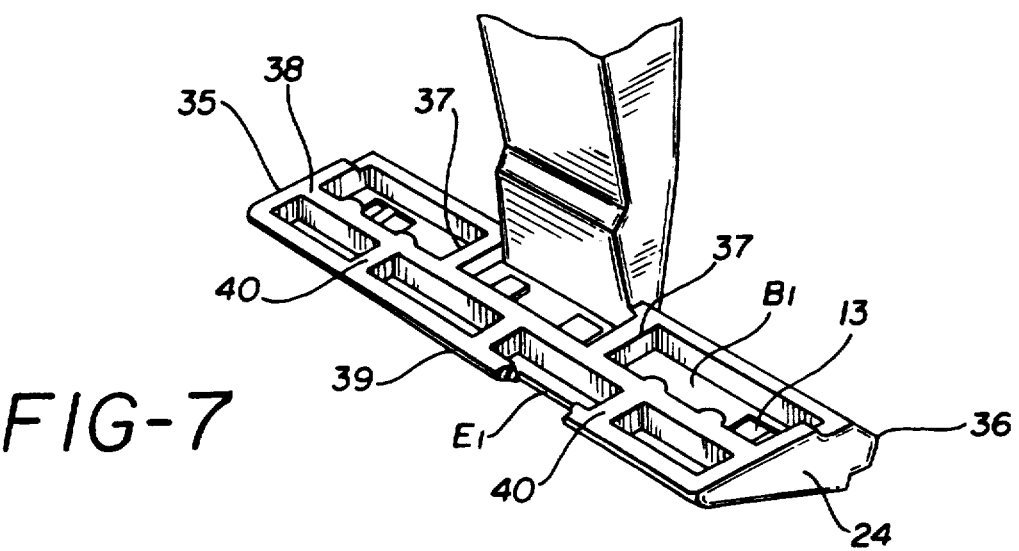
FIG. 7 is a bottom perspective view of the twin razor unit of FIG. 2.

Consequently, the blade will be mechanically buttressed during the entire molding process by the combination of male mold members and thermoplastic material under high pressure impinging on both surfaces of the blade substantially simultaneously during the molding process. In FIG. 7 the results of this technique can be seen. The combination of positioning anchors 13 and the use of the cap and cap fingers 22 extending in the direction of the blade edge beyond the cap seat, the blade within the head assembly is significantly rigidified. As a result of this invention, the blade B is highly secured against movement, and the shaving geometry is maintained to within a high degree of accuracy along the entire blade length. Applying the concept of the present invention to making razors has resulted in products which are quite superior in use, i.e., during shaving. Moreover, the molding procedure herein can be easily integrated in a manufacturing configuration with well known razor blade production methods and machinery. Once established, the present invention provides a very inexpensive method for continuous manufacture of consistently high quality razor units.

In the past it was found that in order to successfully mold a unitary cap and cover utilizing the blade as a portion of the male mold member, it was necessary to support the blade against the forces generated by inflowing thermoplastic material primarily by male support members. While this theory is true in and of itself, it has now been discovered that portions of the male mold support can be replaced by equal force of thermoplastic material on either side of the blade. This can be achieved by providing mold cavities on both sides of the blade combined with a delivery system whereby thermoplastic material under pressure is delivered substantially simultaneously to both sides of the blade.

In FIG. 4 it can be seen that a good deal of the mechanical support to the blade has been provided by thermoplastic material substantially equally distributed on both sides of the blade. The open areas of the ventral razor body illustrated in FIG. 4 represent those portions of a blade which are in direct contact with the male mold member during molding. Consequently, when using thin blade technology, the present invention permits significant reduction of the mass of the razor unit.

Figure 14A:
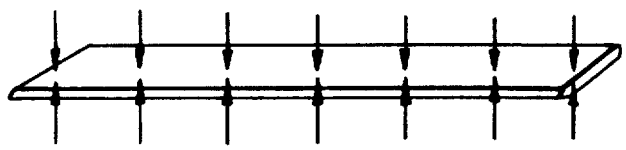
FIGS. 14A and 14B are diagrammatic representations depicting the mechanical requirements for the concept of the present invention.
Figure 14B:
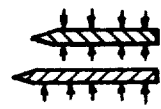

In concept, the blade should experience forces during thermoplastic molding diagrammatically represented in FIGS. 14A and 14B. The force vectors shown in this representation can be provided by male mold members and by thermoplastic material on either side of the blade substantially simultaneously injected thereabout by the injection molding procedures of the present invention.

Figure 2:
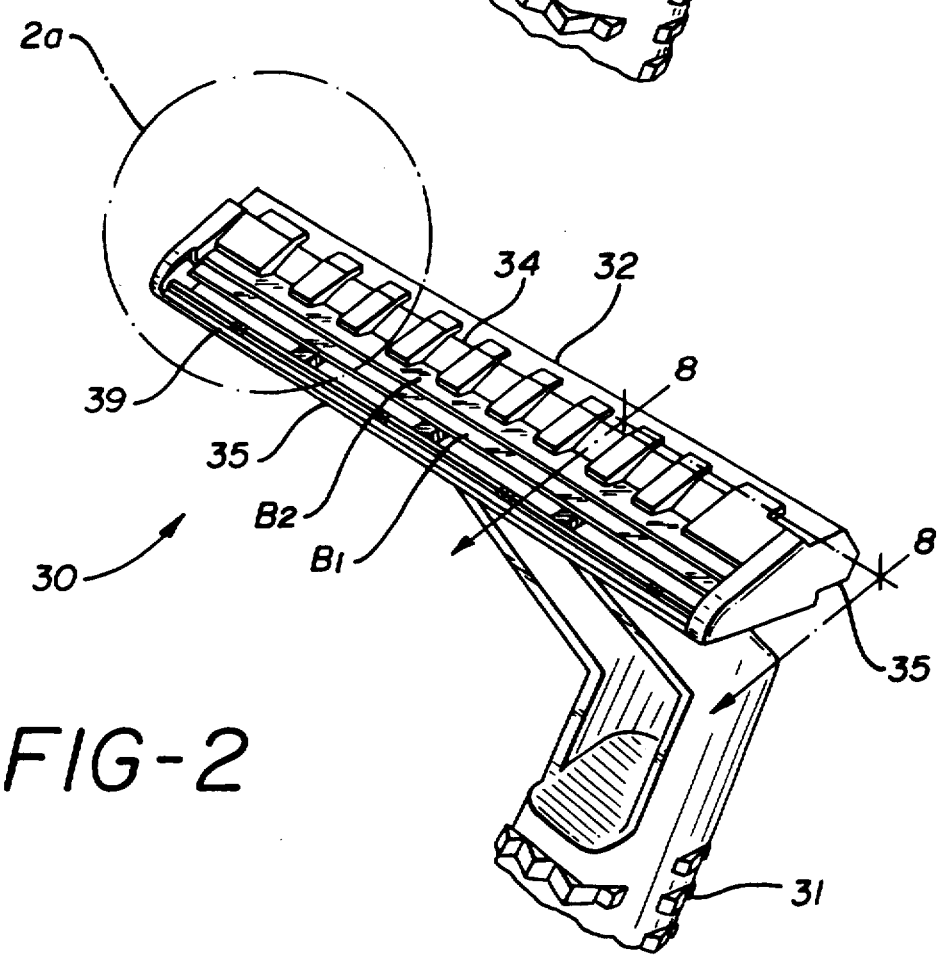
FIG. 2 is a front perspective view of a shaving unit with twin blades prepared in accordance with the present invention.

Referring now to FIG. 2, a twin razor unit 30 is shown in which the head portion 32 is injection molded and has been subsequently attached to the handle portion 31. There are two blades a seat blade $B_1$ and a cap blade $B_2$ arranged in the shaving head 32 between the cap 34 and seat 35 in a constant shave geometry over the entire length of the twin blades. Referring to FIG. 7 along with FIG. 2, the seat 31 can be seen having a rear portion 36 connected to a middle bar 38 by ribs 37, and the guard bar 39 is connected to the middle bar 38 by ribs 40. Referring to FIG. 8, an additional feature, which can be provided in accordance with the present invention, is a flow-through feature provided by rinse slots 42 extended from front to rear of the blades and exiting from the back 41 so that water and debris resulting from shaving can be rinsed therethrough.

The principles and the concept of molding set forth hereinabove with respect to the single blade system is equally applicable to the twin blade system. However, the mold configuration for the twin blade system is more intricate. In particular, a mold support must be provided between the blades during molding preferably from front all the way to the rear male mold member so that the rinse slots are formed. The resulting structure also includes support fingers 47 (FIG. 8) between the blades.

As in single blade razor production, the concept for effecting an intricate twin blade shaving unit includes the use of male mold members and the delivery of high pressure thermoplastic material substantially simultaneously on both sides of the twin blade arrangement.

Referring to FIGS. 9 and 9A, a side elevational section of the mold is shown with the twin blades included for injection molding. It can be seen from this view that the edges $E_1$ and $E_2$ of the twin blades $B_1$ *and B2* are protected by male mold members $M_1'$, $M_2'$, $M_3'$ and $M_4$ which contact the blade somewhat removed from the edge and provide cavities $E_1'$ and $E_2'$ around the edges. The cavities $E_1'$ and $E_2'$ are closed at either end by the junction $J_1$, between male mold members $M_3'$ and $M_4$, and $J_2$ between male mold members $M_1$ and $M_4$.

Figure 12A:
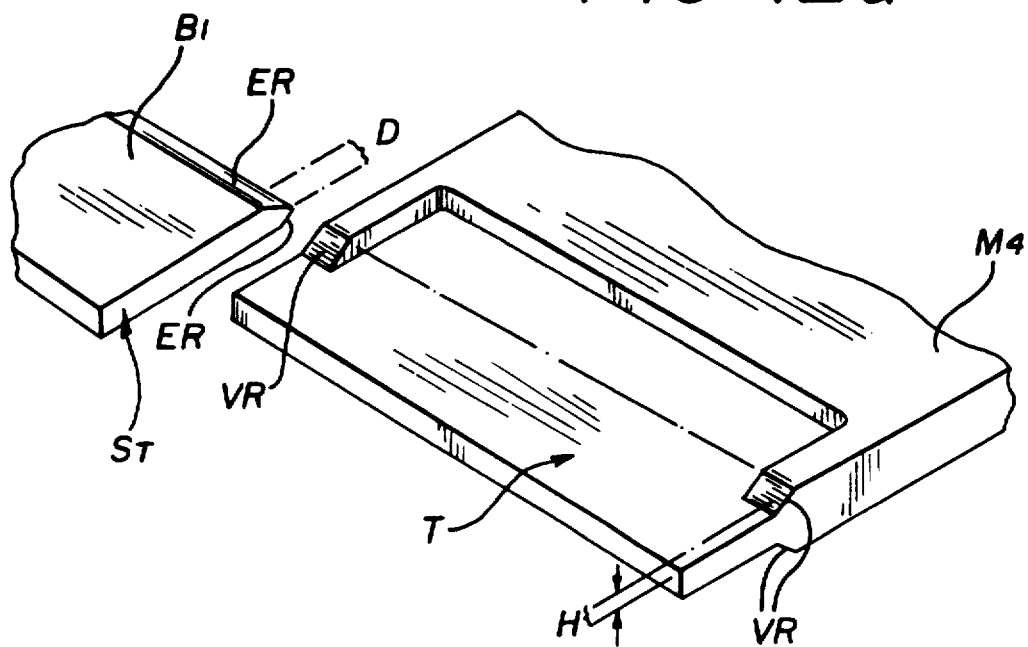
FIG. 12A is an exploded diagrammatic perspective view of the valving combination used to implement the present invention.
Figure 12B:
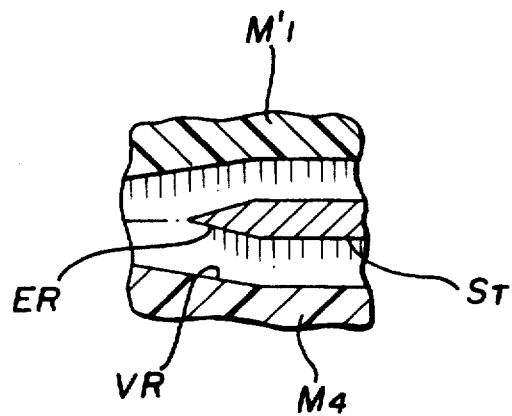
FIG. 12B is a representation of the valve mechanism provided by cooperation of the elements set forth in FIG. 12A.
Figure 12C:
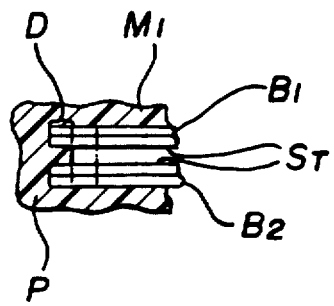
FIG. 12C shows the molded product in elevated partial cross-section which results from the valve mechanism of 12A and 12B.

The blades $B_1$ and $B_2$ themselves form valves which prevent the flow of thermoplastic material into the edge-protecting cavities. This concept is clearly illustrated in FIGS. 12A–C. FIG. 12A is an exploded diagrammatic representation of the male mold member $M_4$ and a blade $B_1$ which provides a valve to prevent flow of thermoplastic material during molding. FIG. 12B is an elevated side sectional view of members $M_1'$ and $M_4$ in spaced relationship before molding. Junction line $J_2$ is shown in phantom.

Member $M_4$ is formed with a center tongue T against which one surface $S_T$ of each blade is intimately contacted during molding. At each end on both sides of the mold member $M_4$ valve ramps VR are formed against which blade edge ramps ER bear during the molding procedure. The mold member $M_4$ is sized and positioned so that the blades extend beyond the end of the member $M_4$ a distance D which sufficient to secure the ends of the blades in thermoplastic material P. (See FIG. 12C). The member $M_4$ must be provided with exquisite detail since the dimensions are minute. For example, blades have a thickness on the order of only 0.004". Thus, the elevation H of the valve ramps VR is only about 0.002". Consequently, extreme care must be taken during molding to protect the exquisitely detailed member $M_4$.

Figure 2A:
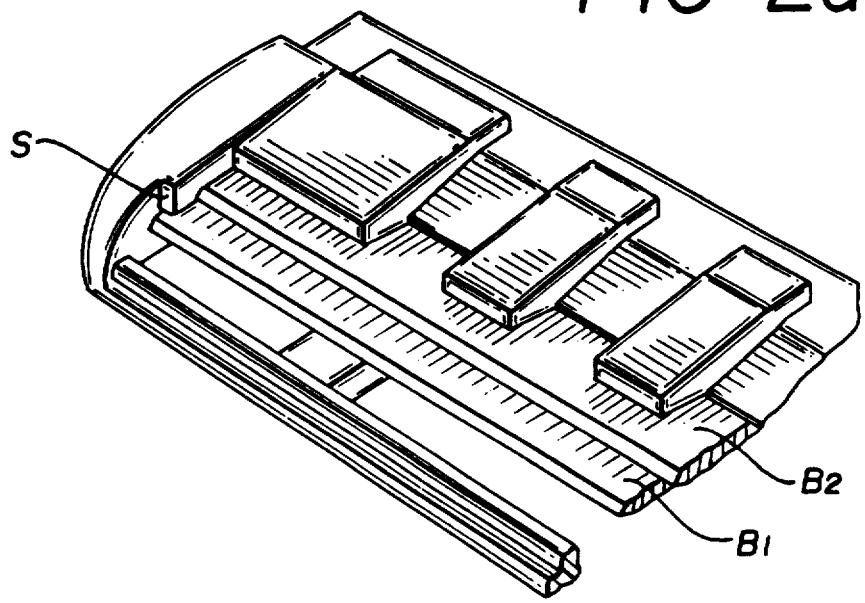
FIG. 2A is an enlarged partial view of the encircled detail 2A shown in FIG. 2.
Figure 2B:
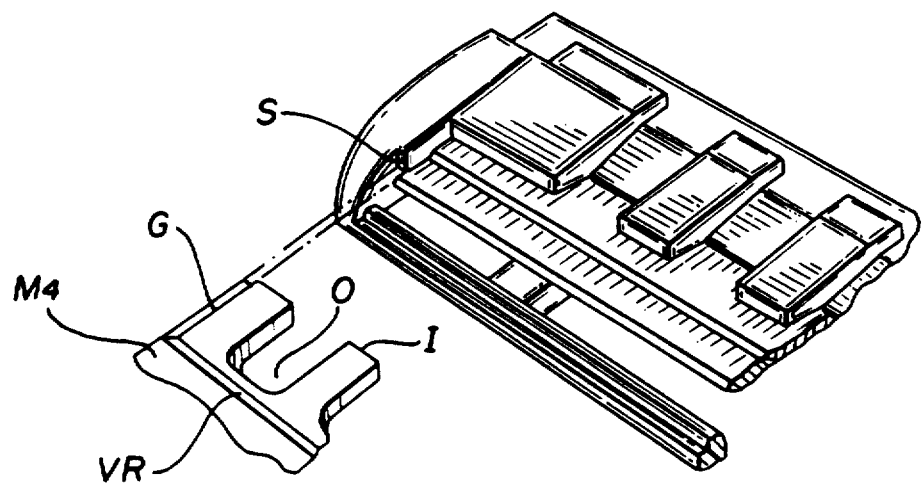
FIG. 2B is an exploded perspective view of the segment shown at 2A depicted with the male mold member in spaced relationship thereto as it is positioned between the twin razors during molding.
Figure 2C:
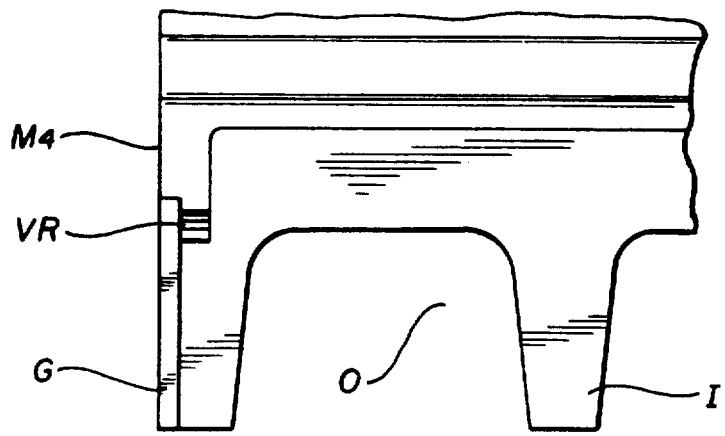
FIG. 2C is a partial plan view of the male mold member of FIG. 2B.
Figure 2D:
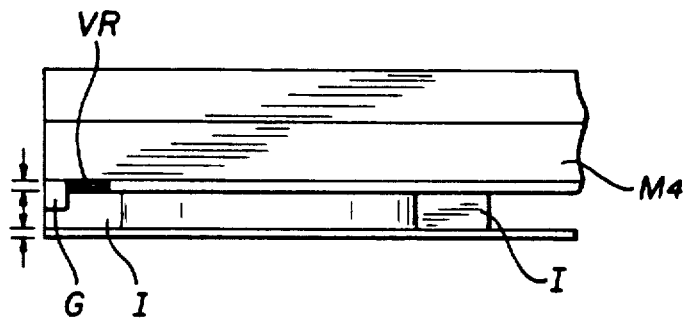
FIG. 2D is a front elevation view of the section shown in FIG. 2C.

The present invention accommodates this design feature by providing a positive guidance for mold removal. Consequently, high speed manufacturing can be used to produce the units. Referring to FIGS. 2A-D, this unique feature can be seen. In FIG. 2A a twin blade unit is shown in detail with a positive mold return step S between $B_1$ and $B_2$. This positive return step feature permits the member $M_4$ to be removed quickly and efficiently without danger of damaging the exquisite detail of the member. In FIG. 2B, the member $M_4$ is shown in an exploded view in spaced relationship to the completed shaving unit and in particular with respect to positive mold return step S. In this regard also refer to FIG. 2C which is a plan view of member $M_4$ and FIG. 2D which is a front elevational view of the member $M_4$. As can be seen with reference to these Figures, the positive mold return step S is provided by a guide channel G formed at the end of member $M_4$. Thus, when the member $M_4$ is removed at high speed, there is absolutely no vibration since the set plastic material includes the guide step S in intimate surface-to-surface contact with the member $M_4$ throughout the removal stroke. Moreover, all vibration between the blades $B_1$ and $B_2$ is significantly reduced or totally eliminated. This feature enhances the ultimate product, since it protects the fragile edges of the twin blades in addition to protecting the mold member $M_4$. In addition, it permits the expedient expulsion of the product from the main mold body.

More specifically, once sufficient male mold members have been removed to provide clearance for expulsion of the product, mechanical pusher elements are used to engage the product and separate it from the main mold cavity. Once again, as a result of the present insert molding technique, this can be achieved without damage to the blade edge because of the clearance provided therefor. Thus, the pusher elements bear against the product surface without contacting the finished edge.

Further with reference to FIGS. 2A-2D, it is noted that the tongue of the member $M_4$ has been provided with cut out sections O leaving inserts I which extend between the blades during molding. As a consequence of the cut out portion O, thermoplastic material is permitted to flow between the twin blades and form support fingers, e.g., 47. (See FIG. 8).

Figure 13:
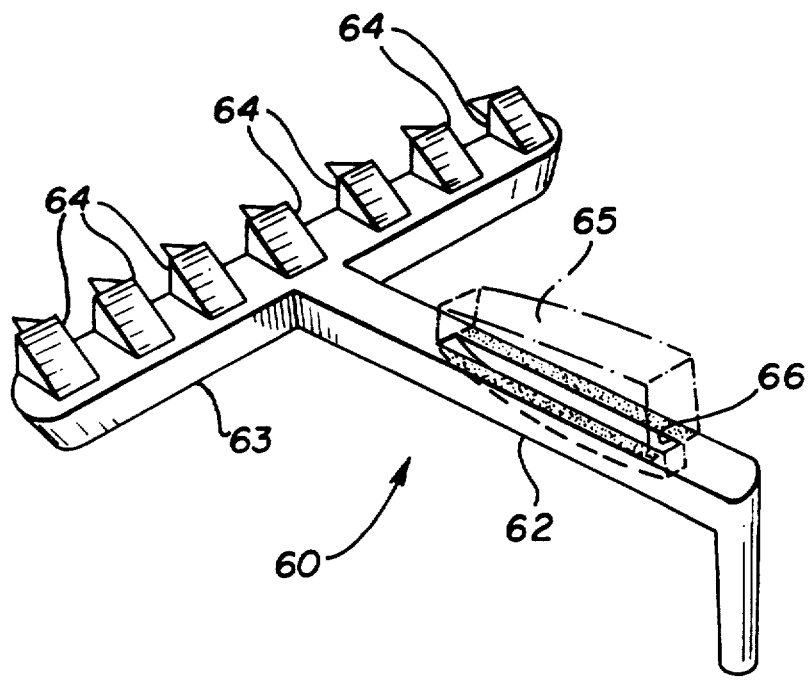
FIG. 13 depicts the portion of set plastic resulting from the access channel to the mold cavity and a portion of the male mold member used as a means of removal.
Figure 13A:
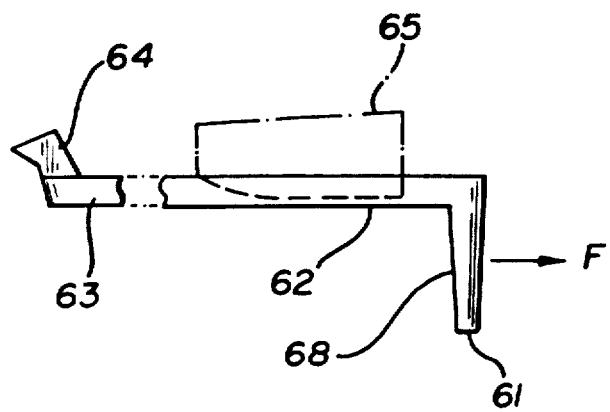
FIG. 13A shows the portion of a male mold member as it provides a removal means of the excess portion of a plastic shown in FIG. 13.

One very important element of the present invention is to provide high pressure thermoplastic material substantially simultaneously to both sides of the blades as they are supported in the mold. To that end, it has been discovered that a thermoplastic delivery system can be arranged along the entire length of the blade with delivery ports conveniently placed for fluid communication between the delivery channel and the mold cavity. Referring to FIGS. 13 and 13A, an example of such a delivery system is depicted by showing the thermoplastic waste member 60 which results from the plastic which sets in the delivery system. FIG. 13 is a perspective view of the waste material having introduction point 61 which is where thermoplastic material is introduced from a high pressure delivery means. The material then flows through a connecting conduit which results in the formation of neck 62. The pressurized thermoplastic material then flows into a delivery channel which results in bar 6 extending along the length of the wet shaving unit. Finally, the material is directed into delivery ports at selected areas along the length of the mold cavity. The setting of the thermoplastic material in these individual delivery ports result in fingers 64.

After the thermoplastic material has become set, it must be removed from the finished shaving unit. Once again, in a high speed process, this can become problematic. However, the present inventors have discovered that the removal of the excess plastic resulting from the unique delivery system can be effected efficiently and at high speed by use of mechanical grabbing means in combination with a stabilizing male mold member. Referring to FIGS. 13 and 13A, such a member has been shown as mold wedge 65. Mold wedge 65 is interposed in the delivery channel (which forms in neck 62) thereby forming a stabilizing cavity 66 in the neck 62. After the thermoplastic material has set, a force F can be applied to the thermoplastic waste member 60, preferably along extension 68. This unique innovation provides for a quick and very effective waste-plastic removal technique which can be implemented at high speed without damage to the fragile wet shaving product.

While the embodiments shown herein depict the technology relating to formation of the razor head, the entire razor unit including the handle could be molded in one injection. Alternatively, the head could be molded and then attached by methods known in the art. In any event, the blades are held substantially rigid against vibrational motion and they are formed without any distortion in the blade profile whatsoever.

Figure 3A:
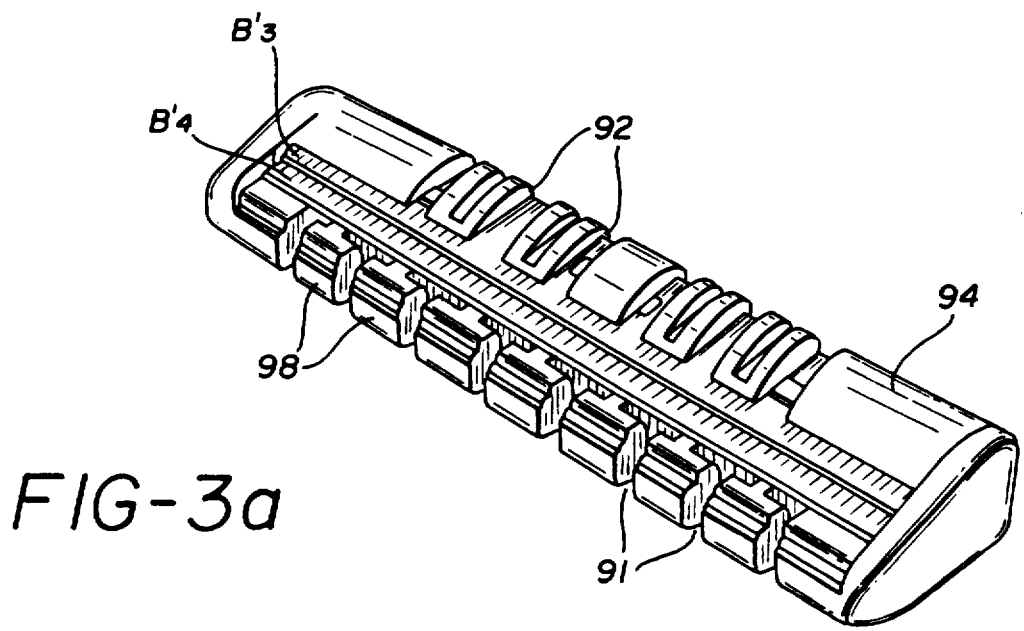
FIG. 3A is a front perspective view of a preferred embodiment of the twin flexible razor of the present invention.
Figure 3:
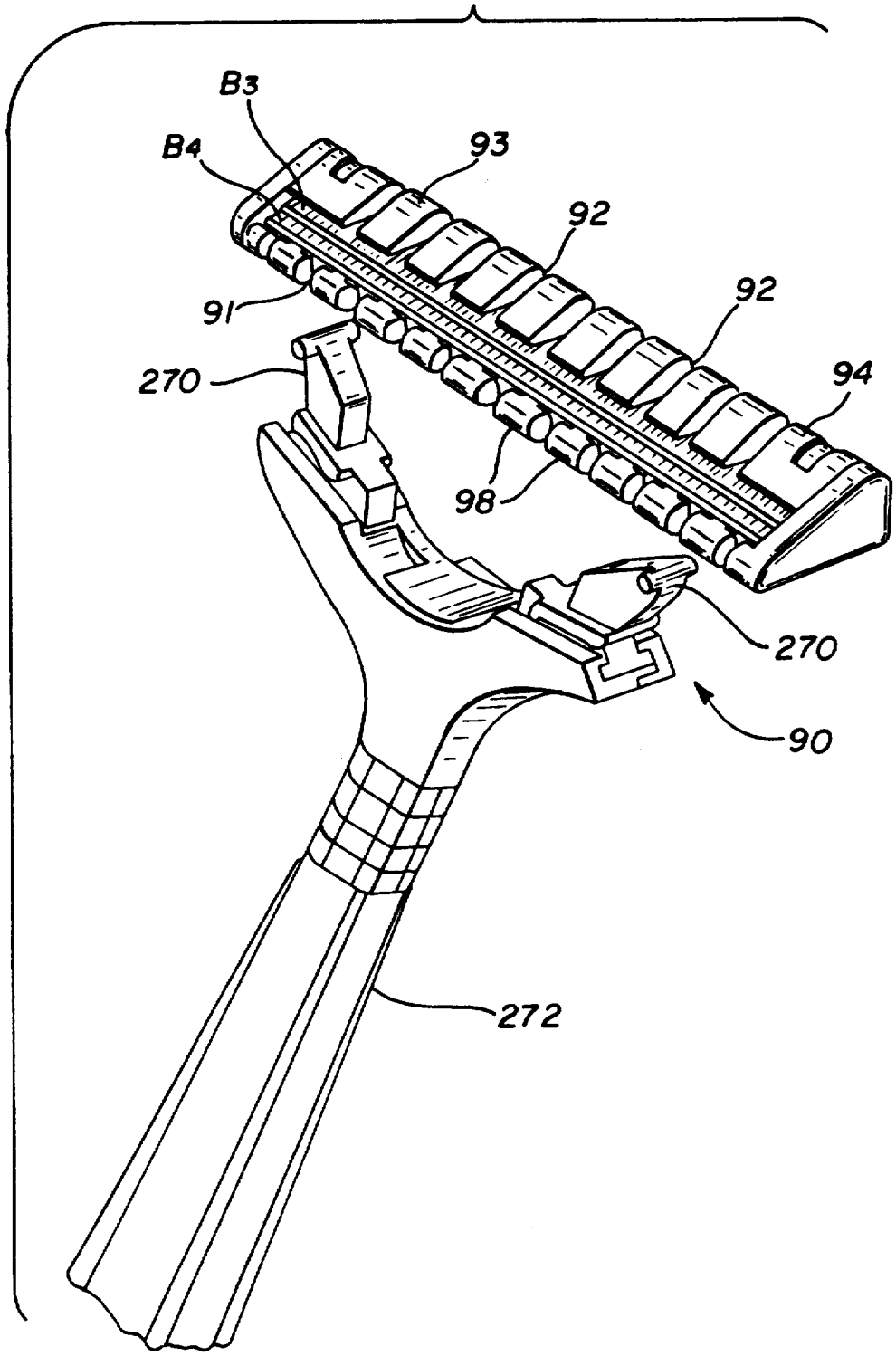
FIG. 3 is a perspective view of a twin blade flexible razor unit of the present invention.
Figure 11:
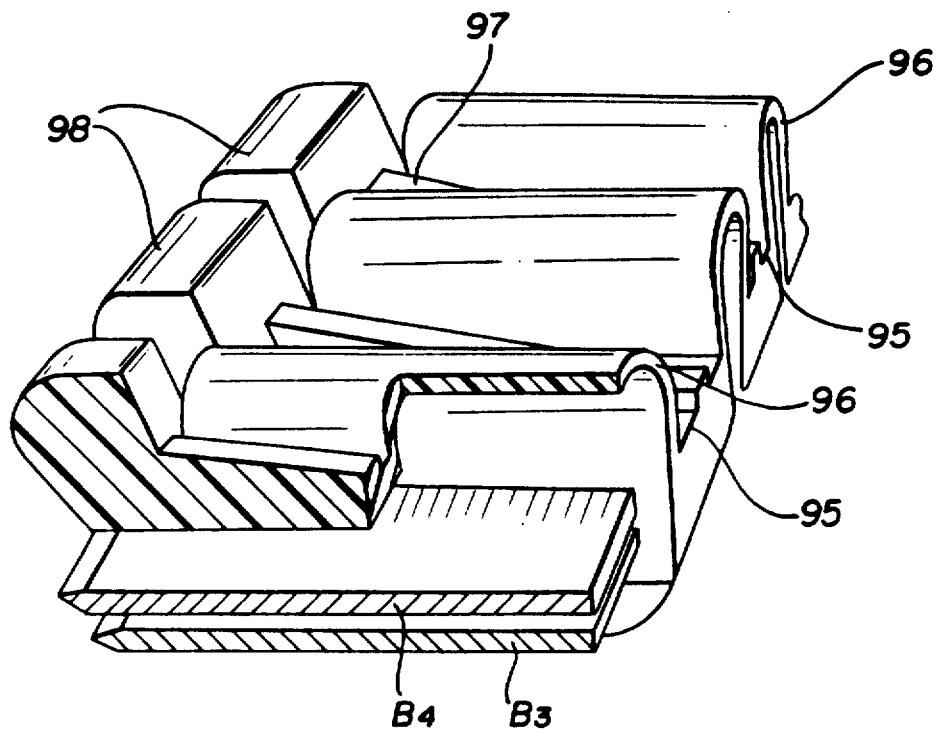
FIG. 11 is an enlarged fragmentary perspective taken along the line XI—XI of FIG. 10.

Yet another embodiment of the present invention has been discovered with respect to flexible shaving units. Referring now to FIGS. 3, 10 and 11, a twin flexible razor unit prepared in accordance with the present invention is depicted. The thermoplastic material provided in this embodiment is a solid substantially non-flexible material, which is inexpensive to acquire and easy to handle in molding processes. The flexible characteristic is provided by discontinuities 91 and 92 along the length of the unit. Referring to the figures, a twin blade system having a blade $B_3$ and a blade $B_4$ is shown with a multifingered cap having overbite fingers 93 and side tabs 94. The seat of the head assembly in the drawings is shown having support planks 95 in conjunction with sinusoidal webs 96 which form living hinges on the bottom portion of the twin blade system. The planks 95 are also provided with elevated ribs 97 which support at each end thereof guard bar elements 98. Discontinuities 92 are provided in the cap member, and the guard bar is segmented or provided with discontinuities 91 so that the unit is flexible in response to forces imparted to it during shaving. The advantage of this construction is that easily molded rigid thermoplastic material can be used to make a flexible shaving unit. Another preferred embodiment is again shown at FIGS. 3A and 10A wherein like members are provided with like numbers bearing a prime notation.

This flexible shaving cartridge can be single shot molded by use of a very intricate mold cavity utilizing the principles of alternating mechanical support by male mold member and mechanical support by thermoplastic material positioned on either side of the blades. Unique to the flexible cartridge shown in FIGS. 3, 10 and 11, is a flow through characteristic provided by the discontinuities in the back of the cartridge. Furthermore, the blades are supported and separated one from the other by means of support fingers that are positioned between the blades as a result of areas wherein there are no male mold support members.

Figure 15A:
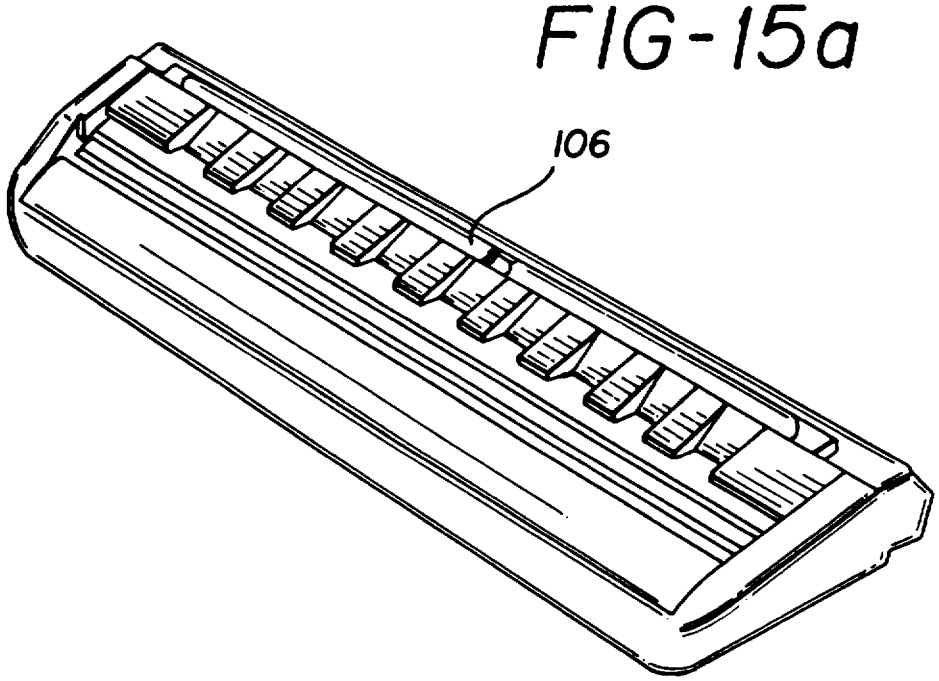
FIGS. 15A and 15B shows the embodiments which include a shaving aid.
Figure 15B:
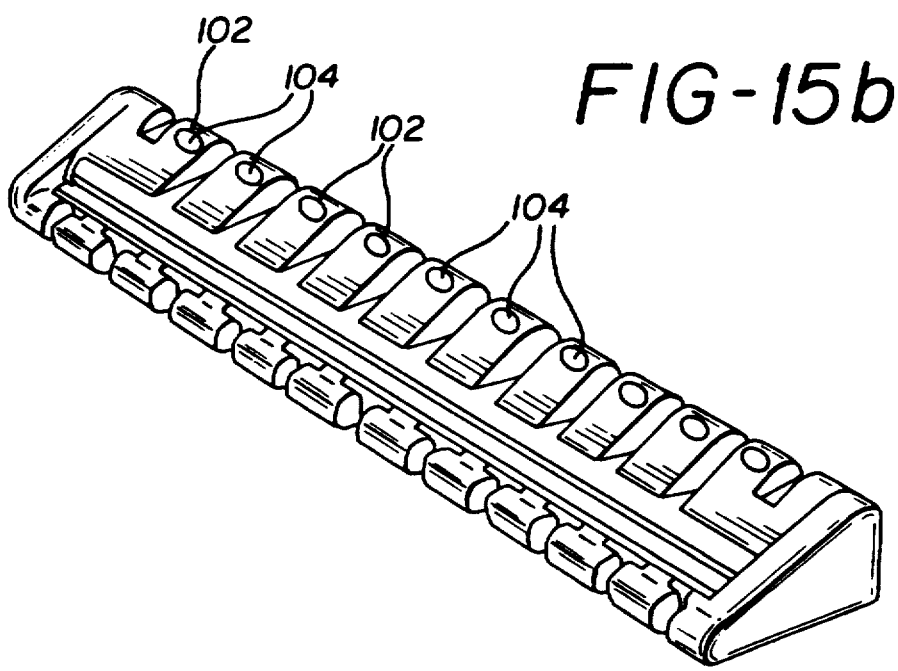

Referring to FIGS. 15A and 15B, the shaving aid feature of the invention is shown. This feature can be provided as spot cavities 102 (along either the guard elements or the cap elements) wherein shaving aid material 104, such as polyethylene oxide, polyurethane-polyvinyl-pyrrolidone interpolymer, etc., is deposited. Otherwise, shaving aid composition can be incorporated in the skin-engaging surfaces of the assembly or coated or adhered to such surfaces as, for example, a strip 106 shown in FIG. 15A. In any case, the skilled artisan will be able to decide which skin-engaging surface(s) he or she wishes to use to deliver the shaving aid.

In a preferred embodiment of the present invention, a molding apparatus 108 is provided. As shown in FIG. 16, molding apparatus 108 consists of a lower mold assembly 112 and an upper mold assembly 112.

Lower mold assembly 110 includes a lower mold 114 mounted on an upper surface of a base 116. Mounted to the lower surface of base 116 is a clamp block 118. Clamp block 118 is configured to be received by an opening contained in a mold vehicle (not shown). Clamp block 118 is inserted into the opening until the lower surface of base 116 contacts the upper surface of the mold vehicle. The mold vehicle includes a plurality of upwardly extending alignment pins that are received by alignment holes 120, thereby ensuring that lower mold assembly 110 is properly positioned with respect to the vehicle.

Base 116 includes a pair of actuators 122, 124. Each of the actuators engages a cam means contained within base 116. In turn, the cam means engage a plurality of slidably-mounted mold elements, as discussed below.

Lower mold 114 includes a pair of opposing alignment holes 126. Alignment holes 126 are positioned to engage a pair of downwardly extending alignment pins 128 mounted on upper mold assembly 112. When lower mold assembly 110 is moved upward, alignment pins 128 engage alignment holes 126, thereby ensuring that the mold assemblies are properly positioned with respect to each other.

Figure 17:
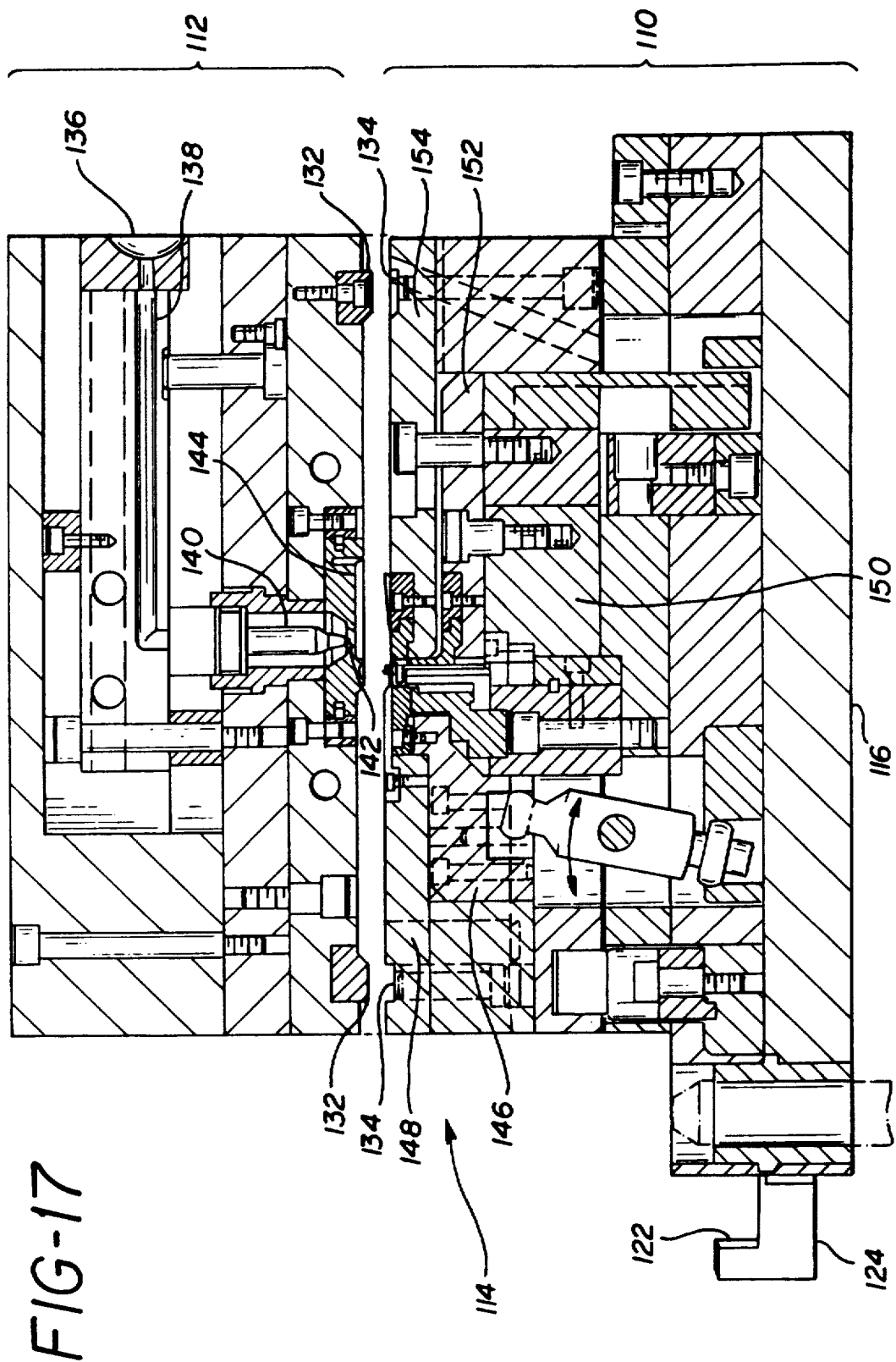
FIG. 17 is a cross-section thereof taken along line 17—17 of FIG. 16.

Upper mold assembly 112 is fixedly attached to a support structure (not shown) and is initially positioned by means of alignment holes 130 that engage alignment pins on the support structure. Turning now to FIG. 17, upper mold assembly 112 also includes a pair of protruding ribs 132 that are positioned to be received by a pair of slots 134 formed in the upper surface of lower mold 114.

Upper mold assembly 112 is provided with a fluid inlet 136 in communication with a fluid passage 138. In turn, fluid passage 138 communicates with nozzle 140, which is positioned to force a fluid outward through outlet port 142. Outlet port 142 opens into a delivery channel 144. Delivery channel 144 has a cross-section configured in the shape of an "L" to facilitate automated removal.

Lower mold 114 includes a guard bar tray 146, a spacer bar tray 148, a post tray 150, a gate tray 152 and a cavity insert tray 154. Each of the trays is slidably-mounted with respect to base 116. Actuator 122 engages a cam means that moves guard bar tray 146, post tray 150, gate tray 152 and cavity insert tray 154, while actuator 124 engages a cam means that moves spacer bar tray 148. Guard bar tray 146 and spacer bar tray 148 are positioned on the blade edge side of lower mold 114 while post tray 150, gate tray 152 and cavity insert tray 154 are positioned on the opposing side.

FIGS. 18a-18d illustrate another embodiment of a twin blade flexible razor cartridge 156 formed in accordance with the present invention. Razor cartridge 156, although similar to the razor cartridge shown in FIGS. 3, 10 and 11, additionally includes a guard bar rail 158 that connects each of guard bar elements 160. Cartridge 156 also includes a pair of downwardly extending lips 161 on each side thereof.

Figure 18B:
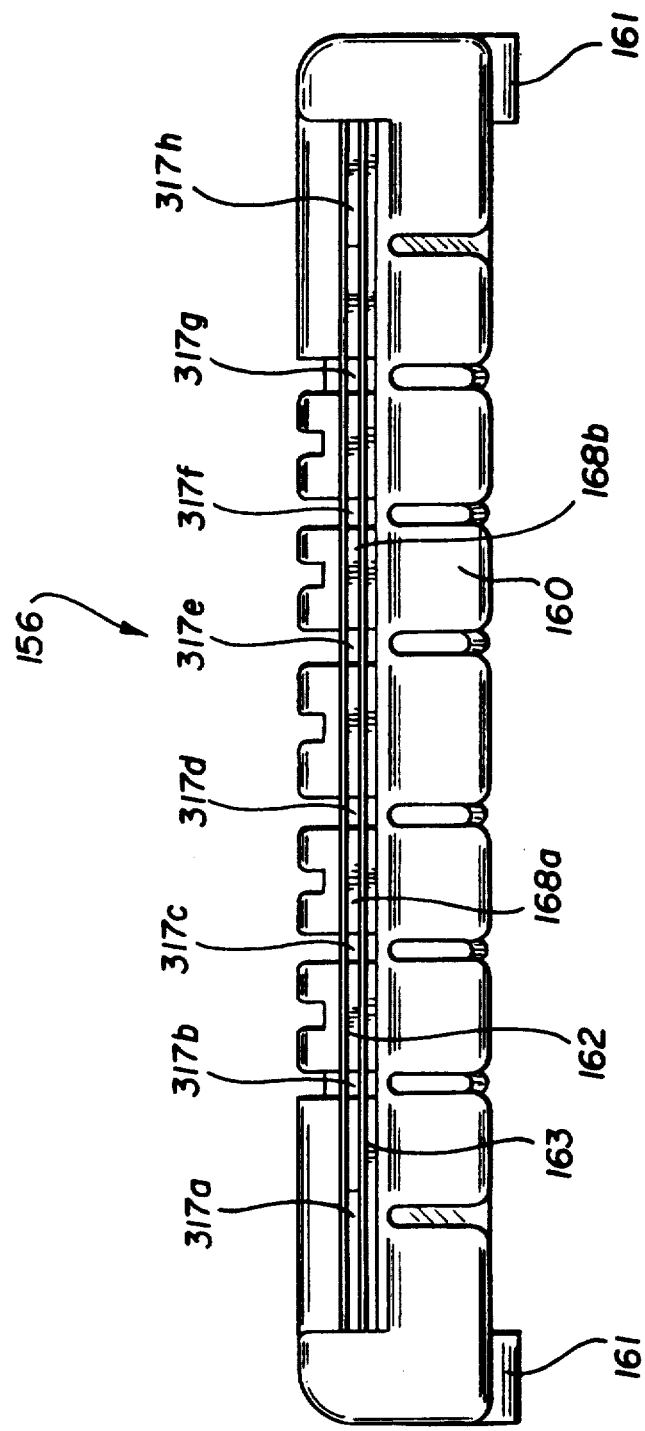
FIG. 18b is a front view thereof.

The two blades employed in cartridge 156 are illustrated in FIG. 18e. Blade 162, i.e., the cap blade, is of the same length as blade 163, i.e., the seat blade, but is of a smaller width. Each of the blades includes a rectangular opening 164 and a pair of alignment holes 165. When the blades are properly aligned, the two rectangular openings are aligned with respect to each other such that thermoplastic material may flow freely therethrough. In a preferred embodiment, cap blade 162 may include a pair of flow holes 166. Referring to FIG. 18a, holes 166 are positioned such that they are centrally located beneath overbite fingers 167a, 167b of cartridge 156. Holes 166 allow plastic to flow through cap blade 162, thereby connecting and securing overbite fingers 167a, 167b to plastic support fingers 168a, 168b (shown in FIG. 18b) which form between finger elements 260 of spacer bar 256. Cartridge 156 also has bridges 169a, 169b which connect overbite fingers 167a, 167b to the adjacent cap portions, respectively.

Figure 19:
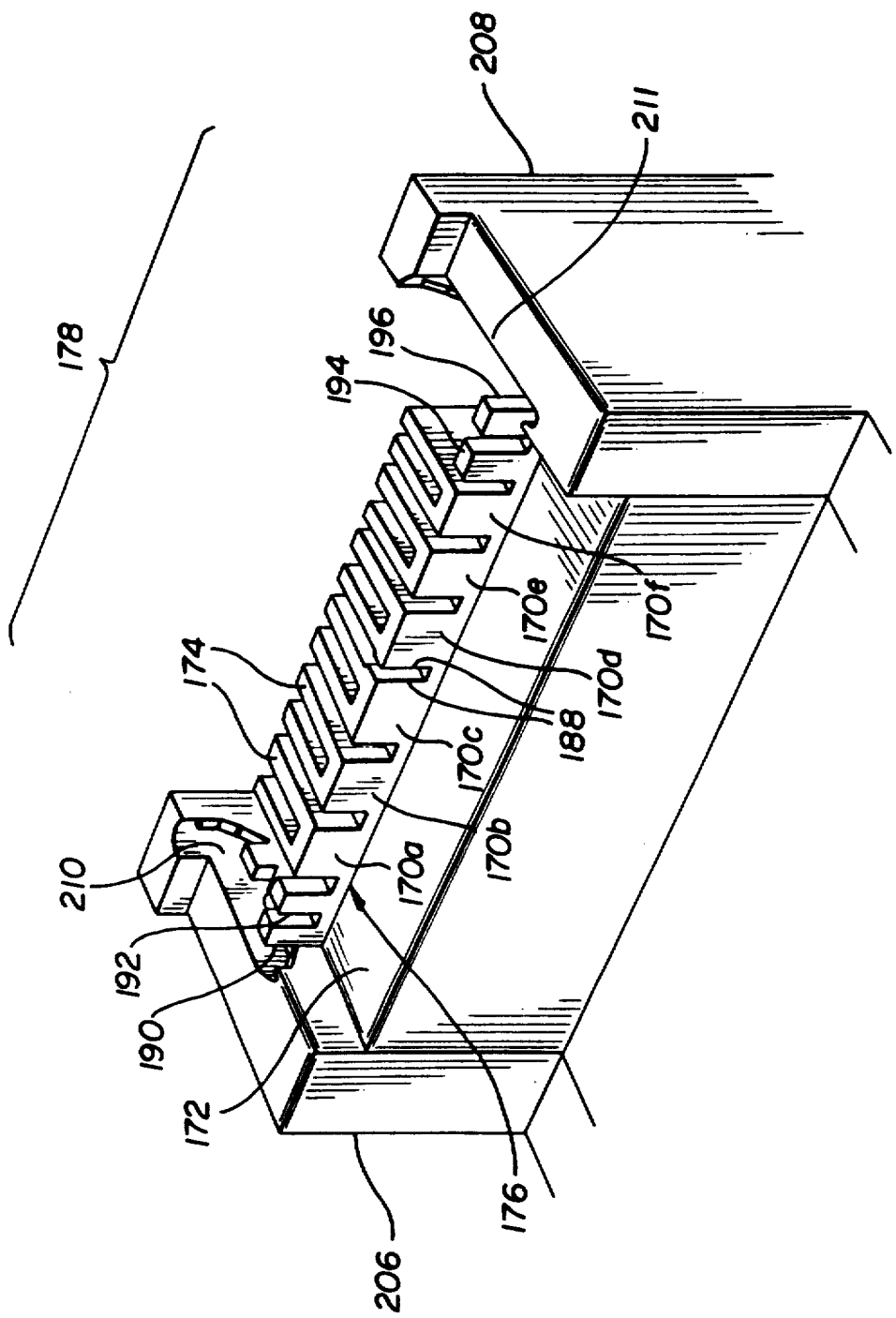
FIG. 19 is a perspective view of a mold region in which the razor cartridge is formed.

As shown in FIG. 19, lower mold 114 includes six "U-shaped" cavity blocks 170a-170f attached to a surface 172. Surface 172 is fixed with respect to base 116. Cavity blocks 170a-170f have an upper surface 174 and a lower edge 176. The 6 U-shaped cavity blocks, which are positioned within a form 6 "U-shaped" cavities 180a-180f on the mold region 178, form 6 "U-shaped" cavities 180a-180f on the molded unit, as shown in FIG. 18d. Between each of the U-shaped blocks, a T-shaped member 182a-182e is formed. The "head" of the "T", i.e., guard bar element 160, is attached to a leg 184a-184e. Because the spacing between cavity block 170c and 170d is greater than the spacing between the other blocks, T-shaped member 182 is formed with an enlarged leg 184c, as also shown in FIG. 18d. A portion of enlarged leg 184c has a reduced cross-section, i.e., a neck 186, which is formed by shoulders 188 of cavity blocks 170c and 170d. Also attached to surface 172 are blocks 190, 192, 194, 196 which form cavities 198, 200, 202, 204, respectively.

Positioned on either end of old region 178 are mold blocks 206, 208. Mold block 208 is a mirror image of mold block 206. Each of the blocks includes a mold cavity 210, 211 which form the lower halves of end caps 212, 214, as shown in FIG. 18a.

Figure 19C:
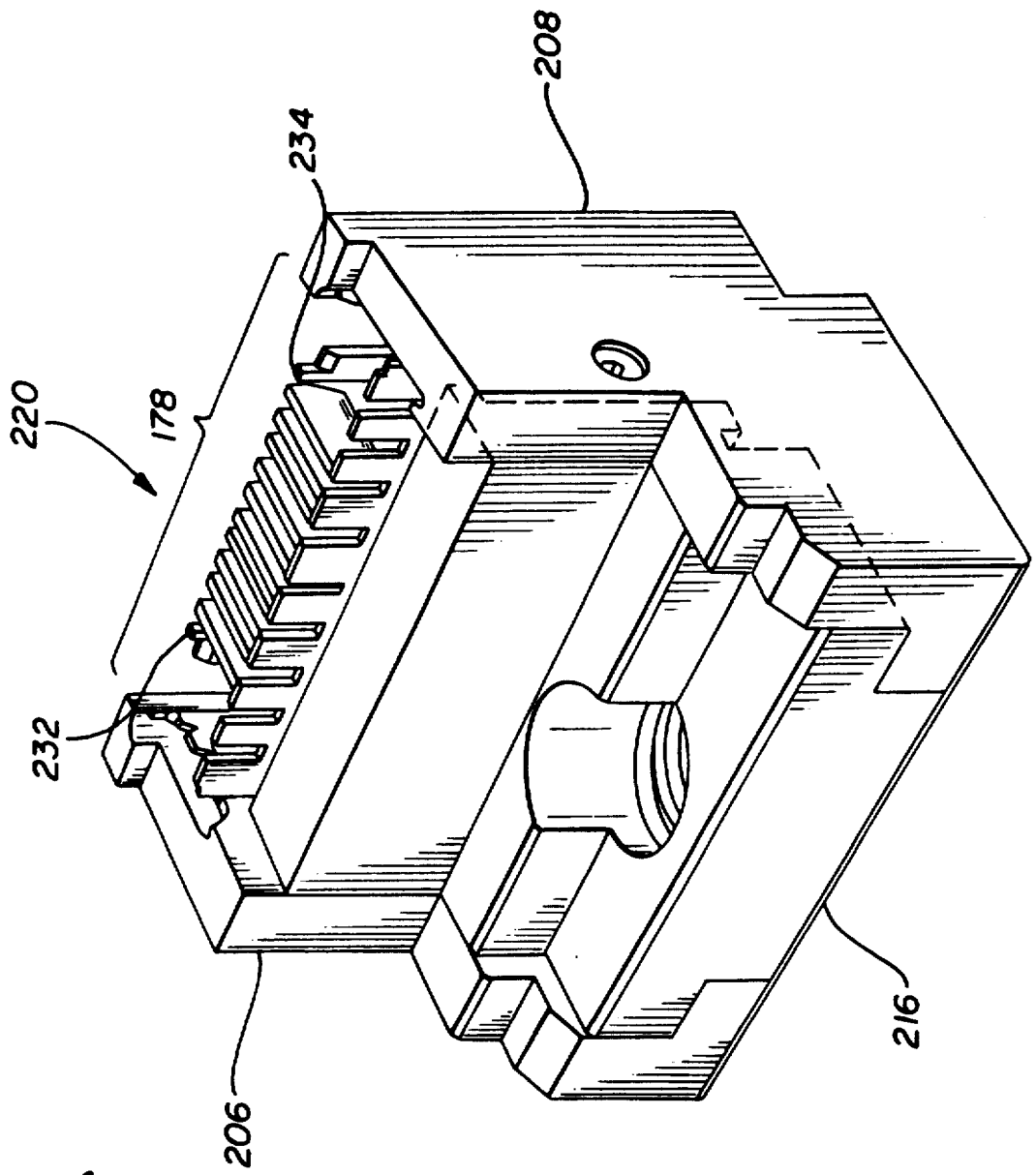
FIG. 19c is a perspective view of the preferred mold region.

As illustrated in FIGS. 19a-19c, a preferred embodiment of mold region 178 results from the combination of several intrically-cooperating mold elements. In particular, mold blocks 206, 208 are secured to opposing ends of a member 216. Member 216 includes surface 172 described above. A notched member 218 having tabs 219 is positioned behind member 216. Tabs 219 form the middle portion of each of the cavity blocks, thereby connecting the two side portions of each block and, hence, forming the "U".

A J-shaped member 220 having fins 222 is illustrated in FIG. 19b. Fins 222 form the side portions of the cavity blocks. J-shaped member 220 includes a rectangular slot 224 which is dimensioned to allow a center support rail 226 (see FIG. 22) to be slidably inserted therein. A cover 228 is attached to surface 230 of member 220, thereby enclosing approximately the upper one-half of slot 224. Cover 228 includes fins 232, 234. Fins 232, 234, together with fins 237, 238 located on a post 236 (see FIG. 22a), form the "missing" side portion of cavity blocks 170a, 170f. The elements of mold region 178 are shown in their assembled state in FIG. 19c.

Figure 20:
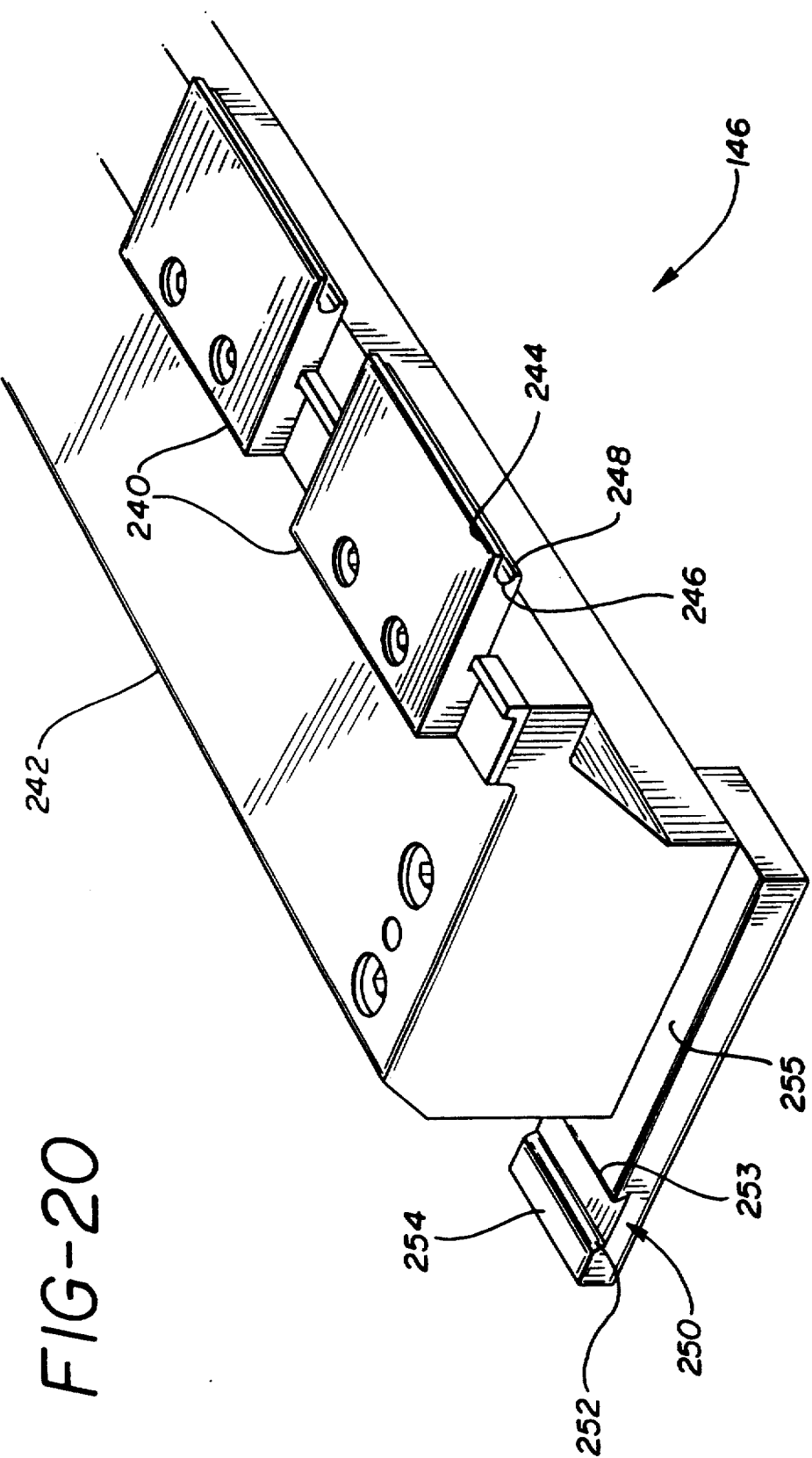
FIG. 20 is a partial perspective view of a guard bar tray.

Guard bar tray 146 illustrated in FIG. 20 includes a plurality of guard bar molds 240 secured to a tray 242 along the length thereof. Guard bar mold 240 has an upper lip 244, a "C-shaped" mid-portion 246 and a lower lip 248. C-shaped portion 246 includes a mold pattern that forms guard bar rail 158 and guard bar element 160. Additionally, tray 242 has a slot 250 running the length thereof. Slot 250 includes a chamfer 252 and an edge 253. Chamfer 252 adjoins a surface 254 and edge 253 adjoins a surface 255.

Figure 21:
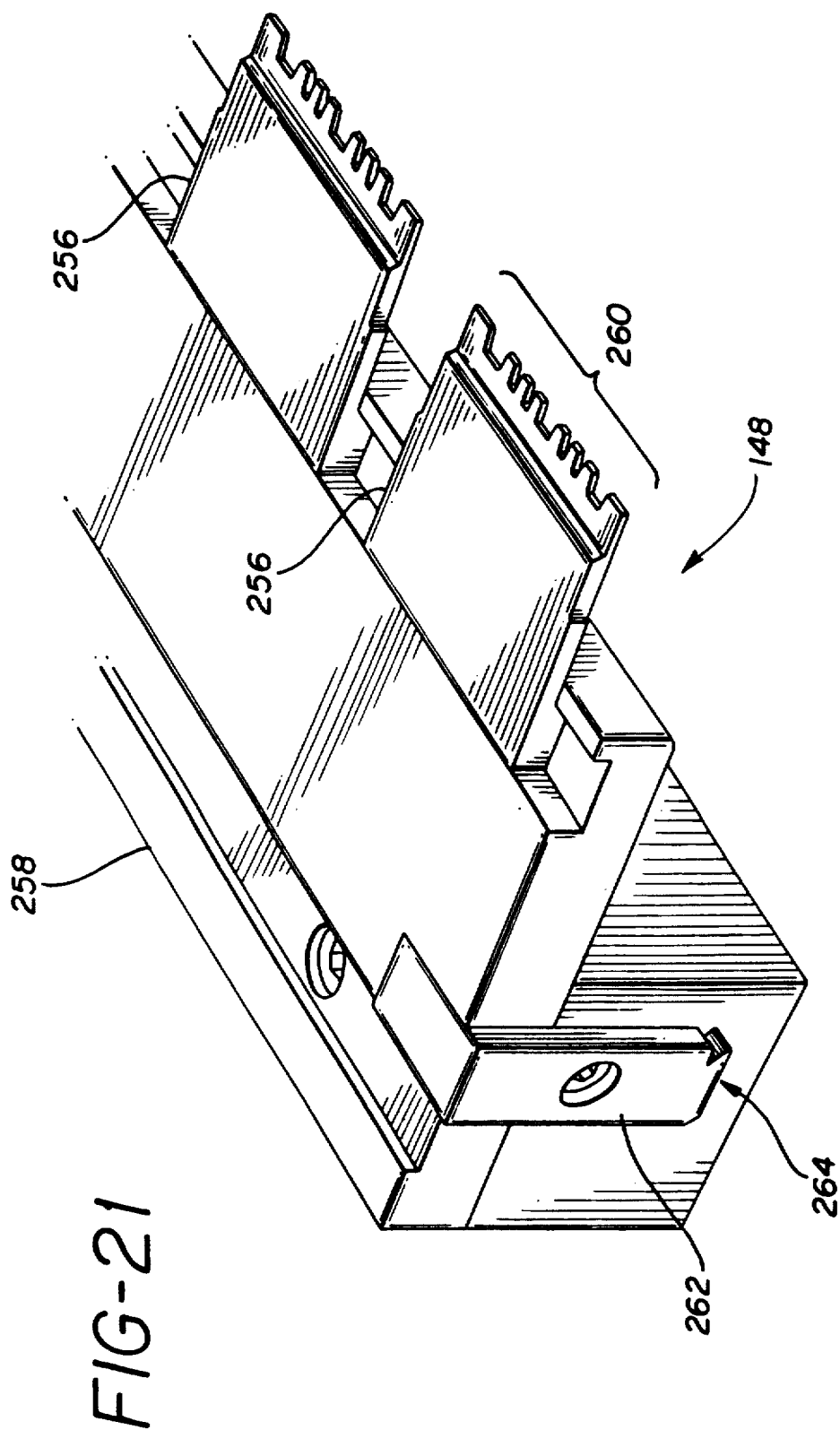
FIG. 21 is a partial perspective view of a spacer bar tray.

Spacer bar tray 148, as shown in FIG. 21, includes a plurality of spacer bars 256 secured to a tray 258 along the length thereof. Each of the spacer bars has a plurality of finger elements 260. Spacer bar tray 148 also includes a pair of downwardly extending legs 262 each having a foot 264.

Figure 22:
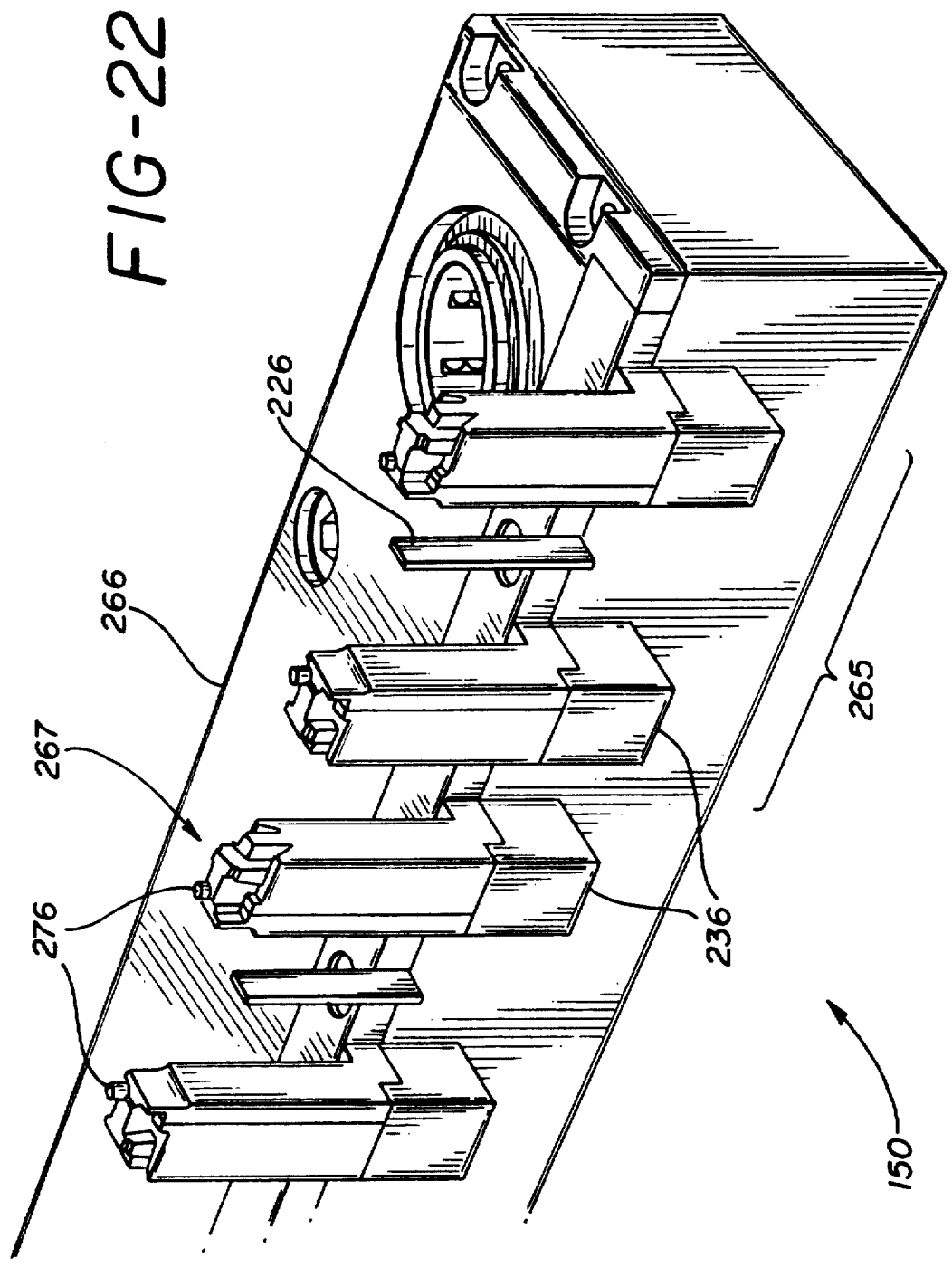
FIG. 22 is a partial perspective view of a post tray.

Referring to FIG. 22, post tray 150 includes a plurality of posts groupings 265 attached to a tray 266 along the length thereof. Post grouping 265 includes two posts 236 and one center support rail 226. Each of the posts includes an intricate mold pattern 267, which form handle-receiving cavities 268a, 268b, as shown in FIG. 18d. Cavities 268a, 268b are the points on the razor unit at which flexible prongs 270 of razor handle 272 (See FIG. 3) are removably inserted. More specifically, flexible prongs 270 are squeezed towards each other, inserted into cavities 268a, 268b and then allowed to expand outward into handle-locking cavities 274a, 274b, thereby removably attaching razor handle 272 to the razor cartridge. Additionally each post 236 includes a blade alignment pin 276.

Figure 22A:
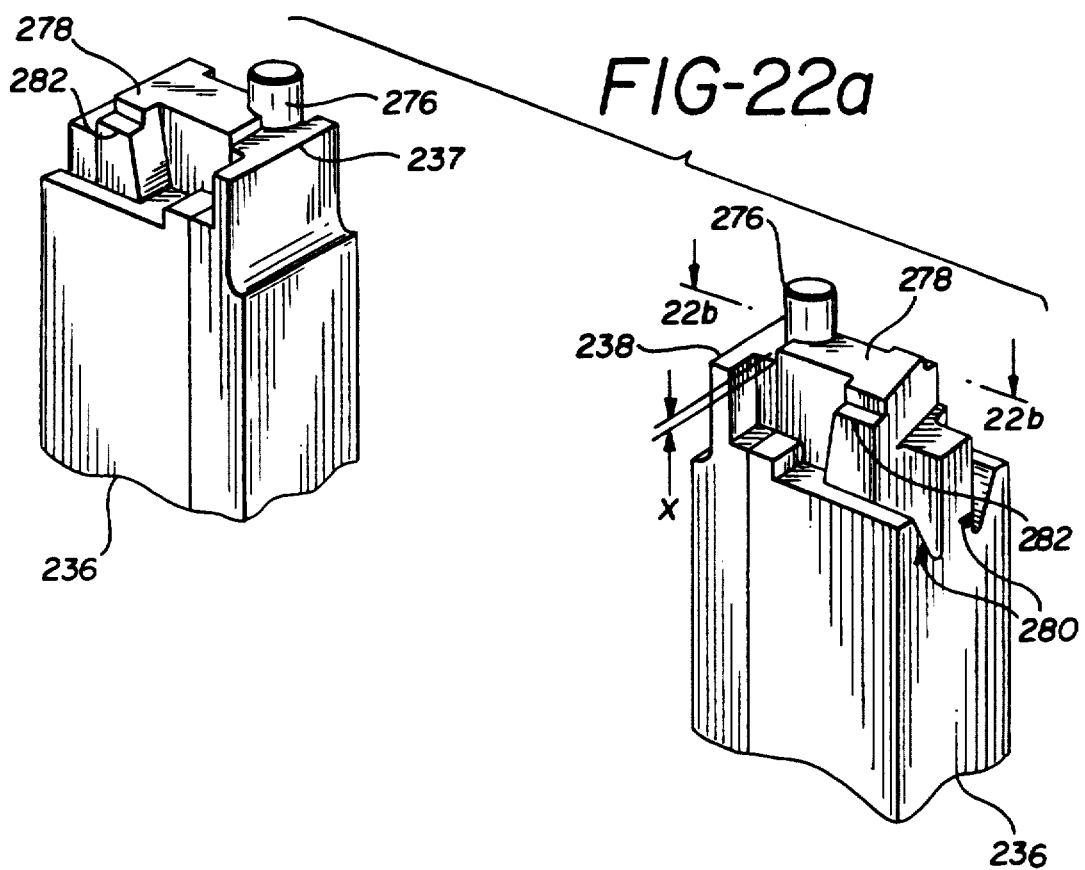
FIG. 22a is a detail of the post.
Figure 22B:
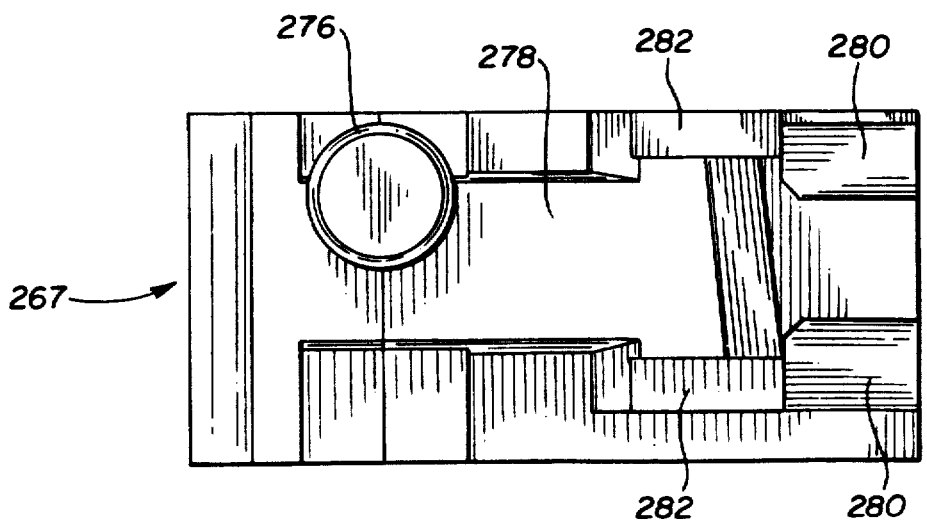
FIG. 22b is a top plan view thereof.

FIG. 22a is a detail of mold pattern 267. As noted above, mold pattern 267 includes fins 237, 238 which are stepped down a distance X from a surface 278. Mold pattern 267 also includes a pair of V-shaped notches 280 which, together with mold cavities 210, 211 form lips 161 on the razor cartridge. Shoulders 282 create notches 284, as shown in FIG. 18d.

Figure 29:
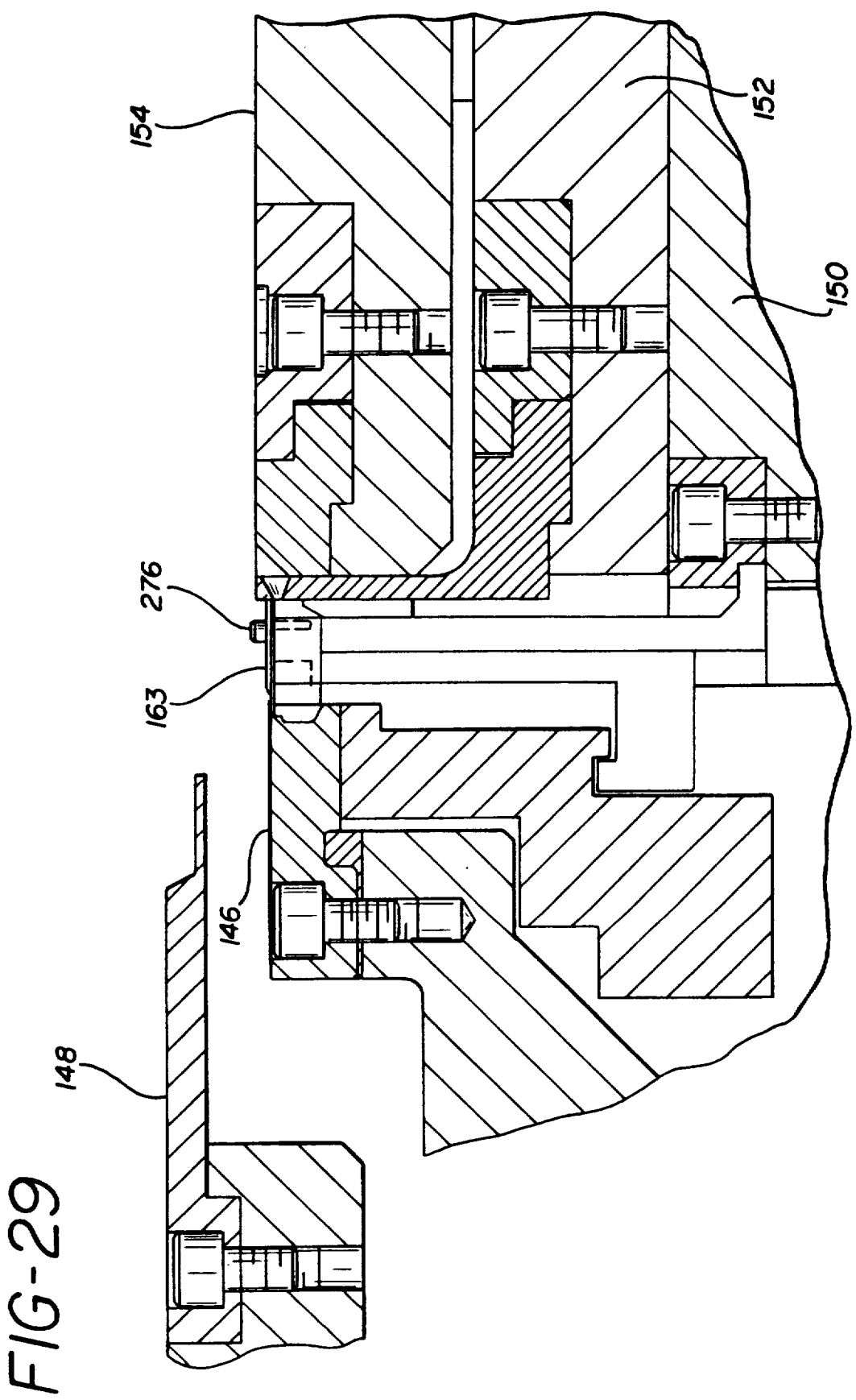
FIG. 29 is a cross-section through the lower mold assembly showing a seat blade positioned in the mold region.
Figure 29A:
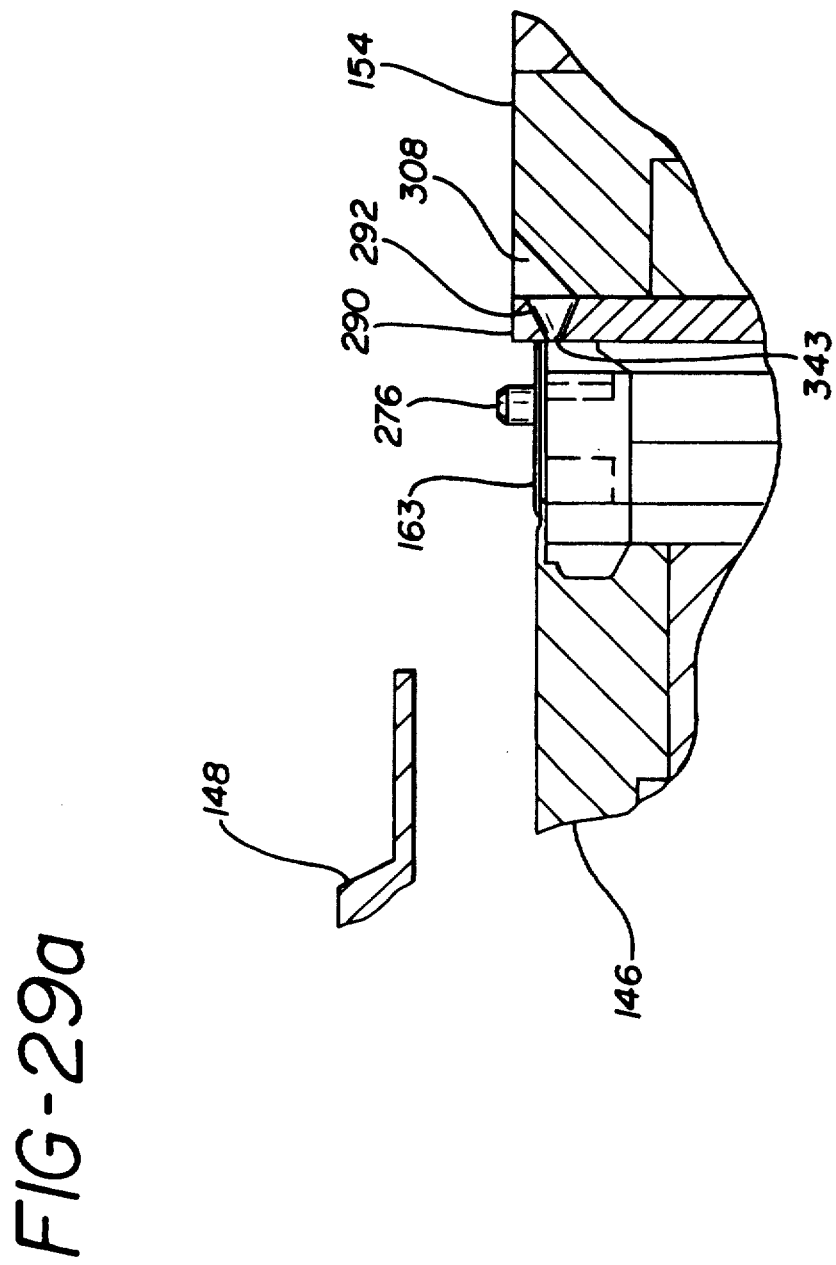
FIG. 29a is an enlarged detail of FIG. 29.

Gate tray 152, which is shown in FIG. 23 includes a plurality of gate groupings 286 attached to a tray 288 along the length thereof. Gate grouping 286 includes seven gates 290, each of which has an injection port 292. As best shown in FIG. 29a, injection port 292 has a "funnel-shaped" cross-section. Gate tray 152 also includes an inclined ramp 294 that engages the cam means connected to actuator 122. Gate tray 152 may include a plurality of holes 296 dimensioned to allow a support pin (not shown) to pass therethrough.

The bottom ends of these support pins, which pass through holes 296, rest on the upper surface of post tray 150. The upper ends of the pins contact the lower surface of cavity insert tray 154. As is discussed below, a 0.060 inch gap exists between the upper surface of gate tray 152 and the lower surface of cavity insert tray 154 during the molding procedure. Due to the extremely high forces experienced during a typical molding procedure, the cavity insert tray may tend to deflect downward towards the gate tray. Therefore, it may be necessary to provide additional support for the cavity insert tray (i.e., by means of support pins passing through the gate tray and contacting the post tray) to prevent deflection, and possibly shearing, of the cavity insert tray or of the cavity inserts in the area near mold region 178.

Figure 18C:
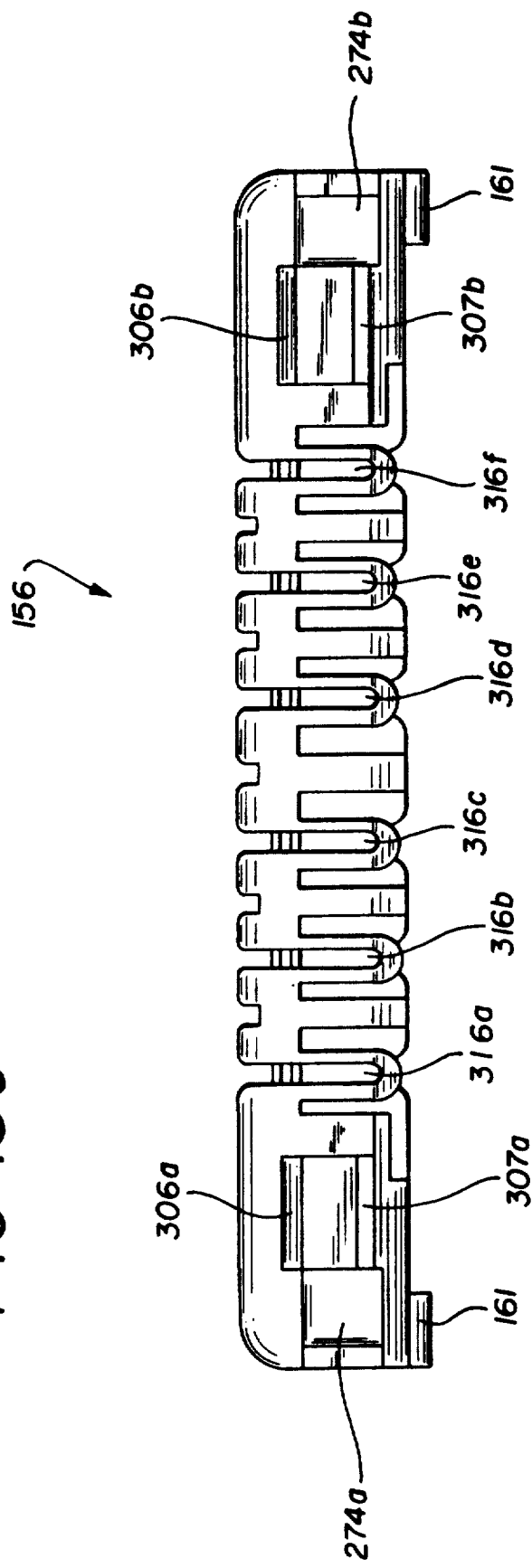
FIG. 18c is a back view thereof.
Figure 24:
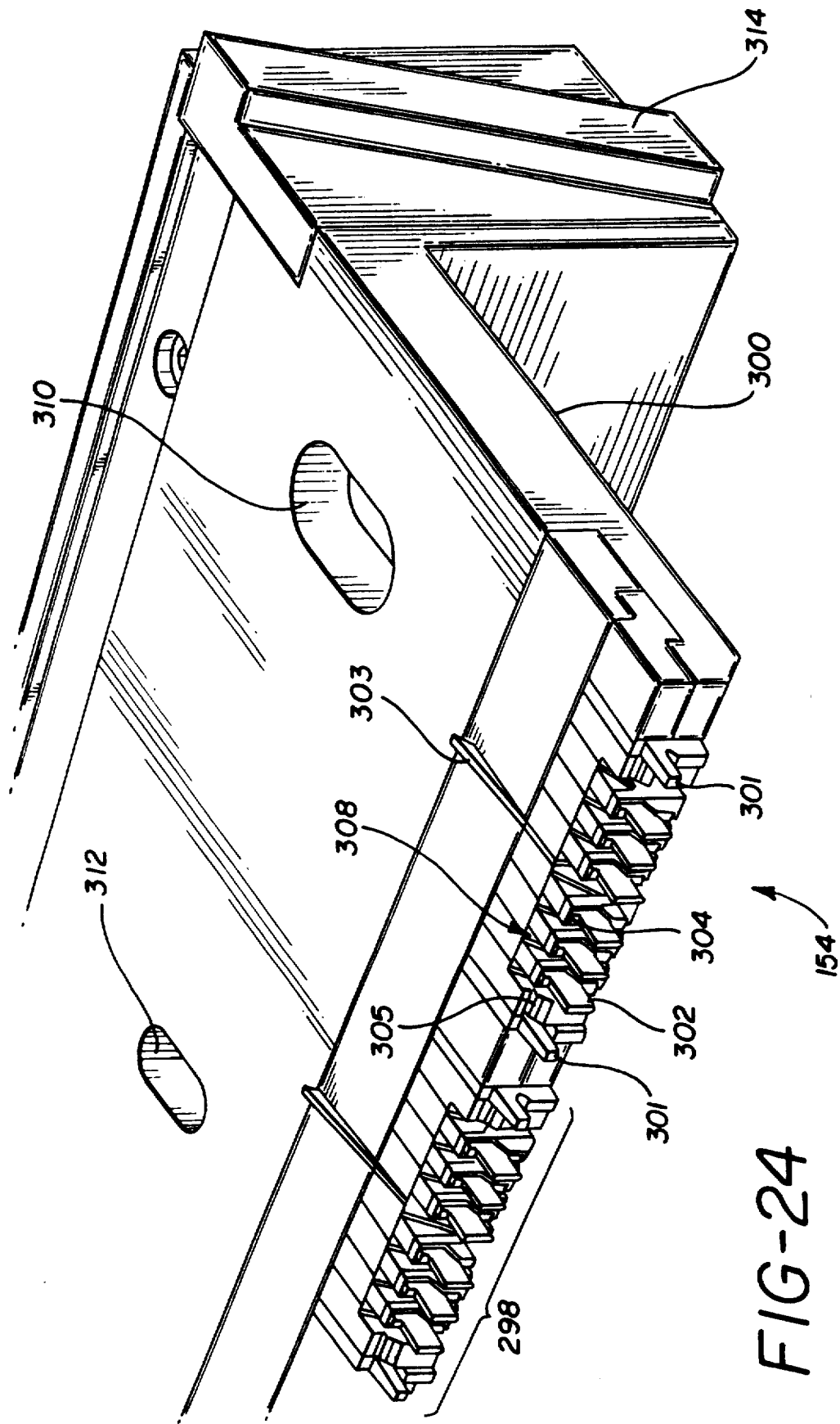
FIG. 24 is a partial perspective view of a cavity insert tray.

Referring to FIG. 24, cavity insert tray 154 includes a plurality of cavity insert groupings 298 attached to a tray 300 along the length thereof. Each of groupings 298 has two square inserts 301, six rectangular inserts 302 and one stabilizing male mold member 303. A shoulder 304 is attached to each of the rectangular inserts. Insert grouping 298 also includes mold surfaces 305 which form ridges 306a, 306b on the molded unit, as shown in FIG. 18c. Ridges 306a, 306b provide means for removably securing the razor unit in its marketing package. Mold surfaces 305 also form I.D. surfaces 307a, 307b, as shown in FIG. 18c. I.D. surfaces 307a, 307b may be provided with an identification marking for future identification of the molded unit. Cavity insert tray 154 also includes inclined delivery ports 308. A total of seven delivery ports, which form the inlet paths for the thermoplastic material to enter the molding region, are included in each of groupings 298. Additionally, cavity insert tray 154 has a pair of opposing guide slots 310 and a pair of opposing bolt slots 312. Cavity insert tray 154 also has a pair of opposing inclined legs 314.

Figure 28:
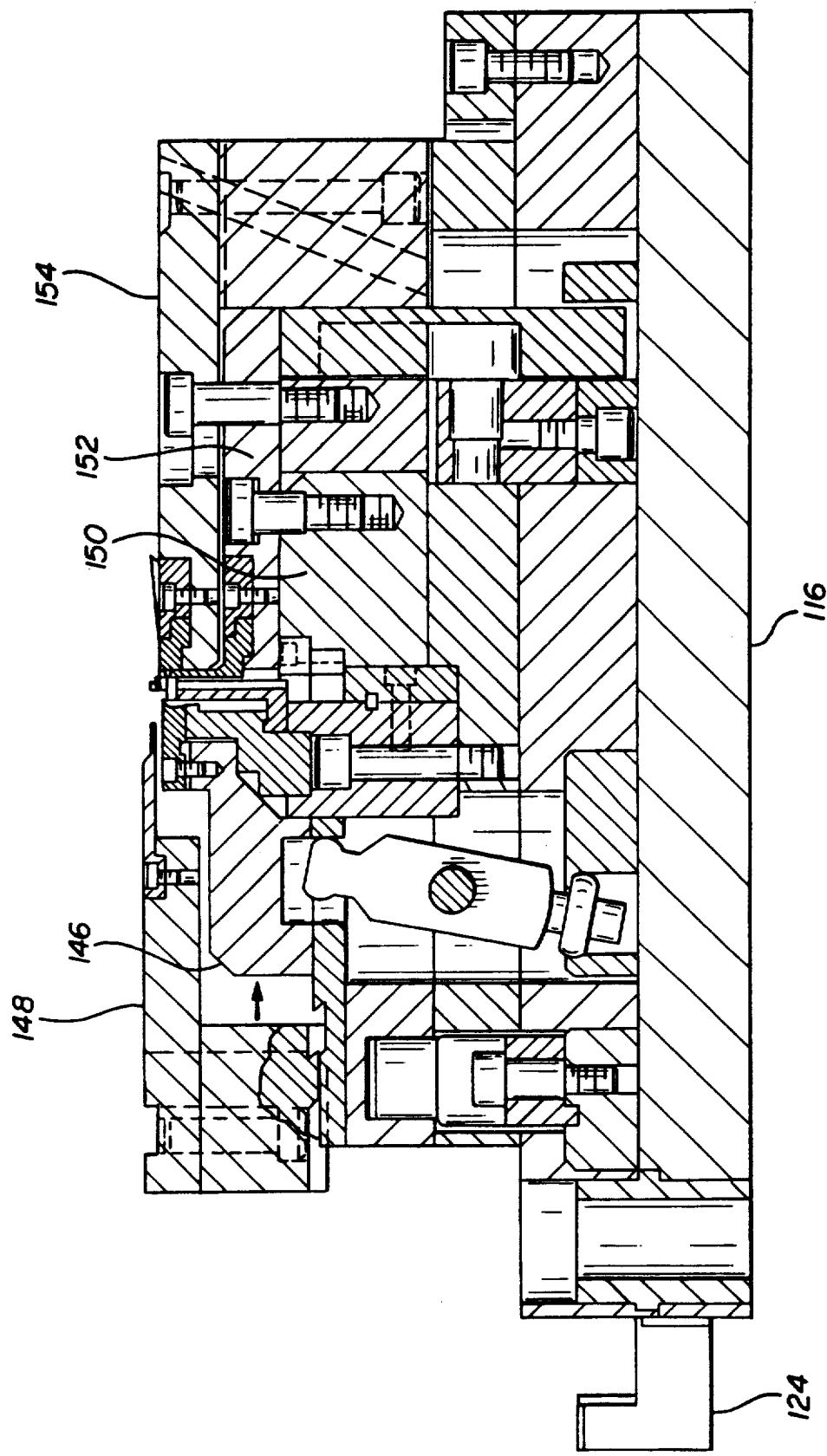
FIG. 28 is a cross-section through the lower mold assembly showing the spacer bar tray in its retracted position.

Cavities 274a, 274b, described above, are created by inserts 301. In particular, inserts 301 penetrate into the mold region in the area directly below lips 161 (as viewed from FIG. 18d) when cavity insert tray is positioned for molding (as shown in FIG. 28). It was discovered that due to the extremely complicated and intricate molding apparatus at hand, the use of inserts 301 provided the most feasible, if not only, means of forming cavities 274a, 274b.

Figure 25:
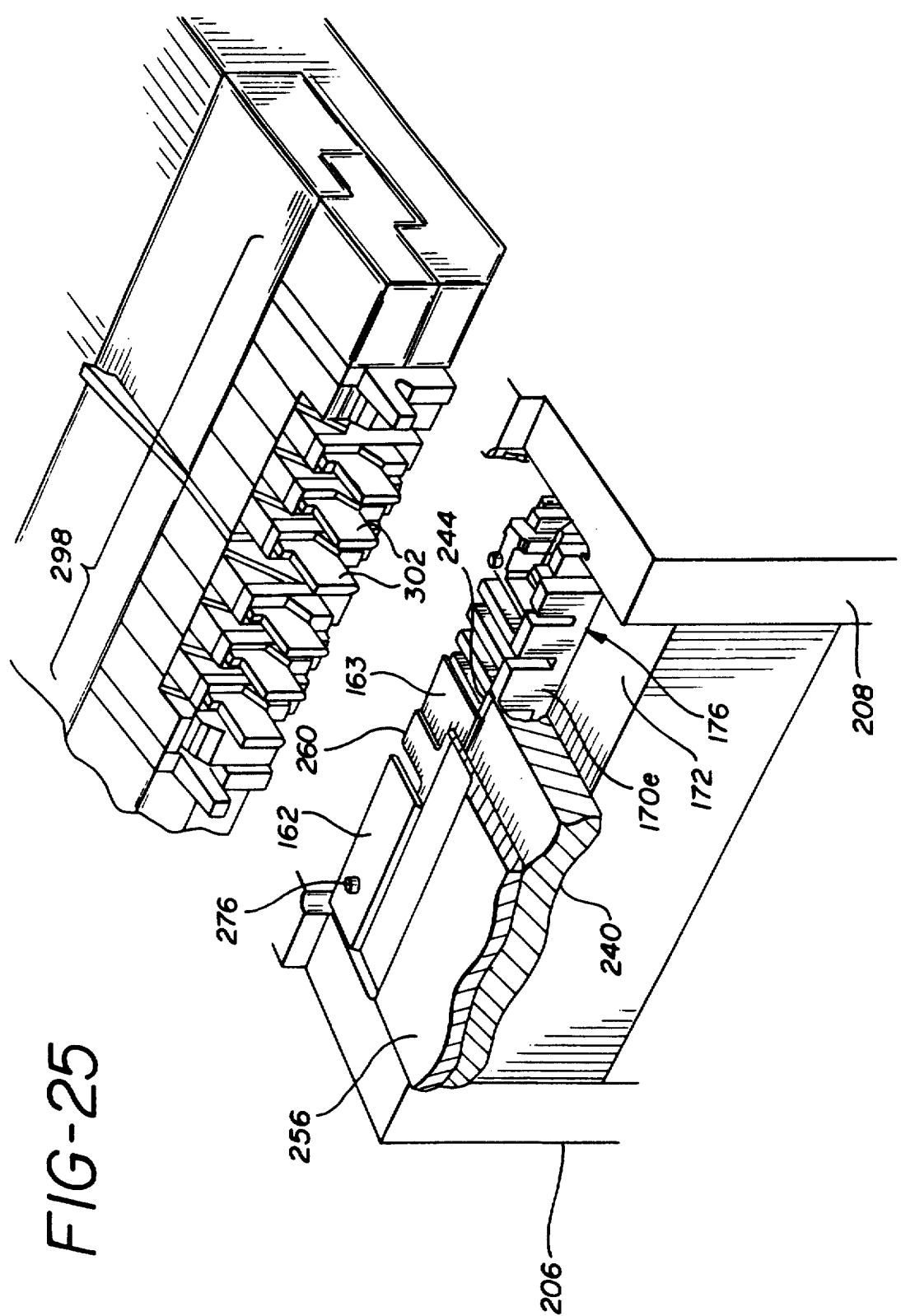
FIG. 25 shows the interaction of the mold elements in the mold region.

As shown in FIG. 25, all of the trays interact in mold region 178. As previously mentioned, cavity blocks 170a-170f are fixedly attached with respect to base 116 and, hence, remain stationary throughout the molding procedure. Cavity insert grouping 298 is shown in its withdrawn position. During a molding operation, each of rectangular cavity inserts 302 is positioned within a cavity block. Accordingly, six living hinges 316a-316f (see FIG. 18c) are formed around cavity inserts 302.

Figure 25A:
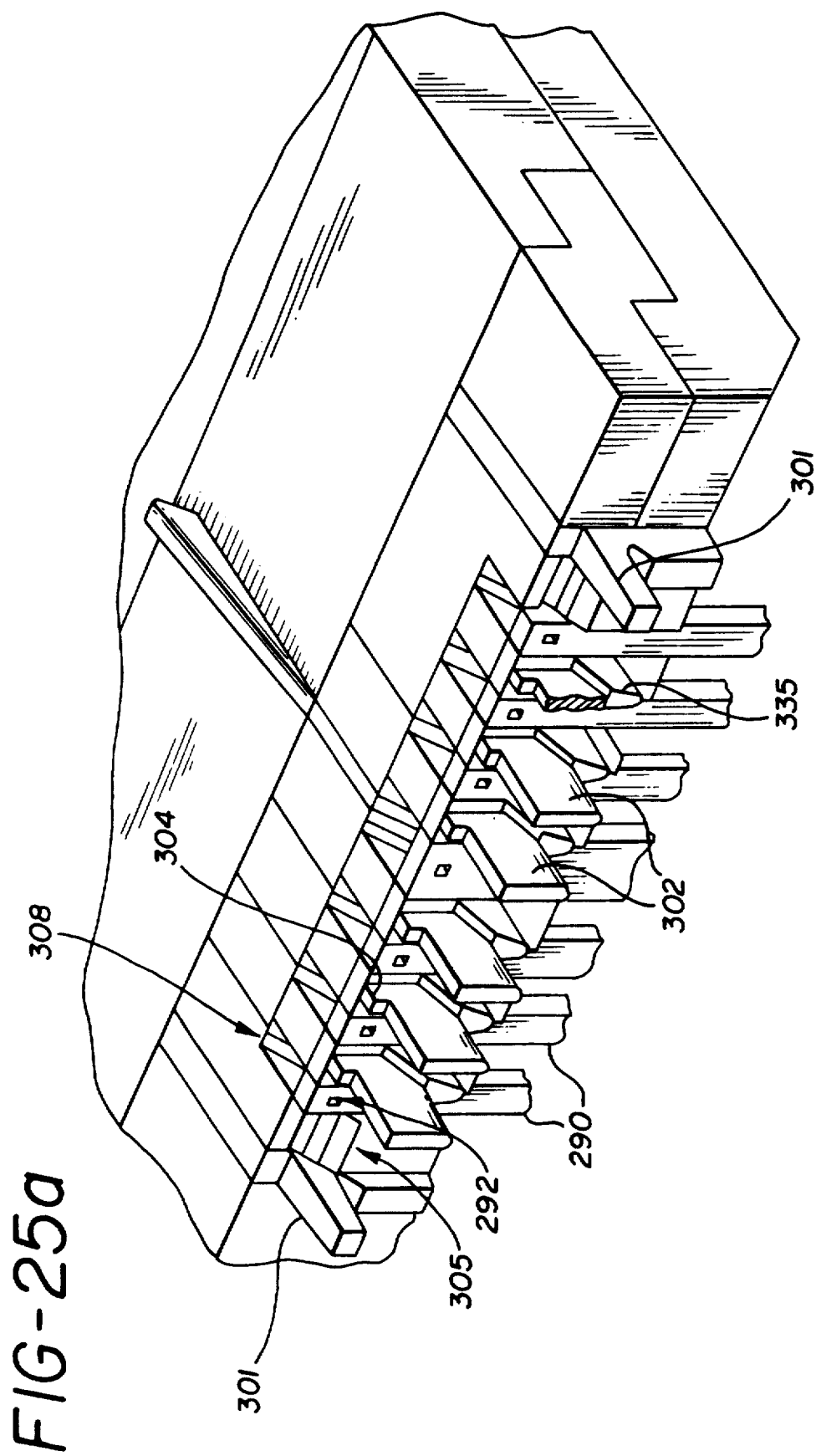
FIG. 25a is an enlarged perspective view of the cavity insert tray interacting with the gate tray.

Gate tray 152 is positioned below cavity insert tray 154 in lower mold 114. Referring to FIG. 25a, each of gates 290 extends upward and rests between rectangular inserts 302. In this position, the gates enclose each of the delivery ports. As best shown in FIG. 29a, delivery ports 308 communicate with injection ports 292 located on gates 290.

Two posts 236 extend upward on either end of mold region 178. Fins 237, 238 located on post 236 align themselves with fins 232, 334 located on member 218, thereby completing cavity blocks 170a, 170f as shown in FIG. 25.

Guard bar mold 240 slides on surface 172 until lower lip 248 sealing contacts lower edge 176 of cavity blocks 170. Upper lip 244 extends beyond the plane defining lower edge 176 and rests on upper surface 174 of cavity blocks 170. A seat blade 163 is then positioned on alignment pins 276. Seat blade 163 rests on surface 278 of post 236 and on upper lip 244 of guard bar mold 240. Accordingly, there is a resultant gap between the lower surface of seat blade 163 and upper surface 174 of cavity block 170. This gap is equal to the thickness of upper lip 244 and is on the order of 0.01 inches. Next, spacer bar 256 is positioned above guard bar mold 240 such that finger elements 260 rest on seat blade 163. Finger elements 260 form slots 317a–317h in the molded unit, as shown in FIG. 18b. A cap blade 162 is then positioned on spacer bar 256 and is also aligned by means of alignment pins 276.

As best shown in FIG. 26, the upper portion of upper lip 244 has a surface 318 which is approximately 0.002 lower than surface 320 of guard bar mold 240. This dimension is depicted as H' and represents one-half the thickness of the blade. A corresponding surface 322 is located on the lower portion of spacer bar 256. Surface 322 is approximately 0.002 inches higher than surface 324 of spacer bar 256. Seat blade 163 is securely retained between surface 318 and surface 322.

Guard bar mold 240 has a valve ramp 326 while spacer bar 256 has a valve ramp 328. As discussed above, (see FIG. 12a) valve ramps 326, 328 pinch the blade edge near the ends thereof, thereby cutting off the flow of thermoplastic material into cavity 330. The blade edge, itself, is safely positioned within this cavity. Similarly, cap blade 162 is securely retained between a surface on the upper portion of spacer bar 256 and a surface on the lower portion of upper mold 112 such that its edge is safely positioned within cavity 332. Valve ramps 333, 334 pinch the edges of cap blade 162, thereby preventing the flow of thermoplastic material into cavity 332.

Figure 27:
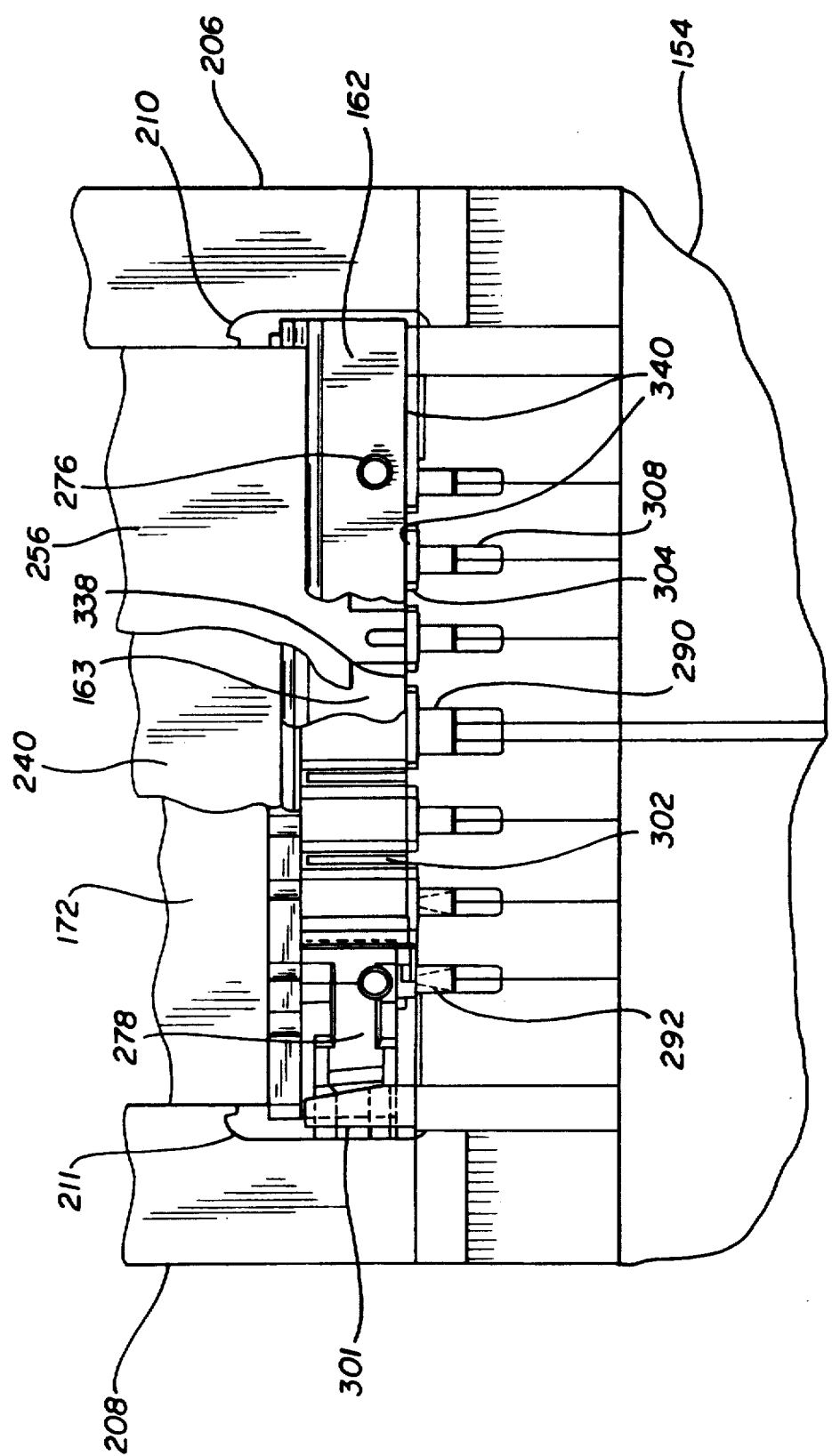
FIG. 27 is a top plan view of the mold region.

Referring to FIG. 26, cavity insert 302 extends into cavity block 170 until it contacts upper lip 244 of guard bar mold 240. At the same time, tapered insert portions 335 (see FIG. 25a) slide within tapered slots 336 of cover 228 (see FIG. 19b). Upper surface 337 of cavity insert 302 contacts the lower surface of seat blade 163 and provides support for the blade along the length of the mold region. Additionally, shoulders 304 contacts the rearward edge of blades 162, 163 and the forward edge of finger elements 260. Referring to FIG. 27, shoulders 304 of cavity inserts 302 are shown abutting rearward edge 338 of seat blade 163. The rearward edge of cap blade 162, which is positioned on top of spacer bar 250, also abuts shoulders 304. The cavities between shoulders 304, i.e., cavities 340, are passages for fluid flow. As thermoplastic material is injected into each of these cavities through delivery ports 308, the thermoplastic material is able to flow downward towards the guard bar insert, upward between the blades and upward over top of the cap blade. As is also shown in FIG. 27 (and FIG. 12c), the ends of the blades extend past the ends of spacer bar 256 and into mold cavities 210, 211. This ensures that the ends of the blades are rigidly secured to the formed product.

Mold region 178, together with guard bar mold 240, post grouping 265 and cavity insert grouping 298, form the composite seat blade support. This composite seat blade support provides a seat cavity portion for forming a flexible seat portion 340 on cartridge 156, as shown in FIG. 18a. The cap-forming male mold portion, which includes upper mold pattern 341, provides a cap cavity portion for forming a flexible cap 342, as also shown in FIG. 18a. Line Z represents the imaginary junction line between the portion of cartridge 156 formed by the cap-forming male mold portion in upper mold assembly 112 and the portion of cartridge 156 formed by the composite seat blade support in lower mold 114. The cap cavity portion is in fluid communication with the seat cavity portion when the cap-forming male mold portion is sealingly engaged with the seat blade support.

In use, guard bar tray 146, post tray 150, gate tray 152 and cavity insert tray 154 are positioned for molding by inserting actuator 122, as shown in FIG. 28. Referring to FIGS. 29 and 29a, seat blade 163 is then positioned on alignment pins 276. Following this, spacer bar tray 148 is moved into position by means of actuator 124. Spacer bar tray 148 not only slides horizontally inward, but also moves vertically downward a small distance. Referring to FIG. 28, foot 264 of spacer bar tray 148 rests on surface 254 of the guard bar tray 146 when the spacer bar tray is retracted. As the spacer bar tray is moved inward, foot 264 travels downward into slot 250. This results in a corresponding downward movement of spacer bar 256. The purpose for this arrangement is to ensure that the edge of seat blade 163 is not marred when the spacer bar is moved into position.

Figure 30A:
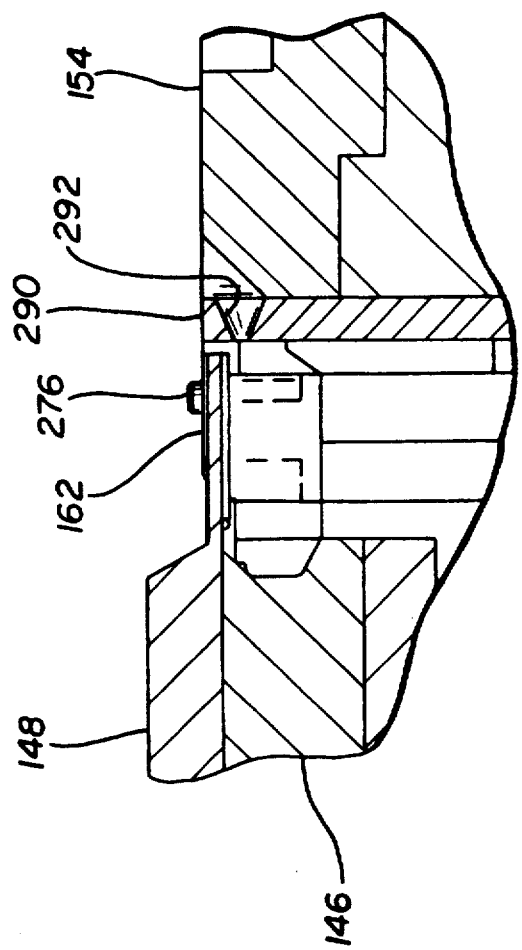
FIG. 30a is an enlarged detail of FIG. 30.
Figure 31:
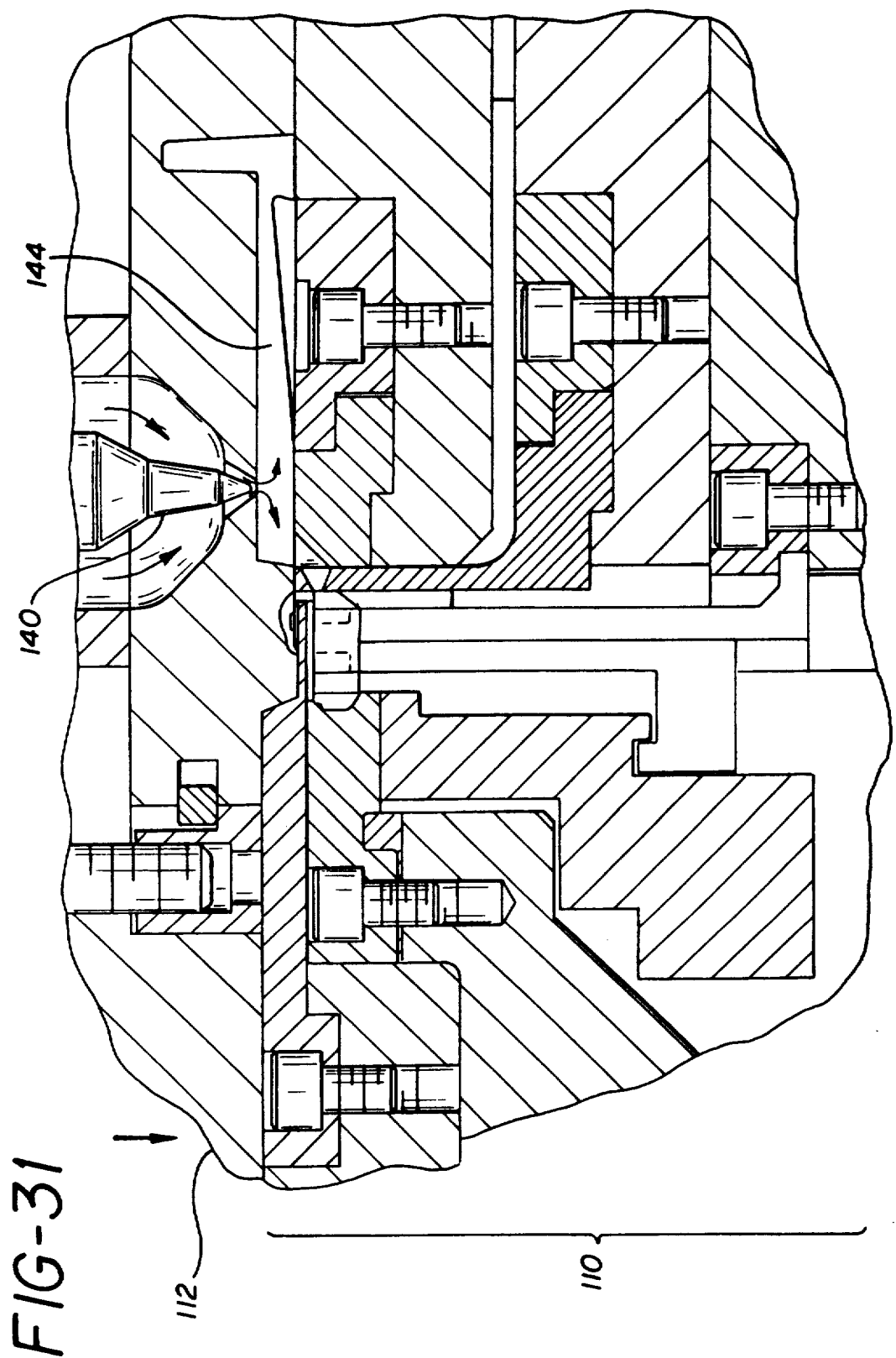
FIG. 31 is a cross-section through the lower and upper mold assemblies showing thermoplastic material being injected into a delivery channel.
Figure 32:
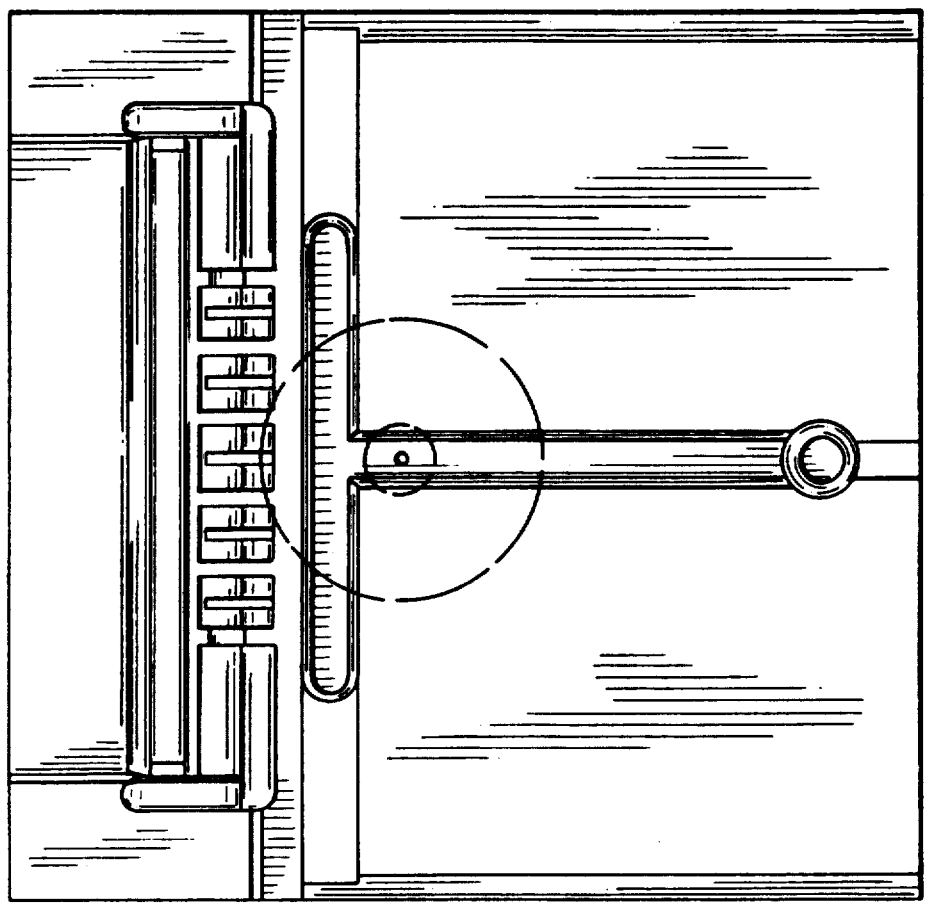
FIG. 32 is a plan view of a mold pattern contained within the upper mold assembly.

After spacer bar 256 is positioned on seat blade 163, cap blade 162 is placed on the spacer bar and aligned by means of alignment pins 276, as shown in FIGS. 30–30a. Referring to FIG. 31, lower mold assembly 110 is then moved upward and into sealing contact with upper mold assembly 112. Thermoplastic material is injected from nozzle 140 into delivery channel 144. The thermoplastic material travels through delivery ports 308, though injection ports 292 of gates 290 and into the molding region. Upper mold assembly 112 includes an upper mold pattern 341, as shown in FIG. 32, which forms the upper portion of the razor unit.

Figure 33:
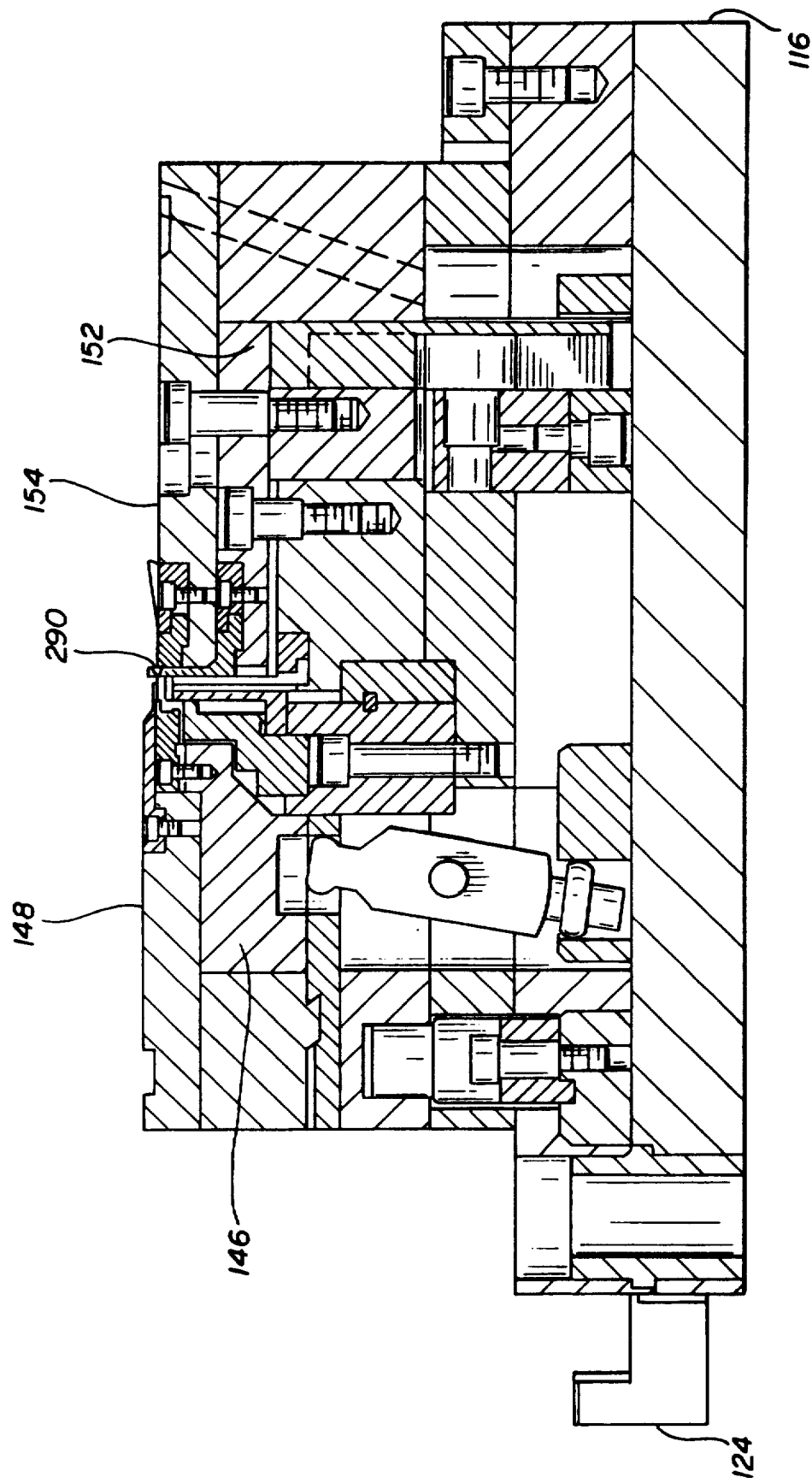
FIG. 33 is a cross-section through the lower mold assembly showing the gate tray moved upward approximately 0.060 inches.

After the thermoplastic material has been injected into mold region 178, lower mold assembly 110 is separated from upper mold assembly 112. A waste member 60, as shown in FIG. 13, is left remaining in delivery channel 144. Referring to FIG. 29a, waste member 60 remains attached to the molded unit at tip 343 of injection port 292 at the completion of the molding procedure. Before waste member 60 can be discarded from lower mold 110, the connection between the waste member and the molded unit must be sheared. This shearing is accomplished by an initial upward movement of gate tray 152. As shown in FIG. 30, a gap 344 exists between gate tray 152 an cavity insert tray 154. This gap allows gate tray 152 to be moved upward a small distance, approximately 0.060 inches. This upward movement shears waste member 60 from the molded unit and is illustrated in FIG. 33 where it can be seen that gate 290, after being moved upward 0.060 inches, extends through the plane defining the upper surface of cavity insert tray 154.

Figure 34:
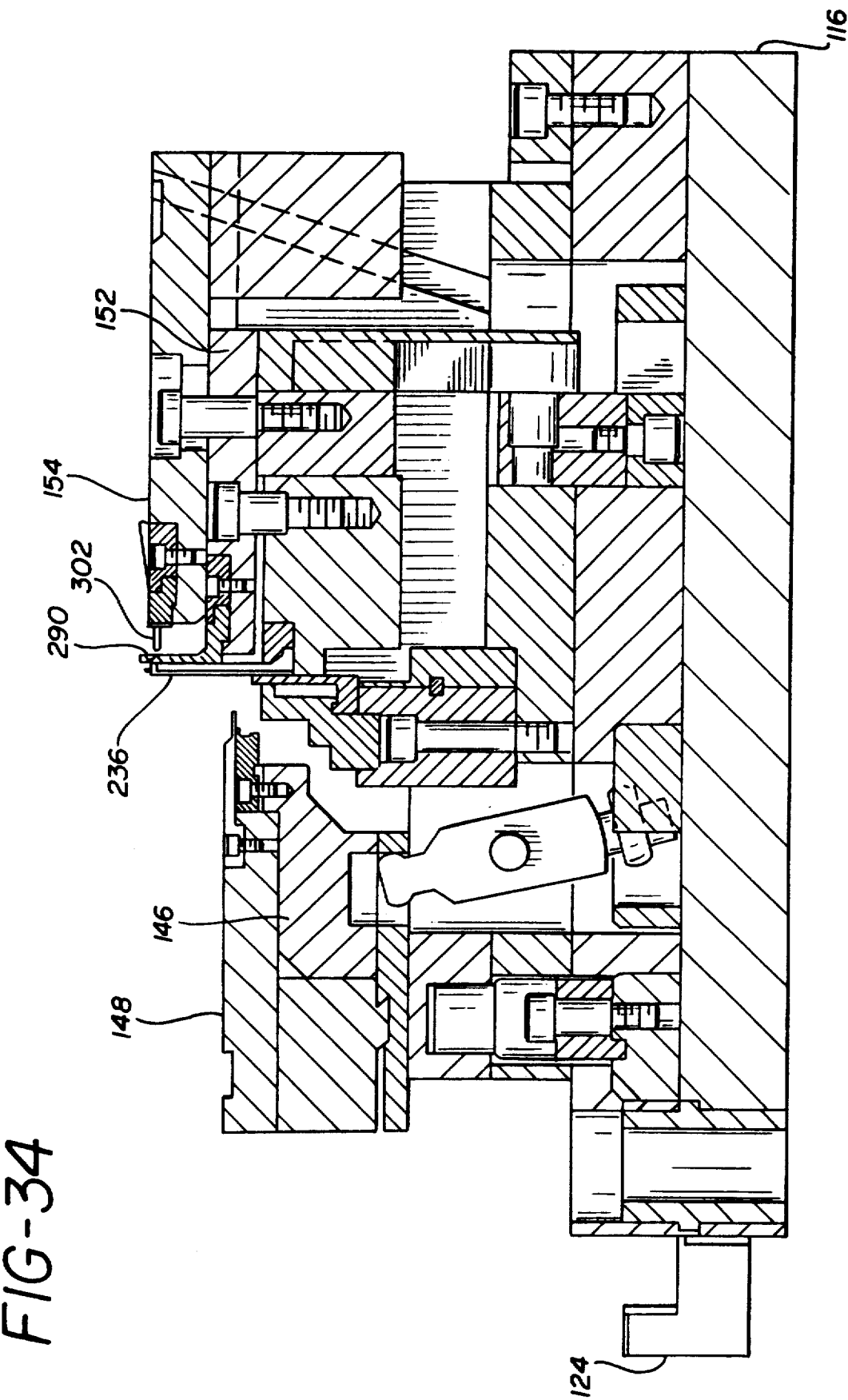
FIG. 34 is a cross-section through the lower mold assembly showing the guard bar tray and spacer bar tray in their retracted position and the post tray, gate tray and cavity insert tray in their most upwardly moved position.

Referring to FIG. 34, guard bar tray 146 and spacer bar tray 148 are moved outward as one unit. Eventually, when guard bar tray 146 is moved inward in preparation for a subsequent molding procedure, it is literally pulled out from under spacer bar tray 148. Spacer bar tray 148 remains in its same horizontal orientation but is forced vertically upward a small distance (i.e. the difference in height between slot 250 and surface 254) until foot 264 rests on surface 254.

On the opposite side of the mold region, gate tray 152 is the member that is actually driven by the cam means connected to actuator 122. More specifically, as gate tray 152 is driven upward, it pulls post tray 152 upward. However, gate tray 152 is allowed to move through gap 344, thereby shearing waste member 60 from the formed product, before it begins to pull post tray 152 upward. Additionally, gate tray 152 pushes cavity insert tray 154 upward. Inclined leg 314 travels within inclined groove 346 and, accordingly, cavity insert tray 154 travels upward at approximately a 70° angle. This angled movement results in rectangular cavity inserts 302 being withdrawn from cavity blocks 170. Guide slot 310 and bolt slots 312 allow this upward angled movement to occur.

Figure 35:
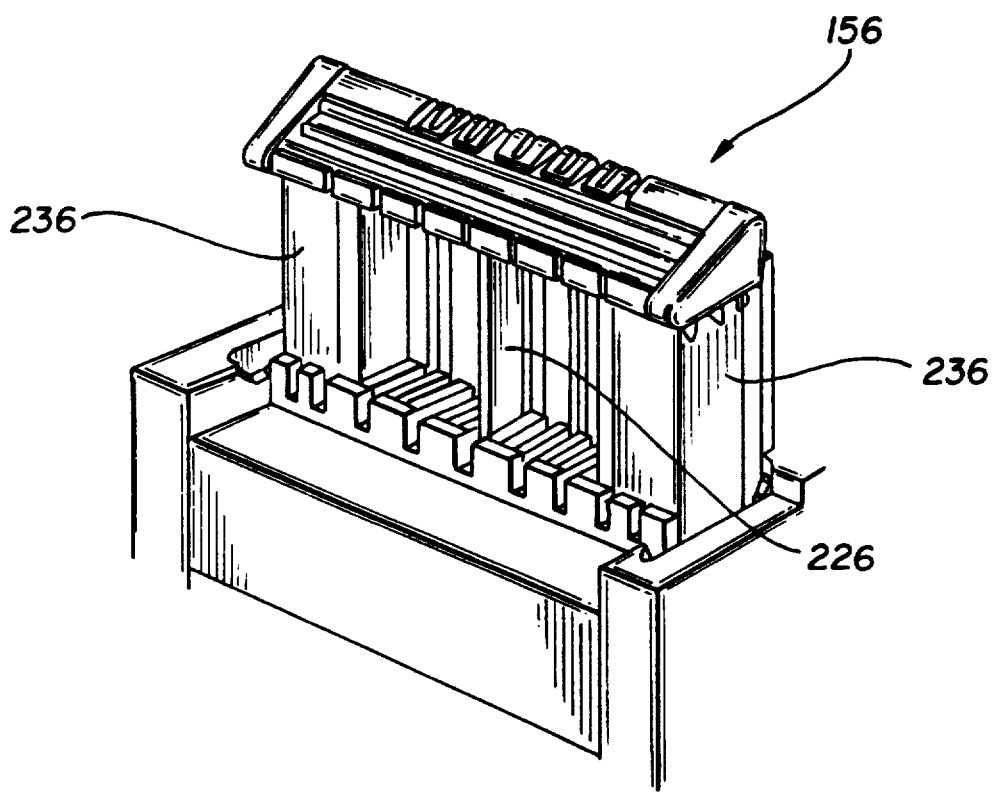
FIG. 35 is a perspective view of the molded razor cartridge resting on a pair of posts and a support rail.

As post tray 150 is pulled upward by gate tray 152, posts 236 eject the molded unit from the mold region. As shown in FIG. 35, the molded unit remains attached to the posts. Additionally, center support rail 226 is moved upward with posts 236. Center support rail 226 provides support for the recently formed, but still malleable, razor unit.

The razor unit, which rests on posts 236 and center support rail 226 when the molding procedure is completed, is ideally positioned for automated removal. Waste member 60 may also be removed at this point.

While there have been described what are presently believed to be the preferred embodiments of the present invention, the artisan will appreciate that there are other and further modifications which can be made without departing from the spirit of the present invention, and it is intended to claim all such further modifications as come within the true scope of the claims.

What is claimed is:

1. An apparatus for insert molding a wet-shaving razor unit comprising:
   a composite seat blade support having male mold members in fluid communication with a cap-forming male mold portion, said seat blade support providing a seat cavity portion for forming a flexible seat portion;
   said cap-forming male mold portion which provides a cap cavity portion for forming a flexible cap, said cap cavity portion in fluid communication with said seat cavity portion to form a mold region, said cap-forming male mold portion being sealingly engageable with said seat blade support;
   at least one alignment pin extending between said seat cavity portion and said cap cavity portion for receipt of a blade thereon and securement during molding; and
   at least one injection port in fluid communication with one of said seat cavity portion and said cap cavity portion for injecting thermoplastic material.

2. The apparatus according to claim 1 further comprising a spacer bar positioned adjacent to a seat blade which support a cap blade and positions said cap blade in spaced relationship to said seat blade.

3. The apparatus according to claim 2 wherein said spacer bar includes finger elements between which thermoplastic support fingers are formed during molding.

4. The apparatus according to claim 1 further comprising mechanical pusher elements extending upward within said seat blade support into said mold region and which form a pair of opposing handle-receiving cavities on said unit and which eject said unit from said apparatus for removal therefrom.

5. The apparatus according to claim 4 further comprising a center support rail extending upward within said seat blade support into said mold region and interposed between said mechanical pusher elements and connected thereto such that said center support rail moves with said mechanical pusher elements.

6. The apparatus according to claim 4 wherein said alignment pin is located on at least one of said mechanical pusher elements.

7. The apparatus according to claim 1 wherein said seat blade support includes a plurality of cavity inserts displaced within said mold region and configured to slide within a plurality of cavity blocks during molding whereby a plurality of living hinges are provided along the length of said blade.

8. The apparatus according to claim 1 wherein said seat blade support includes a guard bar mold for forming a plurality of discontinuities along the length of said blade.

9. The apparatus according to claim 1 wherein said seat blade support includes a pair of opposing male mold members for forming a pair of opposing handle-locking cavities.

10. The apparatus according to claim 1 wherein said injection port is positioned within a movable mold element such that an initial movement of said mold element following the completion of the molding of said razor unit accomplishes a shearing of said razor unit from a thermoplastic waste member formed from excess thermoplastic material during the molding process.

* * * * *